United States Patent
Takahashi et al.

(10) Patent No.: US 10,863,165 B2
(45) Date of Patent: Dec. 8, 2020

(54) IMAGE PROCESSING APPARATUS AND METHOD

(71) Applicant: SONY SEMICONDUCTOR SOLUTIONS CORPORATION, Kanagawa (JP)

(72) Inventors: Hiroaki Takahashi, Tokyo (JP); Norimitsu Okiyama, Kanagawa (JP); Hiroyuki Kasahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/608,990

(22) PCT Filed: May 24, 2018

(86) PCT No.: PCT/JP2018/019951
§ 371 (c)(1),
(2) Date: Oct. 28, 2019

(87) PCT Pub. No.: WO2018/225517
PCT Pub. Date: Dec. 13, 2018

(65) Prior Publication Data
US 2020/0145641 A1 May 7, 2020

(30) Foreign Application Priority Data

Jun. 7, 2017 (JP) .................................. 2017-112303

(51) Int. Cl.
*H04N 13/254* (2018.01)
*G06T 7/579* (2017.01)
(Continued)

(52) U.S. Cl.
CPC ........... *H04N 13/254* (2018.05); *G06T 7/579* (2017.01); *H04N 5/345* (2013.01); *H04N 5/353* (2013.01);
(Continued)

(58) Field of Classification Search
CPC .... H04N 13/254; H04N 13/296; H04N 5/345; H04N 5/353; G06T 7/579
See application file for complete search history.

(56) References Cited

U.S. PATENT DOCUMENTS 9,832,436 B1 * 11/2017 Fuchikami ................ G06T 7/60
2002/0001029 A1 * 1/2002 Abe .................... G01B 11/2545
348/49

(Continued)

FOREIGN PATENT DOCUMENTS

CN      105393079 A    3/2016
EP      2962062 A1     1/2016
(Continued)

OTHER PUBLICATIONS

O'Toole, et al., "Homogeneous Codes for Energy-Efficient Illumination and Imaging: Supplemental Document", ACM Transaction on Graphics, SIGGRAPH, 2015, 02 pages.
(Continued)

*Primary Examiner* — Mishawn N. Hunter
(74) *Attorney, Agent, or Firm* — Chip Law Group

(57) ABSTRACT

The present disclosure relates to information processing apparatus and method configured so that more information can be obtained without the need for a frame memory. Scan of a point light source or a line light source configured to project a pattern image on an object is performed, and exposure and reading by line scan for capturing an image of the object is performed multiple times during a single cycle of the scan as projection of the pattern image. The present (Continued)

disclosure is, for example, applicable to an information processing apparatus, an image processing apparatus, an image projection apparatus, a control apparatus, a projection image capturing system, an information processing method, a program, or the like.

20 Claims, 33 Drawing Sheets

(51) Int. Cl.
  *H04N 13/296* (2018.01)
  *H04N 5/345* (2011.01)
  *H04N 5/353* (2011.01)
(52) U.S. Cl.
  CPC . *H04N 13/296* (2018.05); *G06T 2207/10012* (2013.01)

(56) References Cited

U.S. PATENT DOCUMENTS

| | | | |
|---|---|---|---|
| 2004/0246495 A1* | 12/2004 | Abe | H04N 13/261 356/603 |
| 2005/0259158 A1* | 11/2005 | Jacob | H04N 5/3456 348/218.1 |
| 2007/0158427 A1* | 7/2007 | Zhu | G06K 7/14 235/462.45 |
| 2010/0260378 A1* | 10/2010 | Noy | G06T 7/12 382/103 |
| 2014/0240464 A1 | 8/2014 | Lee | |
| 2014/0240492 A1 | 8/2014 | Lee | |
| 2015/0002734 A1 | 1/2015 | Lee | |
| 2015/0130927 A1* | 5/2015 | Luxen | G01B 11/30 348/128 |
| 2016/0063309 A1* | 3/2016 | Konolige | G06T 7/593 382/153 |
| 2016/0088275 A1* | 3/2016 | Fuchikami | H04N 9/3179 348/744 |
| 2016/0288330 A1* | 10/2016 | Konolige | H04N 13/239 |
| 2017/0019658 A1 | 1/2017 | Lee | |
| 2017/0150021 A1 | 5/2017 | Lee | |
| 2017/0191822 A1* | 7/2017 | Becker | G01B 11/002 |

FOREIGN PATENT DOCUMENTS

| | | |
|---|---|---|
| EP | 3319079 A1 | 5/2018 |
| JP | 2008-249430 A | 10/2008 |
| JP | 2017-015872 A | 1/2017 |
| JP | 2017-086485 A | 5/2017 |
| WO | 2014/133691 A1 | 9/2014 |
| WO | 2017/002293 A1 | 1/2017 |

OTHER PUBLICATIONS

O'Toole, et al., "Homogeneous Codes for Energy-Efficient Illumination and Imaging", ACM Transaction on Graphics, SIGGRAPH, Jul. 2015, 13 pages.

O'Toole, et al., "Homogeneous Codes for Energy-Efficient Illumination and Imaging", ACM Transactions on Graphics, vol. 34, No. 4, Aug. 2015, 13 pages.

International Search Report and Written Opinion of PCT Application No. PCT/JP2018/019951, dated Aug. 21, 2018, 09 pages of ISRWO.

O'Toole, et al., "Homogeneous Codes for Energy-Efficient Illumination and Imaging: Supplemental Document", International conference on computer graphics and interactive techniques, 2015, 02 pages.

* cited by examiner

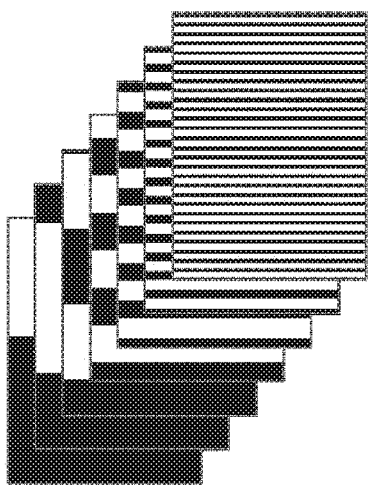
FIG. 8B
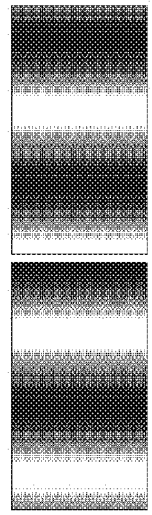
FIG. 8D
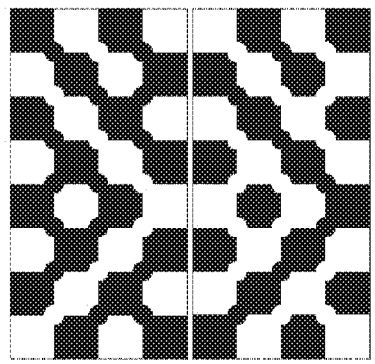
FIG. 8A
FIG. 8C

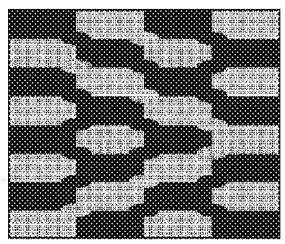
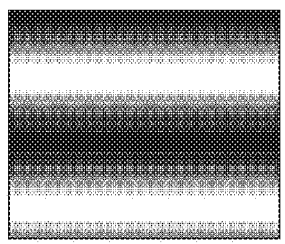
FIG. 9B
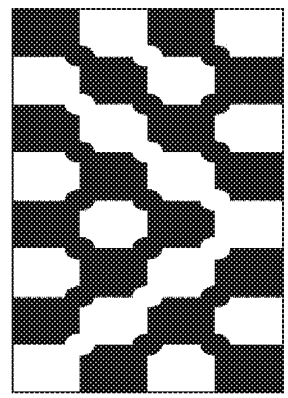
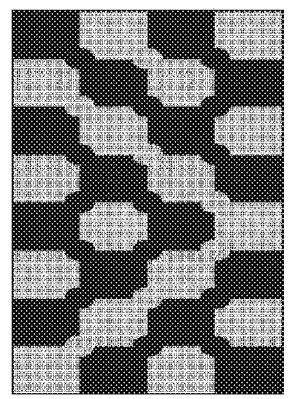
FIG. 9D
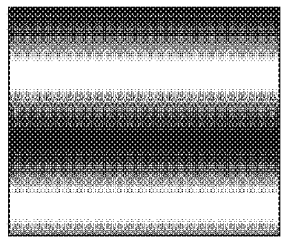
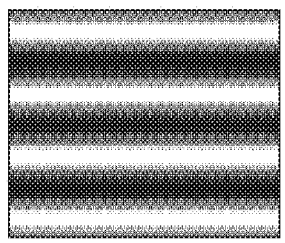
FIG. 9A
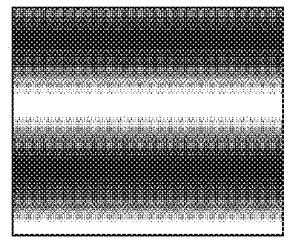
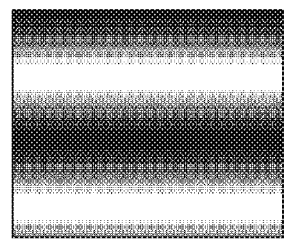
FIG. 9C

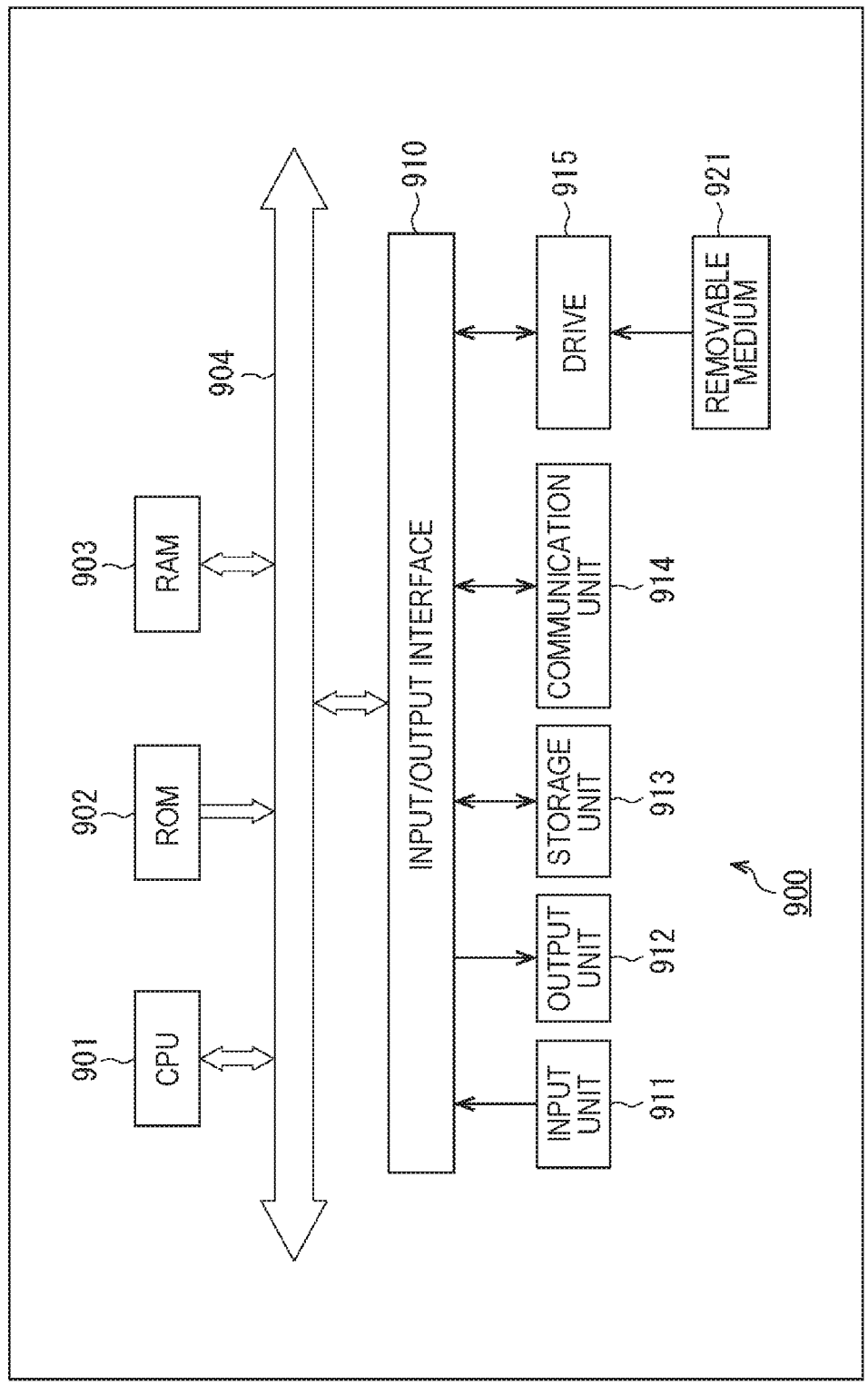

IMAGE PROCESSING APPARATUS AND METHOD

CROSS REFERENCE TO RELATED APPLICATIONS

This application is a U.S. National Phase of International Patent Application No. PCT/JP2018/019951 filed on May 24, 2018, which claims priority benefit of Japanese Patent Application No. JP 2017-112303 filed in the Japan Patent Office on Jun. 7, 2017. Each of the above-referenced applications is hereby incorporated herein by reference in its entirety.

TECHNICAL FIELD

The present disclosure relates to information processing apparatus and method, and specifically relates to information processing apparatus and method configured so that more information can be obtained without the need for a frame memory.

BACKGROUND ART

Typically, a method called structured light for projecting a predetermined pattern image on an object and capturing an image of the object on which the pattern image has been projected to obtain a distance to the object by, e.g., triangulation has been present as a distance measurement technology.

In such structured light, a projection method for performing projection for an entire plane by a planar method has been generally known. However, in the case of performing projection by the planar method, a frame memory configured to hold pixel values of an entire image capturing plane until analog/digital (A/D) conversion is necessary to perform image capturing multiple times for single projection.

In response, a method in which projection and image capturing are performed in synchronization with each other on a line-by-line basis (by a line scan method) has been considered (see, e.g., Non-Patent Document 1).

CITATION LIST

Non-Patent Document

Non-Patent Document 1: Matthew O'Toole, Supreeth Achar, Srinivasa G. Narasimhan, Kiriakos N. Kutulakos, "Homogeneous Codes for Energy-Efficient Illumination and Imaging," ACM SIGGRAPH, 2015.http://www.dgp.toronto.edu/~motoole/energyefficientimaging.html

SUMMARY OF THE INVENTION

Problems to be Solved by the Invention

However, in the case of the method described in Non-Patent Document 1, image capturing is performed only once for single projection, and it has been difficult to obtain more information.

The present disclosure has been made in view of such a situation, and is intended to obtain more information without the need for a frame memory.

Solutions to Problems

An information processing apparatus of one aspect of the present technology is an information processing apparatus including a control unit configured to control a projection unit to perform scan of a point light source or a line light source configured to project a pattern image on an object and control an image capturing unit to perform, multiple times, exposure and reading by line scan for capturing an image of the object during a single cycle of the scan as projection of the pattern image.

An information processing method of one aspect of the present technology is an information processing method including performing scan of a point light source or a line light source configured to project a pattern image on an object and performing, multiple times, exposure and reading by line scan for capturing an image of the object during a single cycle of the scan as projection of the pattern image.

An information processing apparatus of another aspect of the present technology is an information processing apparatus including a control unit configured to cause each of multiple image processing apparatuses configured to perform scan of a point light source or a line light source configured to project a pattern image on an object and perform, multiple times, exposure and reading by line scan for capturing an image of the object during a single cycle of the scan as projection of the pattern image to perform the scan as projection of the pattern image and the line scan as image capturing for the object in a direction different from those of other adjacent image processing apparatuses.

An information processing method of another aspect of the present technology is an information processing method including causing each of multiple image processing apparatuses configured to perform scan of a point light source or a line light source configured to project a pattern image on an object and perform, multiple times, exposure and reading by line scan for capturing an image of the object during a single cycle of the scan as projection of the pattern image to perform the scan as projection of the pattern image and the line scan as image capturing for the object in a direction different from those of other adjacent image processing apparatuses.

In the information processing apparatus and method of one aspect of the present technology, the scan of the point light source or the line light source configured to project the pattern image on the object is performed, and exposure and reading by the line scan for capturing the image of the object are performed multiple times during the single cycle of the scan as projection of the pattern image.

In the information processing apparatus and method of another aspect of the present technology, the scan as projection of the pattern image and the line scan as image capturing for the object are performed in the direction different from those of the other adjacent image processing apparatuses for each of the multiple image processing apparatuses configured to perform the scan of the point light source or the line light source configured to project the pattern image on the object and perform, multiple times, exposure and reading by the line scan for capturing the image of the object during the single cycle of the scan as projection of the pattern image.

Effects of the Invention

According to the present disclosure, information can be processed. Specifically, more information can be obtained without the need for a frame memory.

BRIEF DESCRIPTION OF DRAWINGS

FIGS. 4A, 4B, 4C, 4D, and 4E illustrate views for describing examples of wavelength bands for projection and image capturing.

FIGS. 5A, 5B, and 5C illustrate views for describing examples of a color filter of an image capturing unit.

FIGS. 8A, 8B, 8C, and 8D illustrate views for describing examples of a pattern image.

FIGS. 9A, 9B, 9C, and 9D illustrate views for describing examples of the pattern image.

FIG. 33 is a block diagram of a main configuration example of a computer.

MODE FOR CARRYING OUT THE INVENTION

Figure 1:
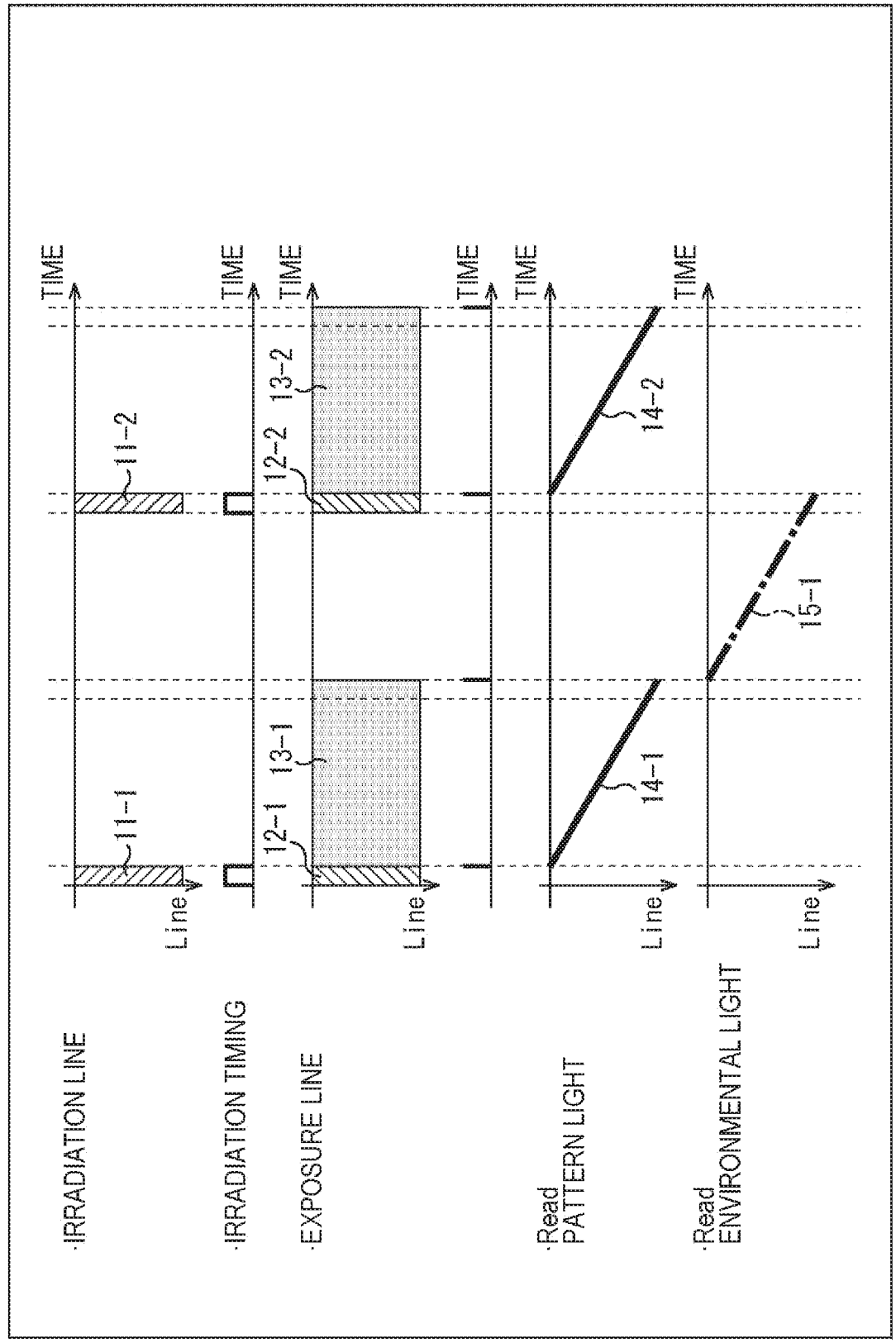
FIG. 1 illustrates a chart for describing an example of a state in projection and image capturing.

Hereinafter, modes (hereinafter referred to as "embodiments") for carrying out the present disclosure will be described. Note that description will be made in the following order:

1. Distance Measurement Technology;
2. First Embodiment (Image Processing Apparatus/Projection Single-Scan Image Capturing Single-Scan);
3. Second Embodiment (Image Processing Apparatus/Projection Single-Scan Image Capturing Multi-Scan);
4. Third Embodiment (Image Processing Apparatus/Projection Multi-Scan Image Capturing Multi-Scan);
5. Fourth Embodiment (Image Processing Apparatus/Projection Multi-Scan Image Capturing Multiple-Scan);
6. Fifth Embodiment (Image Processing Apparatus/Projection Single-Scan Image Capturing Multi-Apparatus);
7. Sixth Embodiment (Image Processing System); and
8. Other.

1. Distance Measurement Technology

<Typical Distance Measurement Technology>

Various distance measurement technologies have been studied in a computer vision field from long ago. A triangulation technology utilizing a disparity between two cameras similarly to human eyes and called passive stereo has been known as the most common technique. In the passive stereo, the accuracy of disparity estimation is directly linked to the accuracy of depth estimation. An accurate correspondence is not obtained for a flat portion or a repetitive pattern, and the disparity is not obtained. For this reason, there is a problem that distance measurement accuracy is degraded.

In recent years, an active distance measurement technology utilizing irradiation light to solve such a problem has attracted attention. For example, active stereo, time of flight (TOF), and structured light have been known as a main active distance measurement technology.

The active stereo and the structured light are both active stereo distance measurement technologies using the triangulation. Generally, the active stereo includes two cameras and a single projector, whereas the structured light includes a single camera and a single projector.

In the triangulation, a distance is obtained from the disparity between two points of view. In the passive stereo, a correspondence between two points of view is taken by, e.g., block matching, and in this manner, the disparity is obtained. In the structured light, a space coding method using a pattern image called a gray code is often used. That is, the pattern image is projected from the projector, and the projected pattern image is captured by the camera. In this manner, a pixel position relationship between the projector and the camera is obtained on the basis of the pattern image, and on the basis of the pixel position relationship, a distance to an object on which the pattern image is projected is measured by the triangulation. Using a gray code including multiple pattern images, a pixel position relationship in a predetermined direction (e.g., the horizontal direction) can be easily obtained from a pattern change.

Meanwhile, it has been recently considered that such a distance measurement distance is used in combination with the captured image. For example, it has been considered that the image of the object is captured, the distance to the object is measured (distance-measured) by the above-described structured light, and such a distance measurement result (i.e., the distance to the object) as depth information is utilized in combination with captured image data. For example, the depth of the object on the captured image can be set using the combination of the captured image and the depth information, and therefore, e.g., three-dimensional space formation (formation of a virtual space) for the captured image, generation of a stereoscopic image (formation of the disparity according to the depth), and image processing according to the depth (e.g., the object is more defocused or darkened as the object is positioned farther) can be performed. Such a combination of the captured image and the depth information can be utilized for various purposes, e.g., a game, a simulation, and the like.

For example, when image capturing (image capturing for the purpose of sensing) for obtaining the depth information and image capturing (image capturing for the purpose of imaging) for obtaining the captured image (brightness and color information) are performed by different cameras as described above, both image capturing positions are different from each other, and for this reason, matching (position adjustment) between the cameras is necessary. Thus, there is a probability that a processing load increases and a cost increases. When the image capturing for the purpose of sensing and the image capturing for the purpose of imaging as described above are performed by the same camera, not only an increase in the processing load can be suppressed, but also the number of devices (cameras) can be reduced. This can suppress an increase in the cost. Moreover, in the case of a low accuracy of matching between the cameras, textures shifted three-dimensionally are applied, but this problem can be easily avoided. Further, in the case of different points of view, a problem that a region (occlusion) which can be measured only from one point of view due to a screening object is caused and the correspondence cannot be obtained is caused in principle. However, this problem can be also reduced.

Meanwhile, e.g., a planar method for projecting an entire image (plane) at once, a line scan method for projecting an image on a line-by-line basis, a raster scan method for scanning a light point on a pixel-by-pixel basis, and the like are present as the method for projecting an image by a projector. For example, a projector configured to project an image by the planar method may include one using a liquid crystal display (LCD). Moreover, a projector configured to project an image by the line scan method or the raster scan method may include one using laser light, for example.

Moreover, e.g., a planar method for reading pixel values of all pixels (an entire plane) at once and a line scan method for reading pixel values on a line-by-line basis are present as the method for capturing an image by a camera. For example, in the case of a charge coupled device (CCD) image sensor or a global shutter complementary metal oxide semiconductor (CMOS) image sensor, an image is captured by the planar method. Moreover, in the case of, e.g., a rolling shutter CMOS image sensor, an image is captured by the line scan method.

For example, an example of a state in projection by the planar method and image capturing by the planar method is illustrated in FIG. 1. In the case of projection by the planar method, a projector projects, as illustrated at the uppermost line in FIG. 1, a predetermined image (a pattern image) for the purpose of sensing in a projection period 11-1 and a projection period 11-2.

Moreover, as illustrated at the second line from the top of FIG. 1, a camera performs periodical exposure in an exposure period 12-1 and an exposure period 13-1 for the projection period 11-1, and performs periodical exposure in an exposure period 12-2 and an exposure period 13-2 for the projection period 11-2.

A pixel value obtained in the exposure period 12-1 is read, and in this manner, a captured image of an object on which the pattern image has been projected in the projection period 11-1 is obtained. Moreover, a pixel value obtained in the exposure period 13-1 is read, and in this manner, a captured image of the object, on which no pattern image is projected, under environmental light is obtained. Similarly, a pixel value obtained in the exposure period 12-2 is read, and in this manner, a captured image of the object on which the pattern image has been projected in the projection period 11-2 is obtained. Moreover, a pixel value obtained in the exposure period 13-2 is read, and in this manner, a captured image of the object, on which no pattern image is projected, under the environmental light is obtained.

In the case of a general inexpensive image sensor, pixel value A/D conversion can be performed only on a line-by-line basis as illustrated at the third and fourth lines from the top of FIG. 1. That is, the pixel value obtained in the exposure period 12-1 is A/D-converted on a line-by-line basis as in line scan 14-1, the pixel value obtained in the exposure period 13-1 is A/D-converted on a line-by-line basis as in line scan 15-1, and the pixel value obtained in the exposure period 12-2 is A/D-converted on a line-by-line basis as in line scan 14-2. Similarly, the pixel value obtained in the exposure period 13-2 is also A/D-converted on a line-by-line basis (not shown).

That is, in the case of FIG. 1, the pixel value obtained in the exposure period 12-1 needs to be held at other locations than a pixel at least while the line scan 14-1 is being performed, and the pixel value obtained in the exposure period 12-2 needs to be held at other locations than a pixel at least while the line scan 14-2 is being performed. That is, a frame memory configured to hold at least a pixel value of a single frame is necessary. For this reason, it is difficult for the general rolling shutter CMOS image sensor to implement such processing, and the CCD image sensor or the global shutter CMOS image sensor is necessary. As a result, there has been a probability that the cost increases.

Note that in the case of performing image capturing by the line scan method for projection by the planar method, when the exposure period is shorter as compared to the projection period, such an exposure period is after the end of the image projection period, and for this reason, there has been a probability that a line for which image capturing cannot be performed with the pattern image being projected is caused.

Thus, as described in, e.g., Non-Patent Document 1, the method for performing projection and image capturing by the line scan method is conceivable. However, in the case of the method described in Non-Patent Document 1, image capturing is performed only once for single projection, and it is difficult to obtain more information.

2. First Embodiment

<Synchronize Image Capturing by Multiple Line Scan with Projection by Single Line Scan>

Thus, scan of a point light source or a line light source configured to project a pattern image on an object is performed, and during a single scan cycle as pattern image projection, exposure and reading by line scan for capturing an image of the object are performed multiple times. With this configuration, more information can be obtained without the need for a frame memory. Thus, a cost increase can be suppressed while more information can be obtained at lower cost. Note that as additional remarks, power consumption by projection increases unnecessarily when projection by a planar method is continued for a line scan period for image capturing, but an increase in such power consumption can be suppressed by projection performed by the scan of the point light source or the line light source as described above.

<Image Processing Apparatus>

Figure 2:
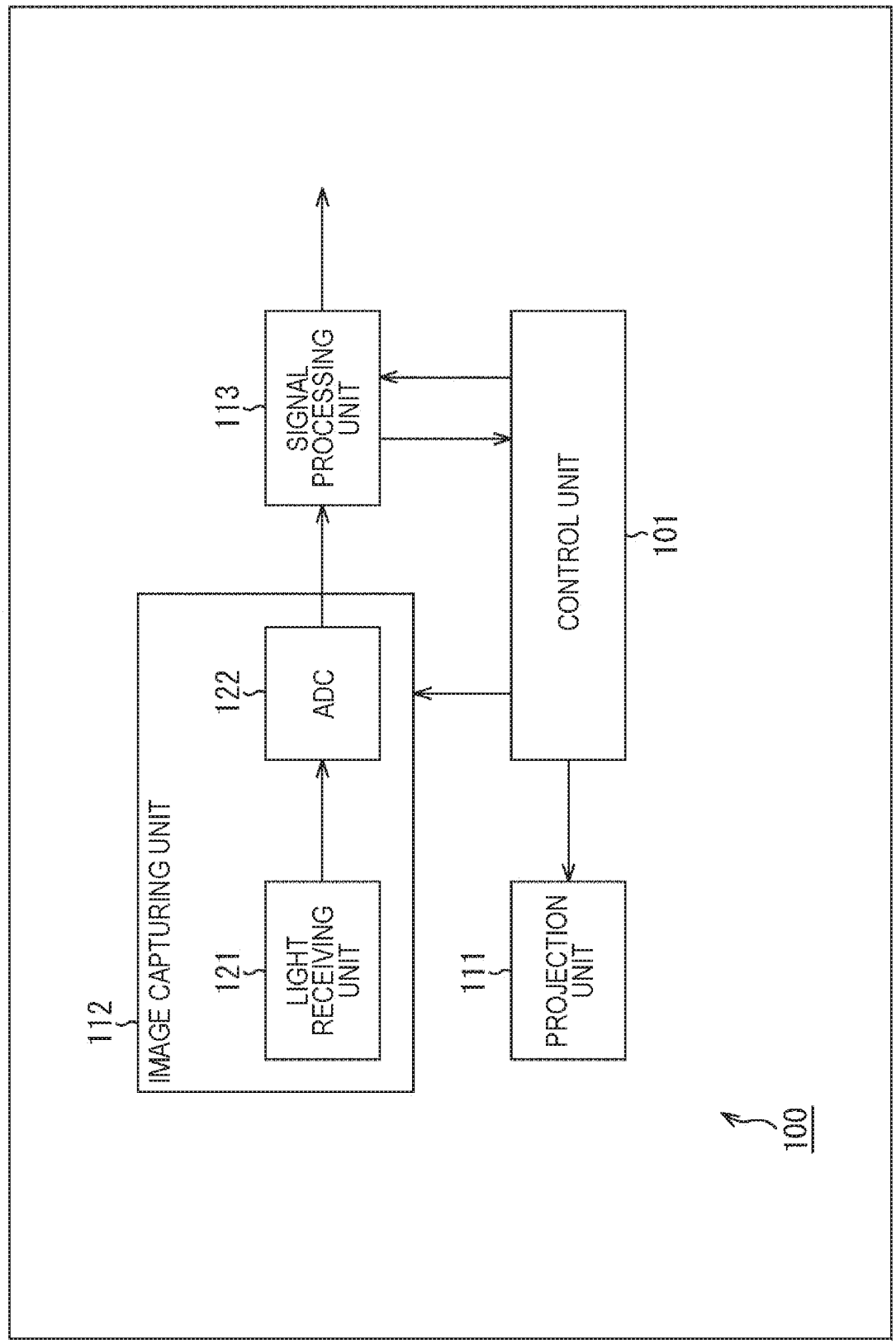
FIG. 2 illustrates a block diagram of a main configuration example of an image processing apparatus.

FIG. 2 is a block diagram of a main configuration example of an image processing apparatus as one embodiment of an information processing apparatus to which the present technology is applied. In FIG. 1, the image processing apparatus 100 is an apparatus configured to perform processing regarding measurement (distance measurement) of a distance to the object. For example, the image processing apparatus 100 captures the image of the object, measures (distance-measures) the distance to the object by the above-described structured light, and outputs such a distance measurement result (i.e., the distance to the object) as depth information in combination with captured image data.

As illustrated in FIG. 2, the image processing apparatus 100 has a control unit 101, a projection unit 111, an image capturing unit 112, and a signal processing unit 113. The control unit 101 includes, for example, a central processing unit (CPU), a read only memory (ROM), a random access memory (RAM), and the like. The CPU executes, e.g., a program or the like stored in the ROM or a program or the like loaded in the RAM so that an optional type of processing can be executed. For example, the control unit 101 performs processing regarding the control of each unit (the projection unit 111 to the signal processing unit 113) of the image processing apparatus 100.

The projection unit 111 is controlled by the control unit 101, and performs processing regarding image projection. For example, the projection unit 111 projects the pattern image as an image used for image capturing for the purpose of sensing and having a predetermined picture.

The projection unit 111 projects, for example, the image by raster scan for each pixel or the line scan for performing image projection on a line-by-line basis. For example, the projection unit 111 performs scanning with laser light to project the image on a line-by-line basis. Alternatively, the projection unit 111 may perform, for example, the scan as projection by means of a phased array for increasing irradiation of a desired line by means of interference between beams from multiple laser sources. Alternatively, for example, the number of pattern images, which show different pictures for a single line and do not show (e.g., blacken) other line pictures, corresponding to the number of lines may be prepared, and the projection unit 111 may project, one by one, the group of these pattern images by the planar method for projecting an entire image (plane) at once. For example, such projection may be implemented using a vertical cavity surface emitting laser (VCSEL). Hereinafter, projection by the raster scan will be described by way of example, but the projection method of the present technology is not limited to the raster scan as described above.

The image capturing unit 112 is controlled by the control unit 101, and performs processing regarding image capturing. For example, the image capturing unit 112 performs the image capturing (image capturing for obtaining the depth information) for the purpose of sensing and image capturing (image capturing for obtaining a captured image (brightness and color information)) for the purpose of imaging. The image capturing unit 112 has, for example, a light receiving unit 121 and an analog digital converter (an AD converter (ADC)) 122. The light receiving unit 121 has multiple pixels, and at each pixel, photoelectrically converts incident light from the outside and accumulates the amount of charge corresponding to the amount of incident light. The light receiving unit 121 supplies, as a pixel value, an electric signal corresponding to the charge amount of each pixel to the AD converter 122. The AD converter 122 A/D-converts the pixel value (the electric signal) of each pixel supplied from the light receiving unit 121, and as digital data, supplies the resultant to the signal processing unit 113.

The image capturing unit 112 (the light receiving unit 121) captures the image of the object by the line scan for performing image capturing on a line-by-line basis, for example. For example, the light receiving unit 121 includes a rolling shutter CMOS image sensor more inexpensive than a global shutter CMOS image sensor. The light receiving unit 121 has no frame memory, and reads, as the pixel value, the electric signal corresponding to the charge accumulated at each pixel of a pixel array on a line-by-line (row-by-row) basis and sequentially supplies the electric signal to the AD converter 122.

The AD converter 122 A/D-converts the pixel value (the electric signal) of each pixel supplied from the light receiving unit 121 (on a line-by-line basis) on a line-by-line basis. The AD converter 122 may include, for example, a single-input single-output AD converter configured to A/D-convert, on a pixel-by-pixel basis, the read pixel values of each line, or may include an AD converter (a column A/D) provided for each column of the pixel array of the light receiving unit 121. In this case (the case of the column A/D), the AD converter 122 can simultaneously A/D-convert the read pixel values of each line. The AD converter 122 supplies, on a line-by-line basis, the A/D-converted pixel values as digital data to the signal processing unit 113.

The signal processing unit 113 includes, for example, a central processing unit (CPU), a read only memory (ROM), a random access memory (RAM), and the like. The CPU executes, e.g., a program or the like stored in the ROM or a program or the like loaded in the RAM so that an optional type of processing can be executed. For example, the signal processing unit 113 is controlled by the control unit 101, and performs processing regarding processing for the pixel value (the digital data) supplied from the image capturing unit 112 (the AD converter 122). For example, the signal processing unit 113 generates the depth information on the basis of the digital data supplied from the image capturing unit 112, and generates the captured image data for the purpose of acquiring the brightness and color information. The signal processing unit 113 outputs a signal processing result (e.g., the generated depth information, the generated captured image data, and the like) to the outside of the image processing apparatus 100.

Note that the signal processing unit 113 can supply, as necessary, an optional type of information such as the signal processing result and information used for signal processing to the control unit 101. The control unit 101 can perform the control of each processing unit on the basis of the information supplied from the signal processing unit 113.

<Control of Projection and Image Capturing>

The control unit 101 controls the projection unit 111 to project the image of the object by the raster scan method, and controls the image capturing unit 112 to capture the image of the object multiple times by the line scan method during a single cycle of image projection.

Figure 3:
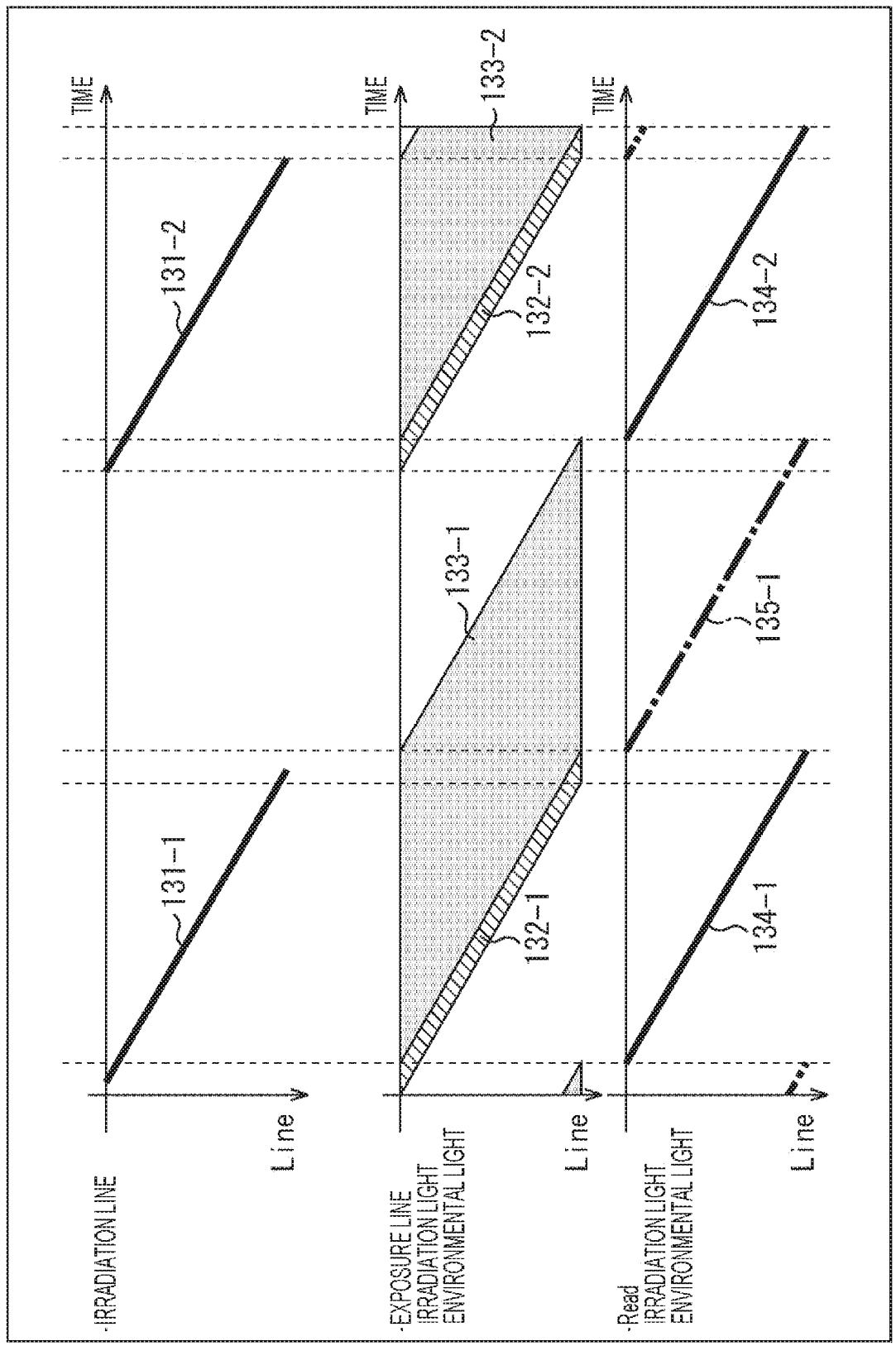
FIG. 3 illustrates a chart for describing an example of the state in projection and image capturing.

An example of a state in such projection and such image capturing is illustrated in FIG. 3. The control unit 101 controls each processing unit such that projection and image capturing are performed as illustrated in FIG. 3. That is, as illustrated at the uppermost line in FIG. 3, the control unit 101 causes, as in raster scan 131-1 and raster scan 131-2, the single projection unit 111 to project the pattern image with the predetermined picture on the object by the raster scan.

Then, the control unit 101 causes the single image capturing unit 112 configured to read the pixel values on a line-by-line basis to capture the image of the object multiple times (e.g., twice) by the line scan method during the single cycle of projection. For example, during a single cycle of the raster scan as pattern image projection, the control unit 101 causes the image capturing unit 112 to perform exposure and reading as the image capturing for imaging and exposure and reading as the image capturing for sensing.

More specifically, as illustrated at the second and third lines from the top of FIG. 3, the control unit 101 causes the image capturing unit 112 to perform, during the above-described raster scan for projection, exposure (e.g., an exposure period 133-1 and an exposure period 133-2) and reading (e.g., line scan 135-1) as the image capturing for the purpose of imaging and exposure (e.g., an exposure period 132-1 and an exposure period 132-2) and reading (e.g., line scan 134-1 and line scan 134-2) as the image capturing for the purpose of sensing.

At this point, reading (e.g., the line scan 134-1 or the line scan 134-2) as the image capturing for the purpose of sensing is performed at timing at which the captured image (a sensing result) of the object on which the pattern image has been projected is obtained. That is, the control unit 101 controls projection and image capturing such that the raster scan (e.g., the raster scan 131-1 or the raster scan 131-2) for projection is performed during an exposure period (e.g., the exposure period 132-1 or the exposure period 132-2) for the purpose of sensing. The control unit 101 performs the control as described above so that the image capturing unit 112 can capture the pattern image projected for each line by the raster scan without unnecessarily increasing the exposure period. Thus, the image capturing unit 112 can reduce other types of influence on the image capturing for the purpose of sensing, such as environmental light, and can obtain more accurate depth information.

Note that the exposure period for each line in exposure (e.g., the exposure period 132-1 or the exposure period 132-2) as the image capturing for the purpose of sensing may include a corresponding line of the raster scan 131-1, and to that extent, can be shortened as much as possible. That is, the timing of the line scan 134-1 or the line scan 134-2 may approach the timing of the raster scan 131-1 or the raster scan 131-2 as much as possible. As this exposure period becomes shorter, the image capturing unit 112 can more reduce other types of influence on the image capturing for the purpose of sensing, such as the environmental light, and can obtain more accurate depth information. For example, the scan (e.g., the line scan 134-1 or the line scan 134-2) for reading as the image capturing for the purpose of sensing may take, as a processing target, the same line (row) as each line for the scan (e.g., the raster scan 131-1 or the raster scan 131-2) as projection.

Moreover, the control unit 101 causes the line scan (e.g., the line scan 134-1 or the line scan 134-2) as the image capturing for the purpose of sensing to be performed at timing not overlapping with the line scan (e.g., the line scan 135-1) as the image capturing for the purpose of imaging. The control is made as described above so that both of the image capturing for the purpose of sensing and the image capturing for the purpose of imaging can be performed by the single image capturing unit 112 performing image capturing by the line scan method.

For example, the control unit 101 causes the image capturing unit 112 to repeat the line scan to alternately perform reading as the image capturing for the purpose of imaging and reading as the image capturing for the purpose of sensing by each line scan. Then, the control unit 101 causes the projection unit 111 to perform the raster scan as pattern image projection at the timing according to the line scan for reading as the image capturing for the purpose of sensing as described above. The control is made as described above so that the control unit 101 can cause the image capturing unit 112 to perform exposure and reading as the image capturing for sensing at the above-described timing. That is, by the single image capturing unit 112, both of the image capturing for the purpose of sensing and the image capturing for the purpose of imaging can be performed. Note that the control unit 101 performs the control such that each line scan as image capturing is continuously performed, and therefore, the projection cycle can be more shortened. That is, the present technology is applicable to higher-speed image projection.

Note that the exposure period for each line as the image capturing for the purpose of imaging can be optionally set to such an extent that such an exposure period does not overlap with the exposure period for such a line as the image capturing for the purpose of sensing. For example, for each line, exposure as the image capturing for the purpose of imaging may begin right after previous reading as the image capturing for the purpose of sensing has ended (i.e., continuously to previous exposure as the image capturing for the purpose of sensing). Alternatively, for each line, exposure as the image capturing for the purpose of imaging may begin with a predetermined period after previous reading as the image capturing for the purpose of sensing has ended (i.e., not continuously to previous exposure as the image capturing for the purpose of sensing) In the case of the image capturing for the purpose of imaging, a higher-quality captured image can be generally obtained as the exposure period increases.

As described above, the control unit 101 controls the line scan for projection and image capturing so that information for the purpose of sensing and information for the purpose of imaging can be obtained for each line scan for projection. Moreover, projection and image capturing both employ the line scan method, and therefore, an extra frame memory is not necessary without the need for holding pixel values of a single frame or more. That is, more information can be obtained without the need for the frame memory. Note that the frame memory is not necessary, and therefore, a cost increase can be suppressed.

<Wavelength Bands for Projection and Image Capturing>

Note that the wavelength band of the pattern image to be projected by the projection unit 111 is optional. Moreover, a wavelength band for image capturing by the image capturing unit 112 is also optional. Such projection and such image capturing may be performed in a single color, or may be performed in multiple colors.

Figures 4A, 4B, 4C, 4D, 4E:
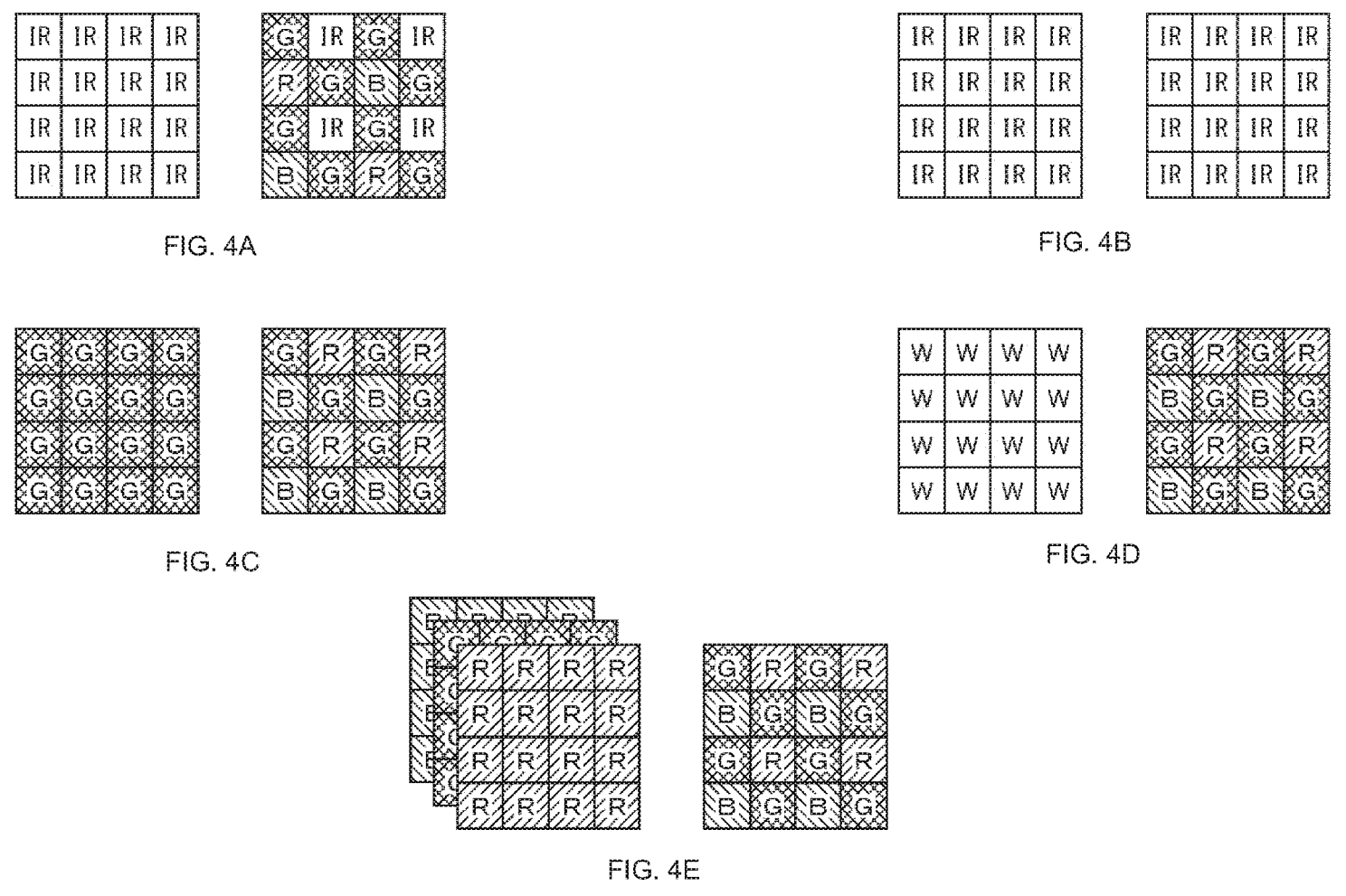

For example, as illustrated at the left of FIG. 4A, the projection unit 111 may project the pattern image with infrared light (IR). As illustrated at the right of FIG. 4A, the image capturing unit 112 may perform image capturing with the infrared light (IR), red light (R), green light (G), and blue light (B).

Alternatively, as illustrated at the left of FIG. 4B, the projection unit 111 may project, for example, the pattern image with the infrared light (IR). As illustrated at the right of FIG. 4B, the image capturing unit 112 may perform image capturing with the infrared light (IR).

Alternatively, as illustrated at the left of FIG. 4C, the projection unit 111 may project, for example, the pattern image with the green light (G). As illustrated at the right of FIG. 4C, the image capturing unit 112 may perform image capturing with the red light (R), the green light (G), and the blue light (B).

Alternatively, as illustrated at the left of FIG. 4D, the projection unit 111 may project, for example, the pattern image with white light (W) (i.e., a brightness value). As illustrated at the right of FIG. 4D, the image capturing unit 112 may perform image capturing with the red light (R), the green light (G), and the blue light (B).

Alternatively, as illustrated at the left of FIG. 4E, the projection unit 111 may project, for example, the pattern image in each color of the red light (R), the green light (G), and the blue light (B). As illustrated at the right of FIG. 4E, the image capturing unit 112 may perform image capturing with the red light (R), the green light (G), and the blue light (B).

Alternatively, the wavelength bands for such projection and such image capturing may be variable. For example, the wavelength bands for projection and image capturing can be adaptively set according to, e.g., the object and the environmental light.

<Color Filter>

Moreover, an array of a color filter of each pixel of the image capturing unit 112 (the light receiving unit 121) is optional. For example, as illustrated in FIG. 5A, a filter allowing transmission of the infrared light (IR), a filter allowing transmission of the red light (R), a filter allowing transmission of the green light (G), and a filter allowing transmission of the blue light (B) may be provided at the pixels of the image capturing unit 112 (the light receiving unit 121) in an array with a priority to a resolution in the image capturing for the purpose of imaging.

Figures 5A, 5B, 5C:
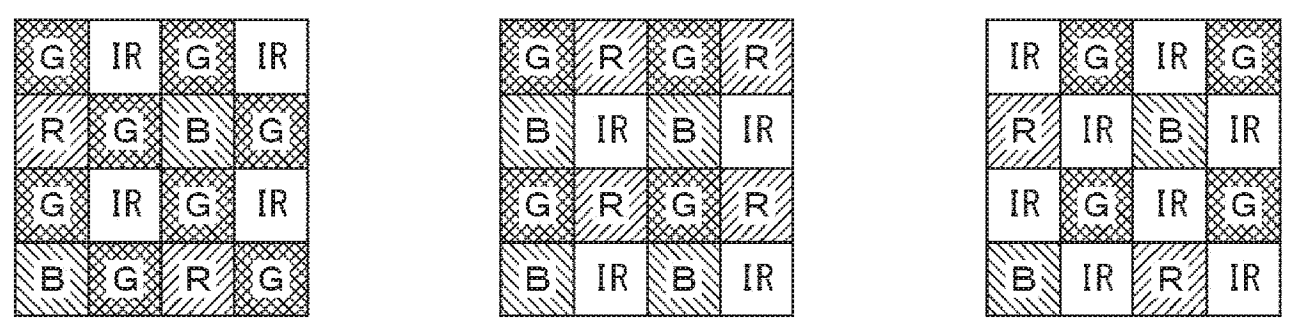

Alternatively, as illustrated in FIG. 5B, the filter allowing transmission of the infrared light (IR), the filter allowing transmission of the red light (R), the filter allowing transmission of the green light (G), and the filter allowing transmission of the blue light (B) may be, for example, provided at the pixels of the image capturing unit 112 (the light receiving unit 121) in an array with a priority to color reproduction in the image capturing for the purpose of imaging. Alternatively, as illustrated in FIG. 5C, the filter allowing transmission of the infrared light (IR), the filter allowing transmission of the red light (R), the filter allowing transmission of the green light (G), and the filter allowing transmission of the blue light (B) may be, for example, provided at the pixels of the image capturing unit 112 (the light receiving unit 121) in an array with a priority to the image capturing for the purpose of sensing.

Figure 6:
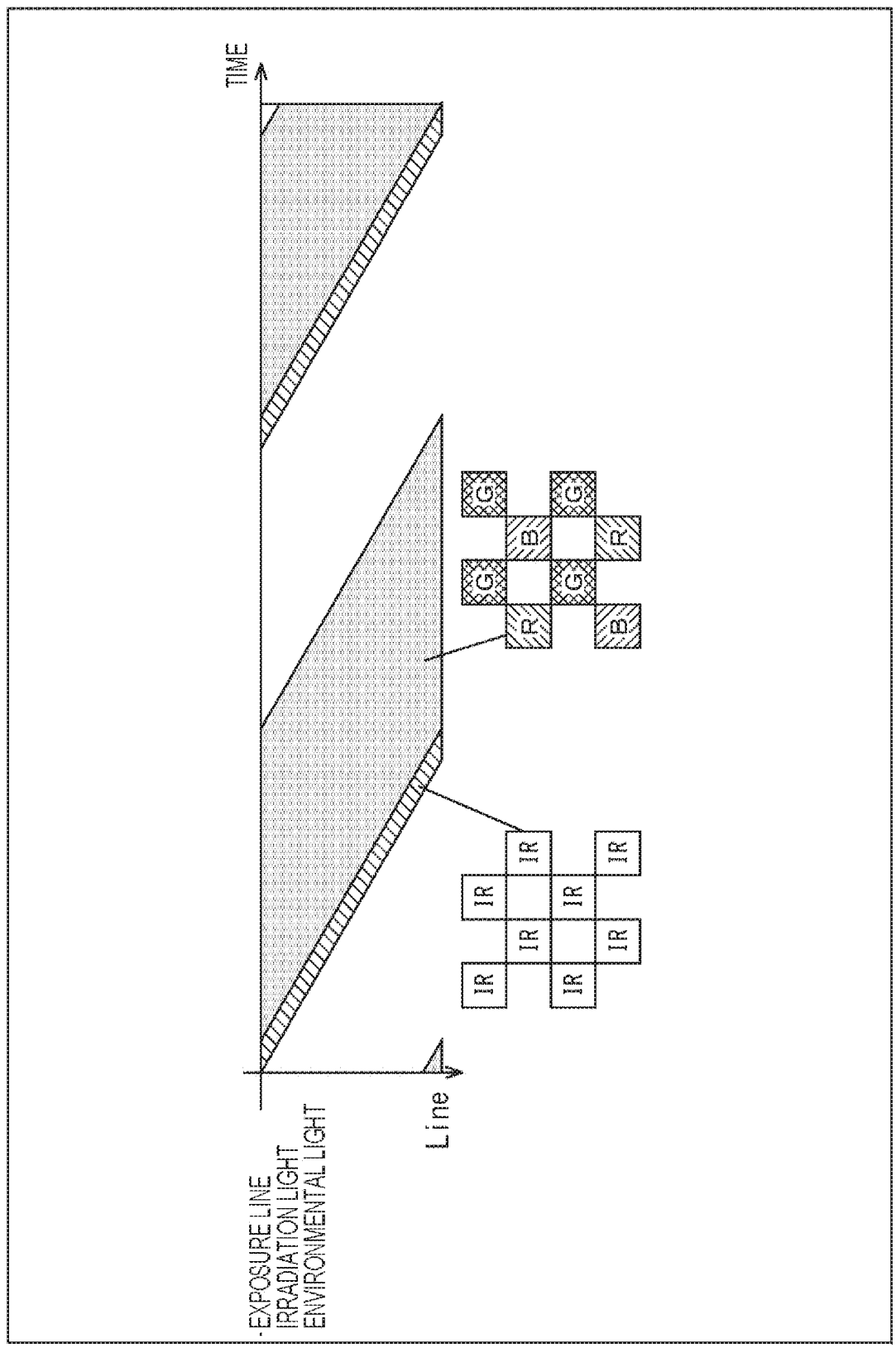
FIG. 6 illustrates a chart for describing an example of the state in image capturing.

Moreover, a wavelength band to be captured (received) by the image capturing unit 112 (the light receiving unit 121) may be switched between the image capturing for the purpose of imaging and the image capturing for the purpose of sensing. For example, as illustrated in FIG. 6, the control unit 101 may perform the control to drive the pixels receiving the red light (R), the pixels receiving the green light (G), and the pixels receiving the blue light (B) in the image capturing unit 112 (the light receiving unit 121) and stop drive of other pixels in the image capturing for the purpose of imaging and to drive the pixels of the image capturing unit 112 (the light receiving unit 121) receiving the infrared light and stop drive of other pixels in the image capturing for the purpose of sensing. With this configuration, the image capturing unit 112 (the light receiving unit 121) can perform the image capturing for the purpose of imaging and the image capturing for the purpose of sensing with variable wavelength bands. Moreover, the control unit 101 controls, as described above, pixel drive of the image capturing unit 112 (the light receiving unit 121) to drive only the pixels necessary for image capturing, and therefore, drive of the pixels unnecessary for image capturing can be stopped. Thus, an increase in unnecessary power consumption can be suppressed.

<Signal Processing>

The contents of the signal processing by the signal processing unit 113 are optional. For example, the signal processing unit 113 may generate the captured image of the object on the basis of the information (e.g., the pixel value) obtained by the image capturing for the purpose of imaging. For example, the signal processing unit 113 may perform, for a RAW image (the pixel value) of the object obtained by the image capturing for the purpose of imaging by the image capturing unit 112, the demosaic processing of generating pixel values with multiple wavelength bands for each pixel position to generate a captured image for each wavelength band or the remosaic processing of generating a pixel value with a single wavelength band for each pixel position to generate a single captured image configured such that pixel values with multiple wavelength bands are mixed.

Alternatively, the signal processing unit 113 may generate, for example, the depth information indicating the distance to the object (the depth of the object) on the basis of the information (e.g., the pixel value) obtained by the image capturing for the purpose of sensing. For example, the signal processing unit 113 may obtain the depth of the object by, e.g., triangulation on the basis of a RAW image (the pixel value) of the object, on which the predetermined pattern image has been projected by the projection unit 111, obtained by the image capturing for the purpose of sensing by the image capturing unit 112 or a sensing result obtained in such a manner that predetermined image processing such as the demosaic processing or the remosaic processing is performed for the RAW image.

Figure 7A:
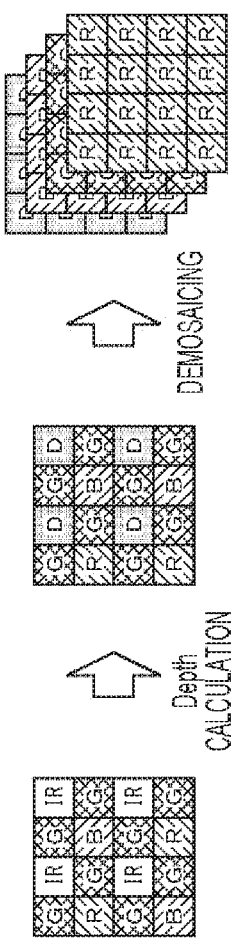
FIGS. 7A, 7B, and 7C illustrate views for describing examples of a state in signal processing.

Note that the order of these types of processing is optional. For example, as illustrated in FIG. 7A, the signal processing unit 113 may calculate the depth information from the RAW image (a RGBIR image configured such that a red component, a green component, a blue component, and an infrared component are mixed), generate a RGBD image configured such that the red component, the green component, the blue component, and the depth information are mixed, and perform the demosaic processing for the RGBD image to generate the depth information, a R image including the red component, a G image including the green component, and a B image including the blue component.

Figure 7B:
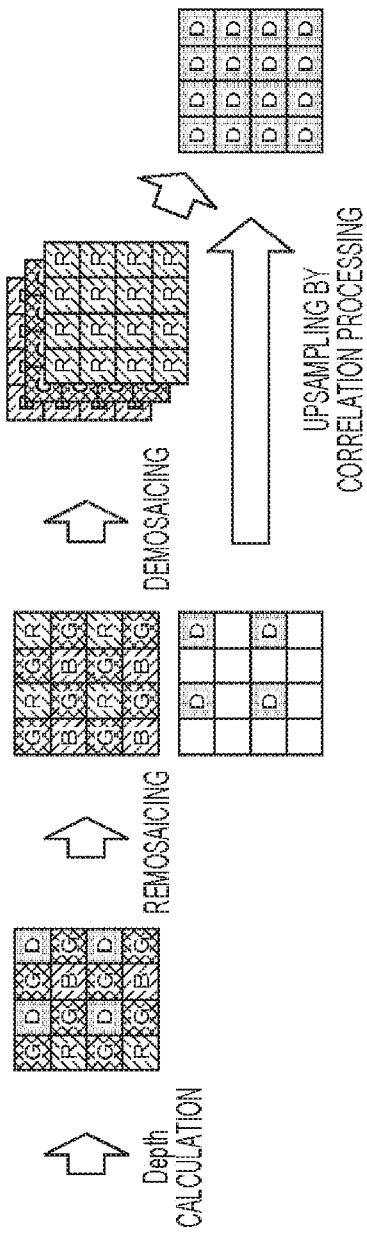

Alternatively, as illustrated in FIG. 7B, the signal processing unit 113 may calculate, for example, the depth information from the RGBIR image to generate the RGBD image, perform the remosaic processing for the RGBD image to generate a RGB image configured such that the red component, the green component, and the blue component are arranged in a Bayer array and the depth information, perform the demosaic processing for the RGB image to generate the R image, the G image, and the B image, and further perform upsampling by correlation processing for the depth information.

Figure 7C:
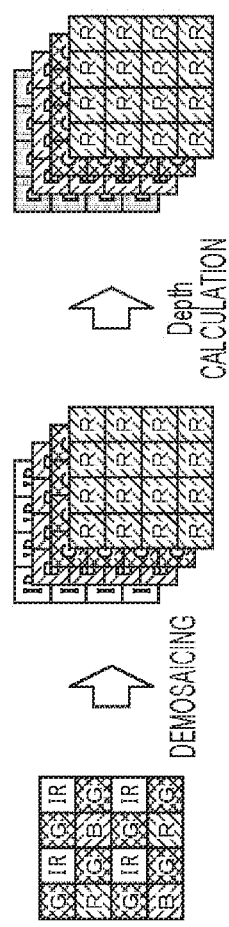

Alternatively, as illustrated in FIG. 7C, the signal processing unit 113 may perform, for example, the demosaic processing for the RGBIR image to generate an IR image including the infrared component, the R image, the G image, and the B image, and calculate the depth information from the IR image.

<Pattern Image>

Note that the pattern image to be projected by the projection unit 111 for the image capturing for the purpose of sensing may be any image. For example, the control unit 101 may cause the projection unit 111 to project a single predetermined pattern image. For example, as illustrated in FIG. 8A, a pattern image configured such that a white or black pattern is embedded in a grid point of a checker flag design may be employed. This pattern image is a pattern image configured such that the checker flag design indicates a focused pattern position (the grid point) and configured so that the pixel position can be identified by the pattern (white or black) embedded in the grid point.

Alternatively, the control unit 101 may cause the projection unit 111 to sequentially project multiple predetermined pattern images. For example, the control unit 101 may cause the projection unit 111 to project a gray code including multiple pattern images as illustrated in FIG. 8B. The gray code is a pattern image configured so that the pixel position can be identified by a white-black combination of each pattern image.

Alternatively, the control unit 101 may cause, for example, the projection unit 111 to sequentially project a pair of two pattern images having the same design and subjected to white-black reversal (negative-positive reversal) as illustrated in FIG. 8C. The pixel position can be identified by these two pattern images subjected to the negative-positive reversal. Thus, the depth information can be obtained at higher speed as compared to the case of using the gray code. That is, the temporal resolution of the depth information can be improved. Note that by performing distance measurement with such negative-positive reversed pattern images being projected, influence of the texture (e.g., the design) of the object on the pattern image can be reduced. That is, the depth information can be more accurately obtained.

Alternatively, the control unit 101 may cause, for example, the projection unit 111 to sequentially perform projection while the phase of a pattern sinusoidally changing the brightness value according to the pixel position is being changed (phase shift) as illustrated in FIG. 8D. For example, in the case of using a sinusoidal wave, the pixel position can be identified by three images. Thus, the depth information can be obtained at higher speed as compared to the case of using the gray code. That is, the temporal resolution of the depth information can be improved.

Note that in the case of projecting the multiple pattern images, the size of the design of each pattern image may be different among these pattern images. For example, the control unit 101 may cause the projection unit 111 to sequentially project a pair of two pattern images sinusoidally changing the brightness value according to the pixel position and being different from each other in a sinusoidal wave cycle as illustrated in FIG. 9A. The pixel position can be more accurately identified by these two pattern images. That is, the spatial resolution of the depth information can be improved.

Alternatively, in the case of projecting the multiple pattern images, the picture (the design) of each pattern image may be totally different among these pattern images. For example, the control unit 101 may cause the projection unit 111 to sequentially project a pair of two pattern images totally different from each other in a picture (a design) as illustrated in FIG. 9B. Using these two pattern images, the pixel position can be identified by multiple methods. Thus, the pixel position can be more accurately identified. That is, the spatial resolution of the depth information can be improved.

Alternatively, in the case of projecting the multiple pattern images, the positions of the pictures (the designs) of these pattern images may be shifted from each other. For example, the control unit 101 may cause the projection unit 111 to sequentially project a pair of two pattern images sinusoidally changing the brightness value according to the pixel position and being different from each other in a sinusoidal wave phase as illustrated in FIG. 9C. The pixel position can be more accurately identified by these two pattern images. That is, the spatial resolution of the depth information can be improved.

Alternatively, in the case of projecting the multiple pattern images, the intensity of the light source of the projection unit 111 upon projection of each pattern image may vary. For example, as illustrated in FIG. 9D, the projection unit 111 may project the pattern image with the light intensity of the light source being decreased in first projection (the left of FIG. 9D), and may project the pattern image with the light intensity of the light source being increased in second projection (the right of FIG. 9D).

When the brightness value of the pattern image is too great, there is a probability that the pixel value obtained by the image capturing for the purpose of sensing is saturated. On the other hand, when the brightness value of the pattern image is too small, there is a probability that the pixel value obtained by the image capturing for the purpose of sensing is too small and the pattern is erroneously determined. Thus, the light intensity of the light source upon pattern image projection is variable so that the pixel value obtained by the image capturing for the purpose of sensing can be controlled to a proper level and the depth information can be more accurately obtained.

For example, in a case where the position of the object in a depth direction is close to the image capturing unit 112, more projection light of the pattern image is reflected on the object, and easily reaches the image capturing unit 112. Thus, in the case of the close object, the pixel value obtained by the image capturing for the purpose of sensing is easily saturated. Conversely, in a case where the position of the object in the depth direction is far from the image capturing unit 112, less projection light of the pattern image is reflected on the object, and such light less easily reaches the image capturing unit 112. That is, in the case of the far object, the pixel value obtained by the image capturing for the purpose of sensing tends to be small, and erroneous determination of the pattern easily occurs.

For these reasons, the depth of the far object may be obtained using the pattern image projected with the light intensity of the light source being increased, and the depth of the close object may be obtained using the pattern image projected with the light intensity of the light source being decreased. In other words, the pattern image is, as described above, projected with the light intensity of the light source being changed, and therefore, a distance measurable area can be variable. That is, this configuration can more accurately distance-measure the object across a broader area.

Specifically, in the case of the pattern image for distance measurement by means of the brightness value (an analog value) of the pattern, the pixel value is easily saturated. Thus, the light intensity of the light source is variable as described above so that distance measurement can be more accurately performed.

Moreover, projection and image capturing of the pattern image are susceptible to influence of the environmental light (external light). Thus, according to, e.g., a peripheral brightness, the light intensity of the light source upon projection of the pattern image may be controlled. With this configuration, resistance against the environmental light (the external light) is increased, and distance measurement can be more accurately performed.

Note that for more broadening the distance measurable area, scan synchronization timing upon projection of the pattern image may be variable. As a result of a manufacturing error, there is a probability that optimal scan timing is shifted according to the object distance. An offset value of the scan synchronization timing may be set according to a focus position (the depth). With this configuration, distance measurement can be more accurately performed.

Further, for reducing influence (influence due to multipath) on pattern determination due to receiving of light from the object through different paths, distance measurement may be performed with high-frequency images with different phases being projected as the pattern images.

<Moving Body Determination>

In the case of irradiating the multiple pattern images, it takes time for distance measurement. Thus, in a case where the object includes a moving body, there is a probability that distance measurement cannot be accurately performed. For this reason, it may be determined which object is the moving body so that such an (moving) object can be excluded from a distance measurement target.

In the case of projecting the multiple pattern images with different designs, i.e., when the contents of the pattern have changed, it is difficult to perform moving body determination by comparison of these captured images. For example, in the case of projecting the pattern images subjected to the negative-positive reversal as in an example of FIG. 10, even when these captured images are compared to each other, a negative-positive difference and a moving body difference are not distinguished, and therefore, moving body determination cannot be accurately performed.

Figure 10:
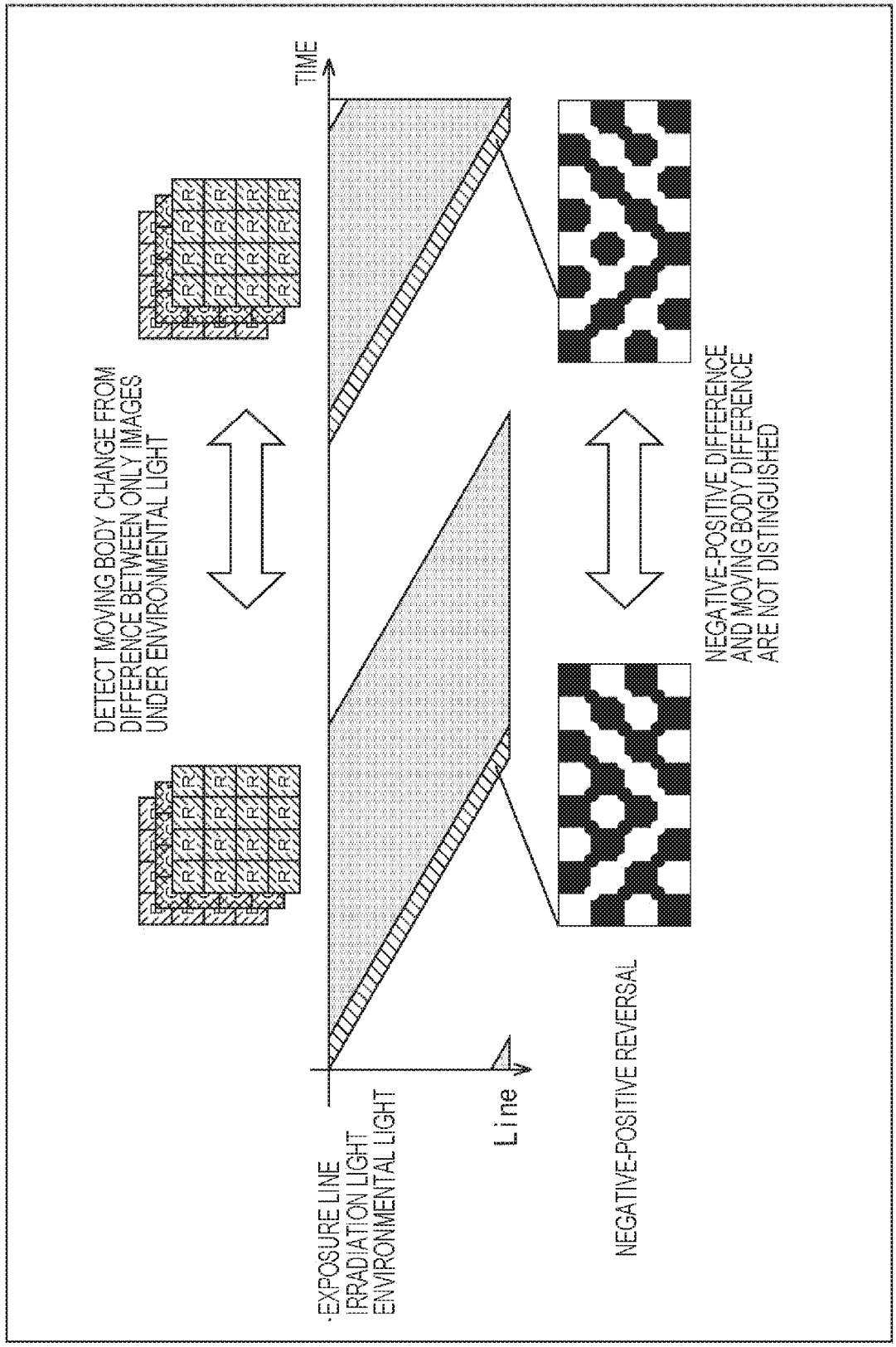
FIG. 10 illustrates a chart for describing an example of a moving body detection method.

For this reason, as illustrated in FIG. 10, the signal processing unit 113 may perform moving body determination on the basis of the image of the object under the environmental light, i.e., the captured image obtained by the image capturing for the purpose of imaging, and on the basis of such a moving body determination result, the depth information on the object may be generated.

Figure 11:
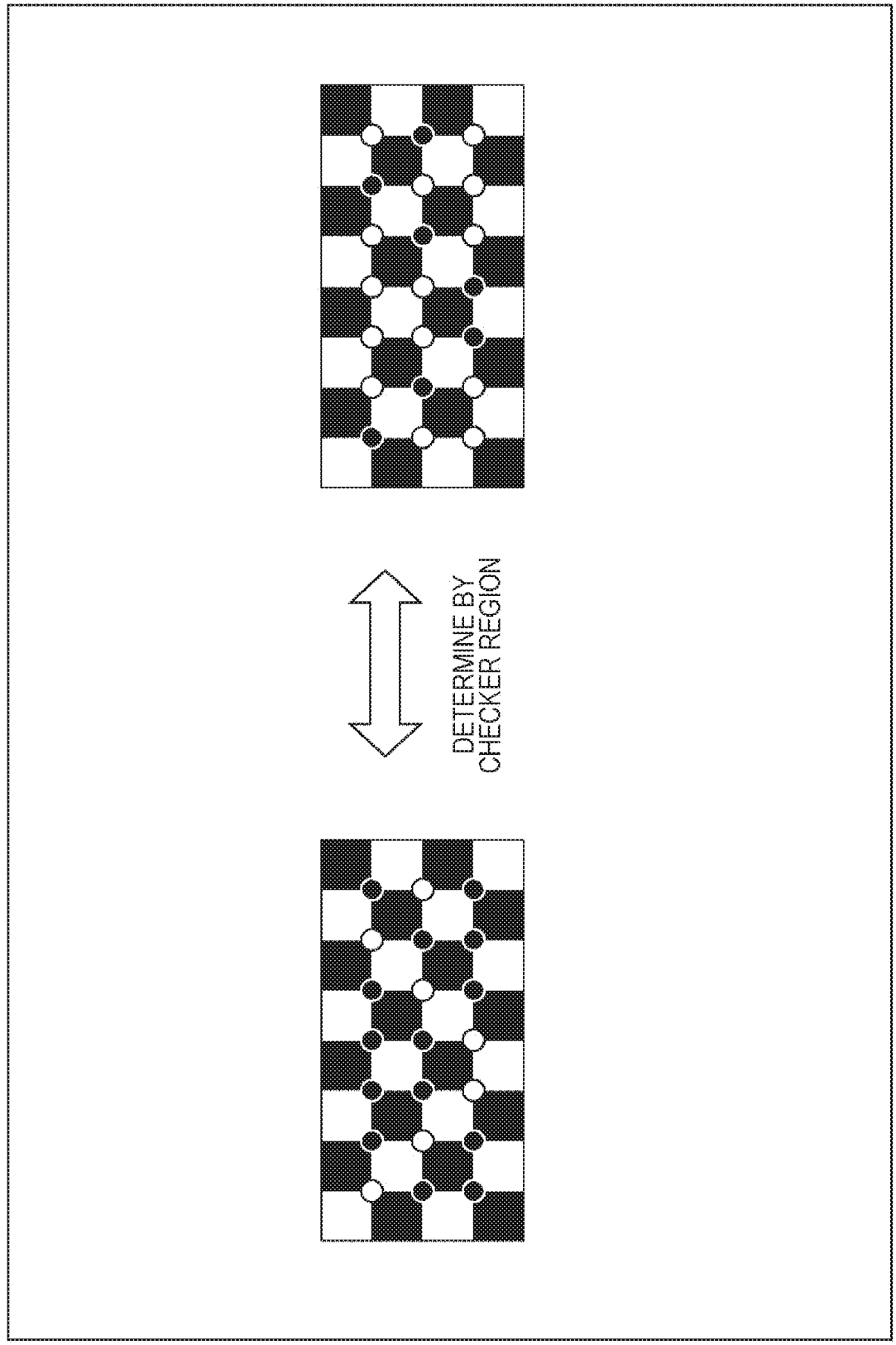
FIG. 11 illustrates a view for describing an example of the moving body detection method.

Alternatively, as in an example illustrated in FIG. 11, multiple predetermined pattern images having the same picture in partial regions may be, for example, sequentially projected. That is, the multiple pattern images sequentially projected as described above may have the same picture in the partial regions. Then, the signal processing unit 113 may perform moving body determination by comparison of the partial region having the same picture among the captured images, and on the basis of such a moving body determination result, may generate the depth information on the object.

For example, in the case of the example of FIG. 11, a pair of two pattern images to be projected is the same without a checker flag design being subjected to the white-black reversal, and only a white or black pattern arranged at a grid point of the checker flag design is subjected to the white-black reversal. These pattern images are sequentially projected, and the image capturing for the purpose of sensing is performed. In this case, since the same checker flag design is employed, the signal processing unit 113 can perform moving body determination in such a checker flag design region by comparison between these captured images.

Moving body determination is used as described above so that the signal processing unit 113 can more accurately obtain the depth information.

<Flow of Image Processing>

Next, an example of the flow of the image processing executed by the image processing apparatus 100 as described above will be described with reference to a flowchart of FIG. 12.

When the image processing begins, the control unit 101 controls, at step S101, the image capturing unit 112 to capture the image of the object under the environmental light by line scan reading at timing not overlapping with reading for sensing for other lines. According to such control of the control unit 101, the image capturing unit 112 performs line scan-like exposure and line scan reading as the image capturing for the purpose of imaging.

At step S102, the projection unit 111 is controlled to project the pattern image as a sensing image by the raster scan. According to such control of the control unit 101, the projection unit 111 projects the predetermined pattern image on the object by the raster scan.

At step S103, the control unit 101 controls the image capturing unit 112 to capture the image of the object, on which the above-described pattern image has been projected, by exposure and reading in the exposure period set in a line scan manner, such an exposure period including (the raster scan of) projection of step S102. According to such control of the control unit 101, the image capturing unit 112 performs line scan-like exposure and line scan reading as the image capturing for the purpose of sensing. Note that such exposure is performed at timing at which the pattern image is projected on the object in the exposure period. Moreover, the line scan for reading is performed at timing not overlapping with the line scan for reading as the image capturing for the purpose of imaging.

At step S104, the control unit 101 controls the signal processing unit 113 to generate the depth information from the sensing RAW image obtained by the image capturing for the purpose of sensing at step S103. That is, according to such control of the control unit 101, the signal processing unit 113 generates the depth information from the pixel value obtained in such a manner that the image of the object on which the pattern image has been projected is captured.

At step S105, the control unit 101 controls the signal processing unit 113 to generate the captured image from the imaging RAW image obtained by the image capturing for the purpose of imaging at step S102. That is, according to such control of the control unit 101, the signal processing unit 113 performs, e.g., the demosaic processing to generate the captured image from the pixel value obtained in such a manner that the image of the object under the environmental light is captured.

At step S106, the control unit 101 controls the signal processing unit 113 to output the depth information generated at step S104 and the captured image generated at step S105 with the depth information and the captured image being linked to each other. That is, according to such control of the control unit 101, the signal processing unit 113 outputs the depth information and the captured image data associated with each other. Note that a term "associate" as described herein means, for example, that when one data is processed, the other data can be utilized (linked). That is, data pieces associated with each other may be collectively taken as a single data piece, or may be taken as separate data pieces. For example, the information associated with the image data may be transferred on a transfer path different from that for the image data. Alternatively, the information associated with the image data may be, for example, stored in a recording medium (or a different recording area in the same recording medium) different from that for the image data. Note that such "association" may not be for entire data, but for partial data. For example, the image and the information corresponding to such an image may be associated with each other in optional units such as multiple frames, a single frame, or part of a frame.

At step S107, the control unit 101 determines whether or not the image processing is to be terminated. In a case where it is determined that distance measurement is to be continued and the image processing is not to be terminated, the processing returns to step S101, and subsequent processing thereof is executed. That is, the control unit 101 repeats the processing of the above-described steps S101 to S107 to project a new pattern image or the same pattern image again and control each processing unit to perform distance measurement by means of such a projection image.

As described above, the control unit 101 repeatedly executes the processing of steps S101 to S107 as needed. Then, at step S107, in a case where it is determined that distance measurement is to be terminated and the image processing is to be terminated, the image processing ends.

By performing the image processing as described above, the image can be projected on the object by the line scan method, and the image of the object can be captured multiple times by the line scan method during the single cycle of such image projection. Thus, more information can be obtained without the need for the frame memory.

3. Second Embodiment

<Single Projection, Single Image Capturing, Multiple Line Readings>

An information processing apparatus to which the present technology is applied is not limited to the example described in the first embodiment. For example, a control unit 101 may cause a single image capturing unit configured to read pixel values of multiple lines in parallel to capture an image of an object. At this point, the control unit 101 may cause a single projection unit 111 to project an image on the object by a raster scan method.

With this configuration, a projection cycle can be more shortened as compared to the case of the first embodiment. That is, the present technology is applicable to higher-speed image projection.

<Image Processing Apparatus>

Figure 13:
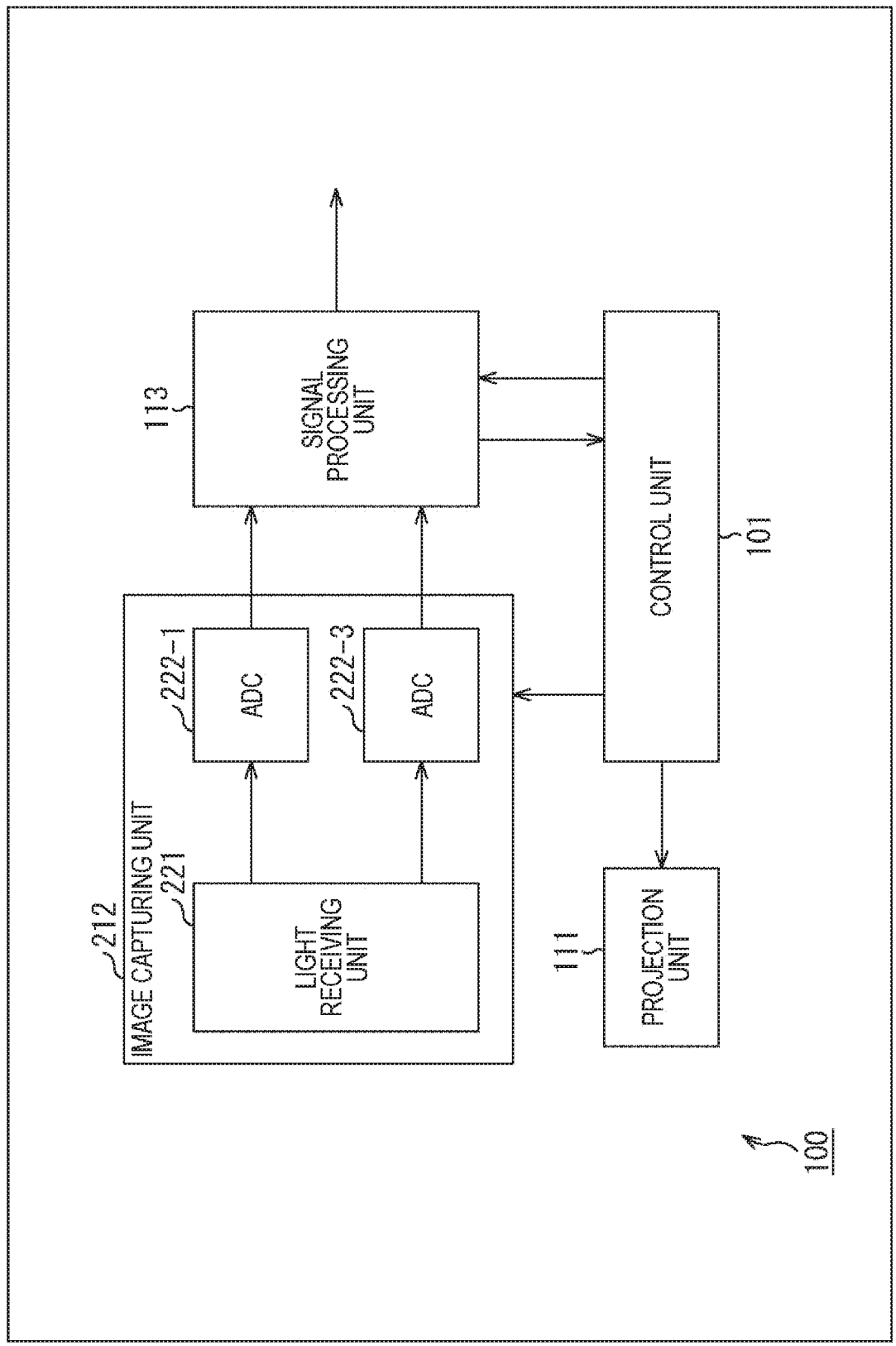
FIG. 13 illustrates a block diagram of a main configuration example of an image processing apparatus.

FIG. 13 is a block diagram of a main configuration example of an image processing apparatus 100 in this case. The image processing apparatus 100 in the case of the example illustrated in FIG. 13 basically has a configuration similar to that in the case of FIG. 2, but has an image capturing unit 212 instead of the image capturing unit 112 of FIG. 2.

Similarly to the image capturing unit 112, the image capturing unit 212 is controlled by the control unit 101, and performs processing regarding image capturing. The image capturing unit 212 has, for example, a light receiving unit 221, an AD converter 222-1, and an AD converter 222-2. In a case where it is not necessary to distinctively describe the AD converter 222-1 and the AD converter 222-2, these converters will be referred to as an "AD converter 222".

The light receiving unit 221 has no frame memory, and reads, as a pixel value, an electric signal corresponding to a charge accumulated at each pixel of a pixel array for every two lines (rows) and supplies such an electric signal to the AD converter 222-1 and the AD converter 222-2 on a line-by-line basis.

Each of the AD converter 222-1 and the AD converter 222-2 is a processing unit similar to an AD converter 122.

Each of the AD converter 222-1 and the AD converter 222-2 A/D-converts the pixel value (the electric signal) of each pixel supplied from the light receiving unit 221 on a line-by-line basis, and as digital data, supplies the resultant to a signal processing unit 113.

That is, the image capturing unit 212 can read, for every two lines, the pixel values obtained in such a manner that light is received by the light receiving unit 221 (can perform reading of the pixel values for two lines in parallel). The light receiving unit 221 is a device similar to the light receiving unit 121, except that the number of readable lines is increased to two lines.

In this case, the signal processing unit 113 can process the digital data of the pixel value supplied from the AD converter 222-1 and the digital data of the pixel value supplied from the AD converter 222-2 in parallel. The processing for the digital data is basically similar to that in the case of the first embodiment.

<Control of Projection and Image Capturing>

Figure 14:
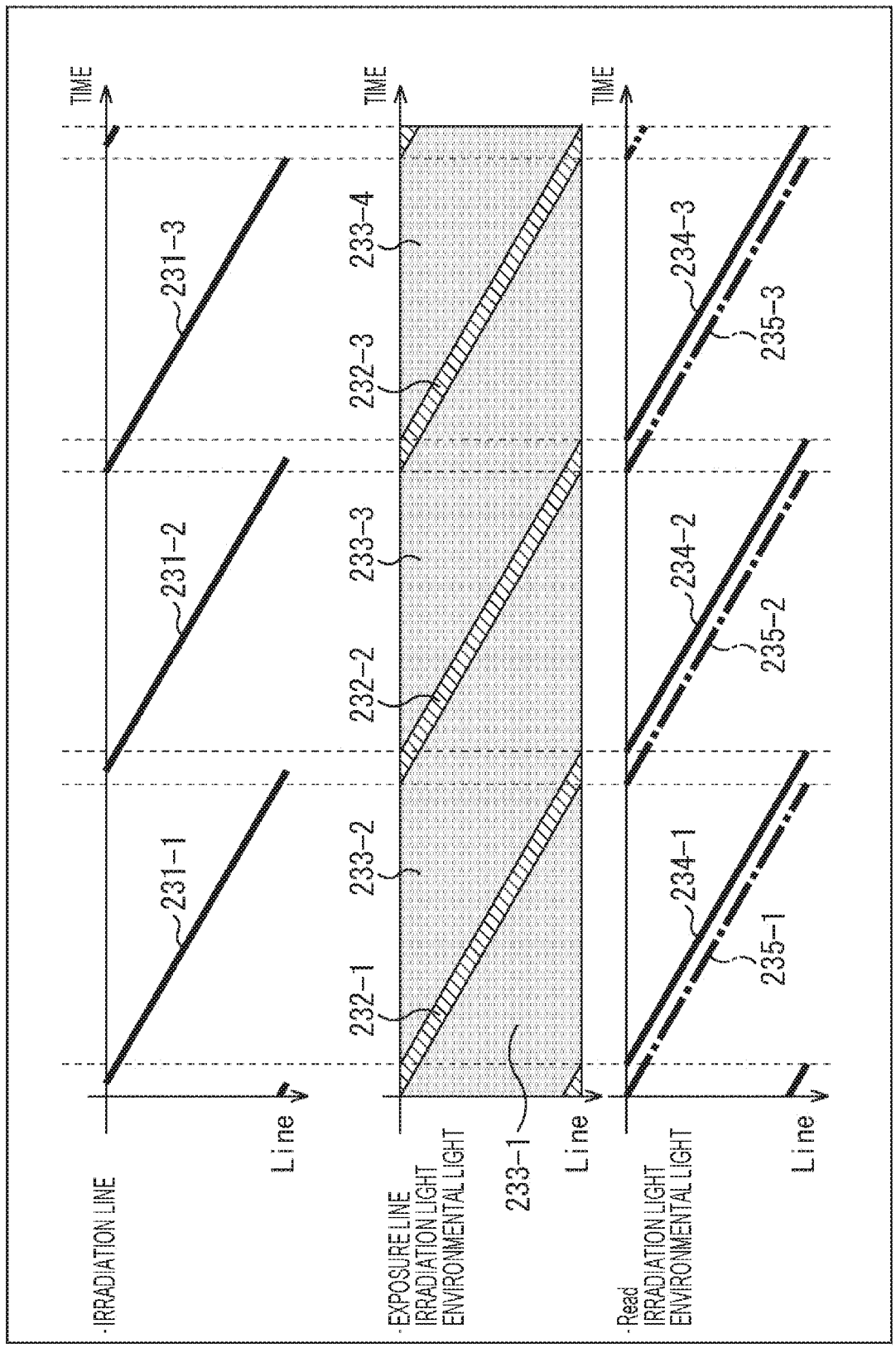
FIG. 14 illustrates a chart for describing an example of a state in projection and image capturing.

An example of a state in projection and image capturing in this case is illustrated in FIG. 14. The control unit 101 controls each processing unit such that projection and image capturing are performed as illustrated in FIG. 14. That is, as illustrated at the uppermost line in FIG. 14, the control unit 101 causes the single projection unit 111 to project a pattern image with a predetermined picture on the object by the raster scan as in raster scan 231-1, raster scan 231-2, and raster scan 231-3.

Then, the control unit 101 causes the single image capturing unit 212 configured to read the pixel values of the multiple lines in parallel to capture the image of the object multiple times (e.g., twice) by a line scan method during a single cycle of projection. For example, the control unit 101 causes the image capturing unit 212 to perform exposure and reading as image capturing for the purpose of imaging and exposure and reading as image capturing for the purpose of sensing during a single cycle of the raster scan as projection of the pattern image.

More specifically, as illustrated at the second and third lines from the top of FIG. 14, the control unit 101 causes the image capturing unit 212 to perform exposure (e.g., an exposure period 233-1 to an exposure period 233-4) and reading (e.g., line scan 235-1 to line scan 235-3) as the image capturing for the purpose of imaging and exposure (e.g., an exposure period 232-1 to an exposure period 232-3) and reading (e.g., line scan 234-1 to line scan 234-3) as the image capturing for the purpose of sensing during the above-described raster scan for projection.

At this point, reading (e.g., the line scan 234-1 to the line scan 234-3) as the image capturing for the purpose of sensing is performed at timing at which a captured image (a sensing result) of the object on which the pattern image has been projected is obtained. That is, the control unit 101 controls projection and image capturing such that the raster scan (e.g., the raster scan 231-1 to the raster scan 231-3) for projection is performed during the exposure period (e.g., the exposure period 232-1 to the exposure period 232-3) for the purpose of sensing. The control unit 101 performs the control as described above so that the image capturing unit 212 can capture the pattern image projected for each line by the raster scan without unnecessarily increasing the exposure period. Thus, the image capturing unit 212 can reduce other types of influence on the image capturing for the purpose of sensing, such as environmental light, and can obtain more accurate depth information.

Note that the exposure period for each line in exposure (e.g., the exposure period 232-1 to the exposure period 232-3) as the image capturing for the purpose of sensing may include a corresponding line for the raster scan (e.g., the raster scan 231-1 to the raster scan 231-3), and to that extent, may be shortened as much as possible. That is, e.g., the timing of each of the line scan 234-1 to the line scan 234-3 may approach the timing of each of the raster scan 231-1 to the raster scan 231-3 as much as possible. As this exposure period becomes shorter, the image capturing unit 212 can more reduce other types of influence on the image capturing for the purpose of sensing, such as the environmental light, and can obtain more accurate depth information. For example, the scan (e.g., the line scan 234-1 to the line scan 234-3) for reading as the image capturing for the purpose of sensing may take, as a processing target, the same line (row) as each line for the scan (e.g., the raster scan 231-1 to the raster scan 231-3) as projection.

Moreover, the control unit 101 causes the line scan (e.g., the line scan 234-1 to the line scan 234-3) as the image capturing for the purpose of sensing to be performed at timing overlapping with the line scan (e.g., the line scan 235-1 to the line scan 235-3) as the image capturing for the purpose of imaging. The control is made as described above so that both of the image capturing for the purpose of sensing and the image capturing for the purpose of imaging can be performed by the single image capturing unit 212 configured to read the pixel values of the multiple lines in parallel.

For example, the control unit 101 causes the image capturing unit 212 to execute the scan for two lines in parallel. Then, the scan for one of two lines is performed as reading for the image capturing for the purpose of imaging, and the scan for the other line is performed as reading for the image capturing for the purpose of sensing. Then, the control unit 101 causes the projection unit 111 to perform the raster scan as projection of the pattern image at the timing according to the line scan for reading as the image capturing for the purpose of sensing as described above.

The control is made as described above so that the control unit 101 can cause the image capturing unit 112 to perform exposure and reading as the image capturing for the purpose of sensing at the above-described timing. That is, both of the image capturing for the purpose of imaging and the image capturing for the purpose of sensing can be performed by the single image capturing unit 212 configured to read the pixel values of the multiple lines in parallel. Moreover, the line scan as reading for the image capturing for the purpose of imaging and the line scan as reading for the image capturing for the purpose of sensing can be performed in parallel, and therefore, the image capturing for the purpose of imaging and the image capturing for the purpose of sensing can be performed within a shorter period of time as compared to the case of the first embodiment. That is, a projection period can be more shortened, and the present technology is applicable to higher-speed image projection.

Note that the scan for a preceding one of two lines for which the scan is executed in parallel by the image capturing unit 212 is preferably performed as the line scan as reading for the image capturing for the purpose of imaging, the scan for the other line is preferably performed as the line scan as reading for the image capturing for the purpose of sensing, and an interval between these two lines is preferably narrowed. With this configuration, the exposure period for the image capturing for the purpose of imaging can be more extended, and the exposure period for the image capturing for the purpose of sensing can be more shortened. As also described in the first embodiment, the exposure period for the image capturing for the purpose of imaging is more extended so that the quality of the image of the object obtained by such image capturing under the environmental light can be improved. Moreover, the exposure period for the image capturing for the purpose of sensing is more shortened so that other types of influence such as the environmental light can be reduced and more accurate depth information can be obtained. Further, an increase in the capacity of a memory (a line buffer) necessary for holding the pixel value can be suppressed.

Note that similar control can be implemented in such a manner that the scan for a preceding one of two lines is performed as the line scan as reading for the image capturing for the purpose of sensing, the scan for the other line is performed as the line scan as reading for the image capturing for the purpose of imaging, and the interval between these two lines is more extended. However, in the case of this method, there is a probability that not only the control becomes more complicated, but also the capacity of the memory (the line buffer) necessary for holding the pixel value increases.

Similarly to the case of the first embodiment, the exposure period for each line as the image capturing for the purpose of imaging and the exposure period for each line as the image capturing for the purpose of sensing can be set as necessary to such an extent that these periods do not overlap with each other. The exposure period may be continuous to the previous exposure period, or may not be continuous to the previous exposure period.

Figure 15:
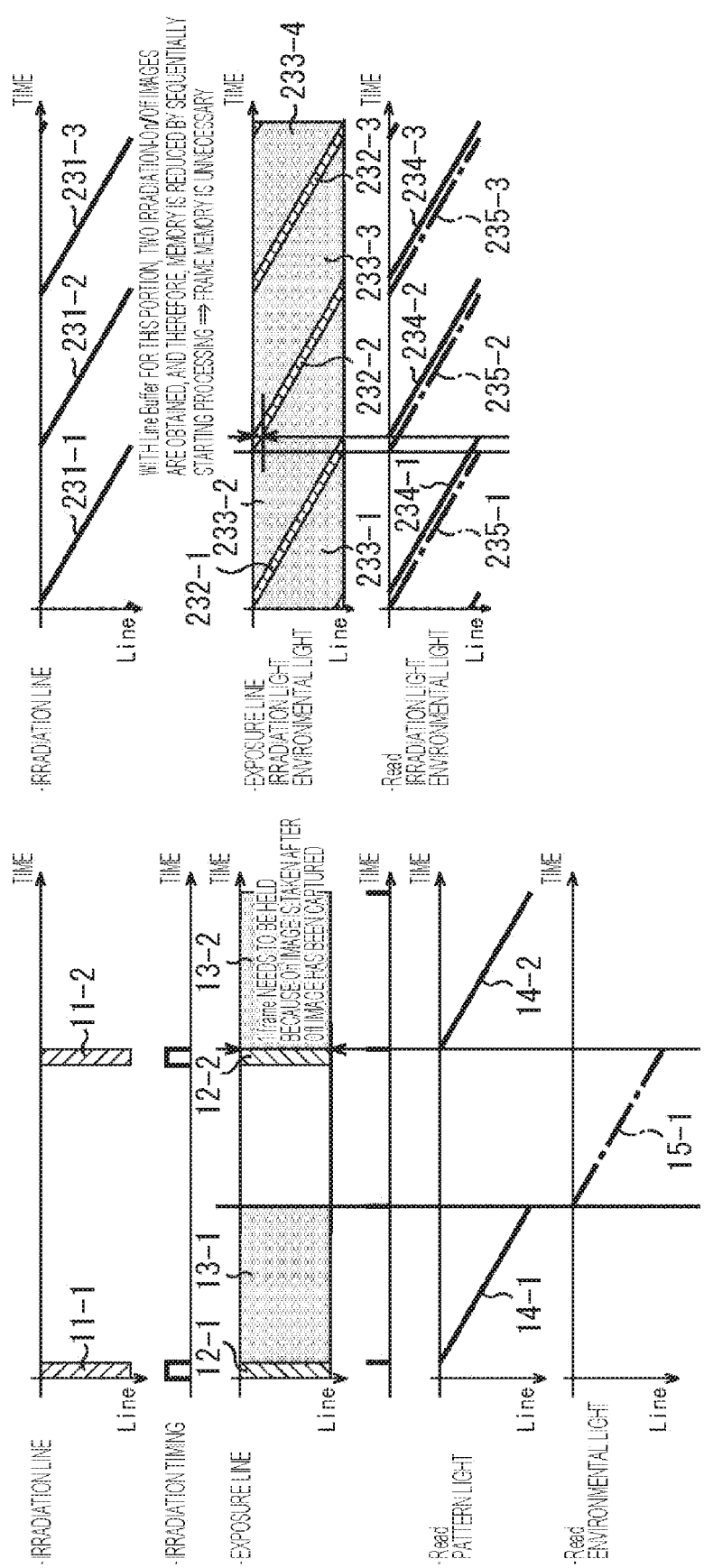
FIGS. 15A and 15B illustrate charts for describing examples of the state in projection and image capturing.

In a case where image projection is a planar method, images of a single frame or more need to be held as illustrated in FIG. 15A, but as described above, the projection unit 111 performs image projection and image capturing by the raster scan method. Thus, as illustrated in FIG. 15B, the images of the single frame or more do not need to be held, and no frame memory is necessary as long as the line buffer is present. For example, the exposure period for the image capturing for the purpose of sensing is more shortened as described above so that the number of lines of the pixel values needing to be held can be more reduced. For example, the line scan as reading for the image capturing for the purpose of imaging and the line scan as reading for the image capturing for the purpose of sensing may be performed for the same line as the processing target, and therefore, only the line buffer configured to hold the pixel values of the single line may be present.

<Division of Exposure Period for Image Capturing for the Purpose of Imaging>

Note that in image capturing described above, the exposure period for the image capturing for the purpose of imaging may be divided into multiple periods, and the number of A/D converters may be further increased to perform the image capturing for the purpose of imaging multiple times. That is, as illustrated in, e.g., FIG. 16, the control unit 101 may cause the image capturing unit 212 to perform exposure and reading as the image capturing for the purpose of imaging multiple times and to perform exposure and pixel value reading as the image capturing for the purpose of sensing at timing at which the pattern image is projected on the object within the exposure period and the line scan for reading overlaps with at least the line scan for the last reading of multiple readings as the image capturing for imaging.

Figure 16:
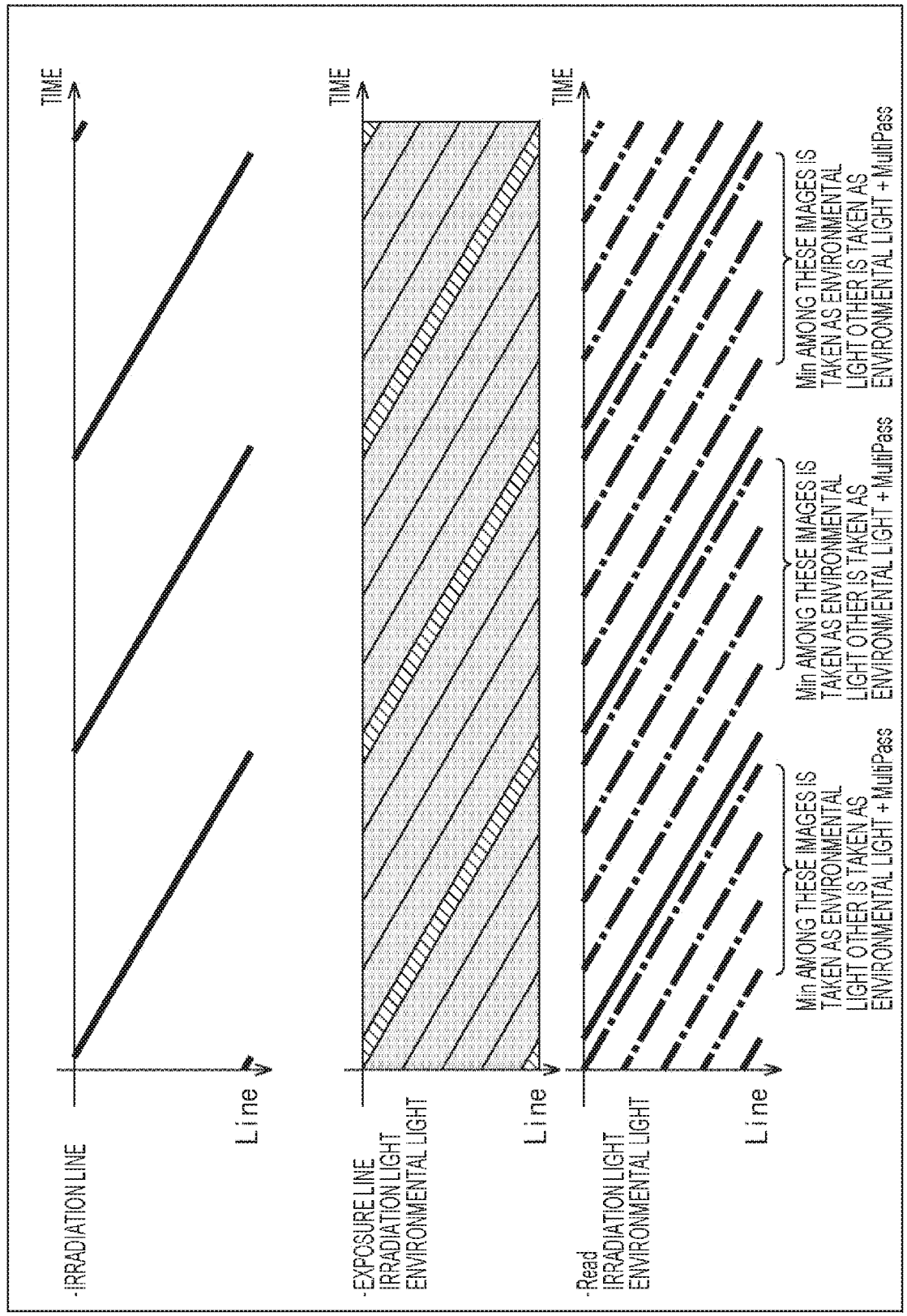
FIG. 16 illustrates a chart for describing an example of the state in projection and image capturing.
Figure 17:
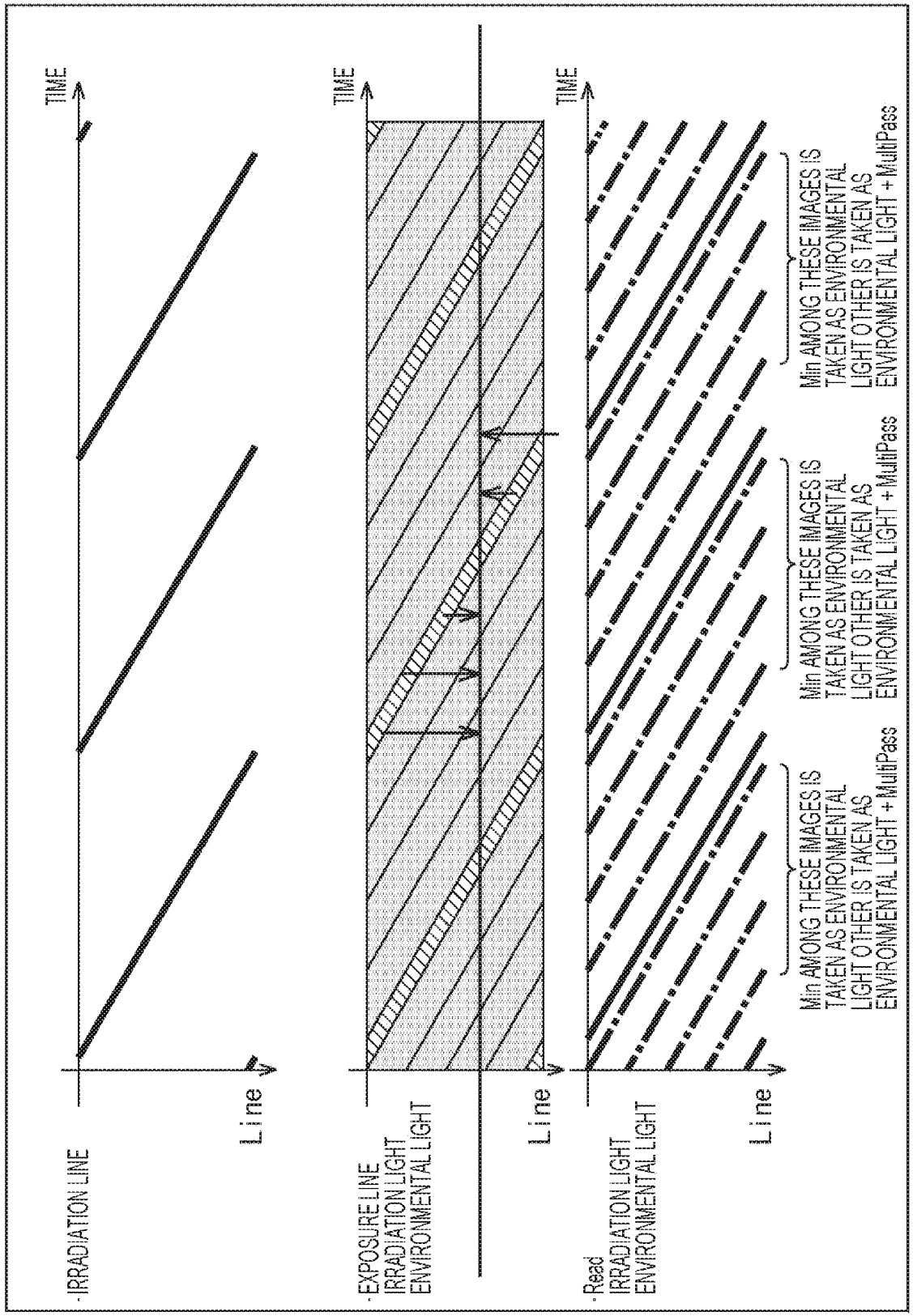
FIG. 17 illustrates a chart for describing an example of the state in projection and image capturing.

In the case of an example of FIG. 16, the control is, as compared to the example of FIG. 14, made such that the image capturing for the purpose of imaging (line scan-like exposure and reading by the line scan) is performed multiple times. As described above, the exposure period for the image capturing for the purpose of imaging is divided into the multiple periods, and the image capturing for the purpose of imaging is performed multiple times. Thus, as illustrated in FIG. 17, an image with great multipath influence and an image with small multipath influence can be separated. Thus, the signal processing unit 113 selects the image with the small multipath influence from these multiple images so that a captured image with small multipath influence can be obtained. This can reduce degradation of the image quality due to multipath influence.

Note that the method for selecting the image with the smallest multipath influence is optional. For example, the signal processing unit 113 may compare the sum, the average, or the like of pixel values in neighborhood regions on a 2D image among multiple captured images to select an image with the smallest pixel value as the image with the smallest multipath influence. Alternatively, the signal processing unit 113 may calculate, after a pixel value with an outlier greatly deviating from other pixel values upon comparison among the multiple captured images has been removed, the sum, the average, or the like of the pixel values to output the resultant value as the image with reduced multipath influence, for example. Alternatively, the signal processing unit 113 may estimate the image with the smallest multipath influence by means of, e.g., multiple images.

<Flow of Image Processing>

Figure 18:
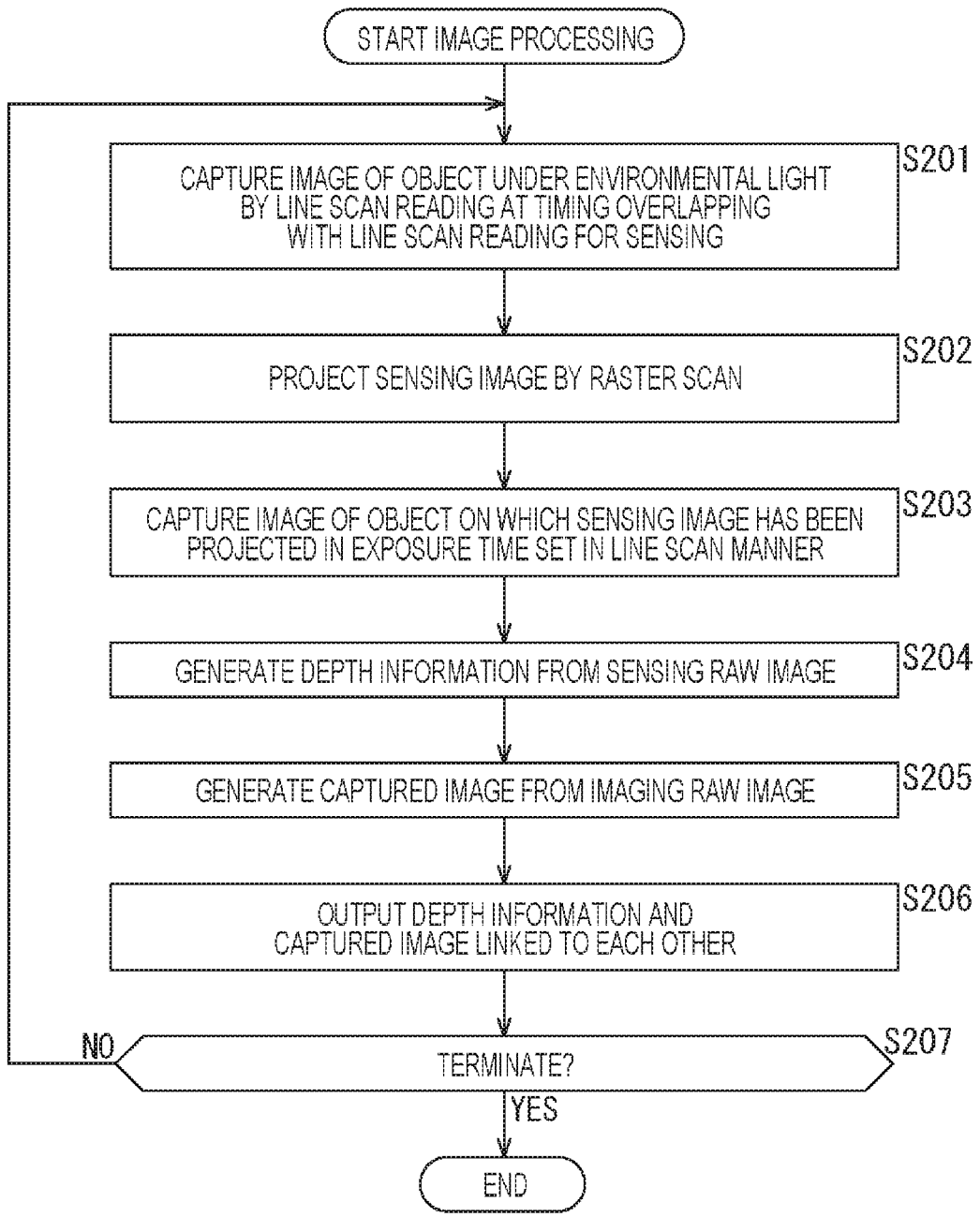
FIG. 18 illustrates a flowchart for describing an example of the flow of image processing.

Next, an example of the flow of image processing executed by the image processing apparatus 100 in this case will be described with reference to a flowchart of FIG. 18.

When the image processing begins, the control unit 101 controls, at step S201, the image capturing unit 212 to capture the image of the object under the environmental light by line scan reading at timing overlapping with line scan reading for sensing. According to such control of the control unit 101, the image capturing unit 212 performs line scan-like exposure and line scan reading as the image capturing for the purpose of imaging.

At step S202, the control unit 101 controls the projection unit 111 to project the pattern image as a sensing image by the raster scan. According to such control of the control unit 101, the projection unit 111 projects the predetermined pattern image on the object by the raster scan.

At step S203, the control unit 101 controls the image capturing unit 212 to capture the image of the object, on which the above-described pattern image has been projected, by exposure and reading in the exposure period set in a line scan manner, such an exposure period including (the raster scan of) projection of step S202. According to such control of the control unit 101, the image capturing unit 212 performs line scan-like exposure and line scan reading as the image capturing for the purpose of sensing. Note that such exposure is performed at timing at which the pattern image is projected on the object in the exposure period. Moreover, the line scan for reading is performed at timing overlapping with the line scan for reading as the image capturing for the purpose of imaging.

Figure 12:
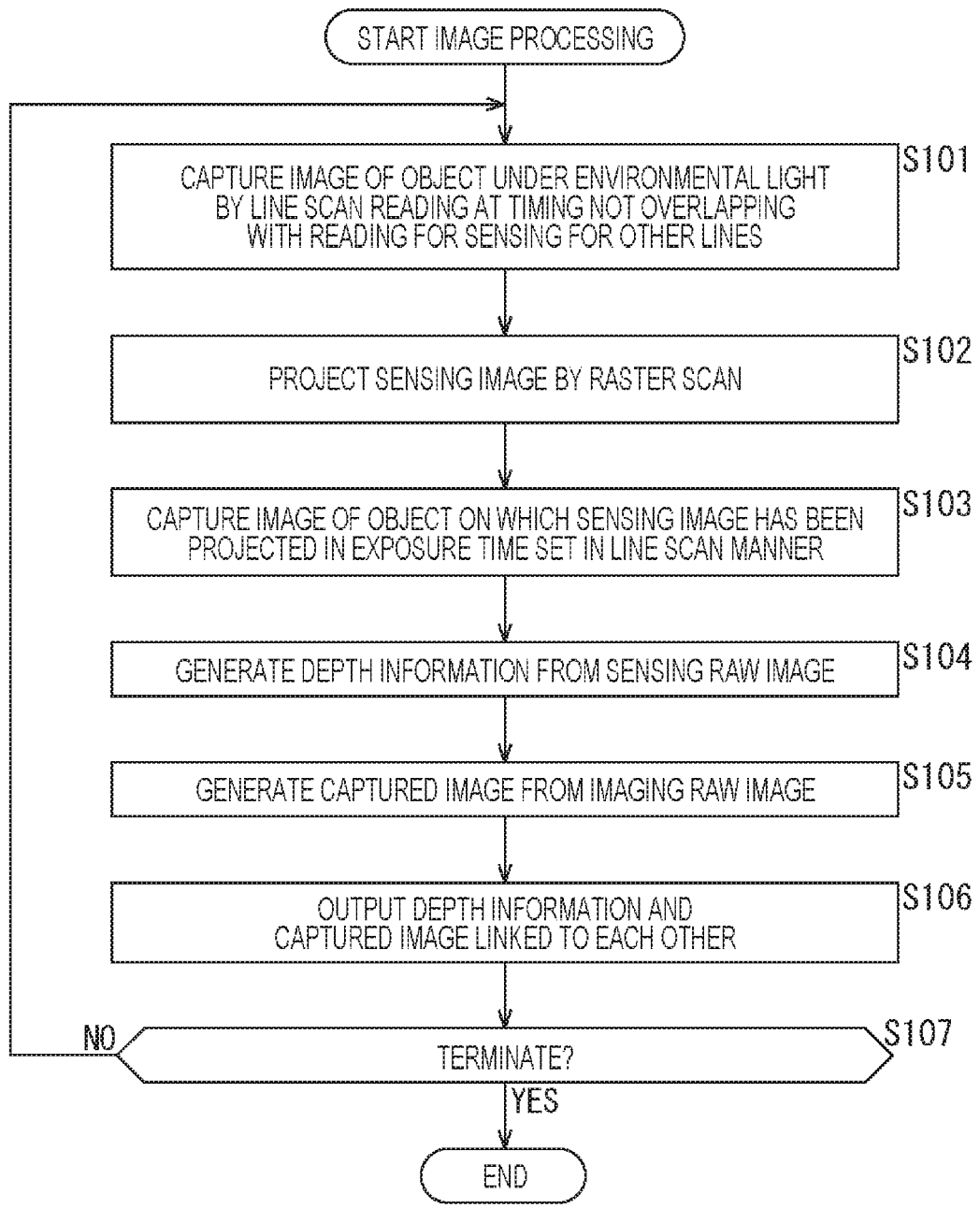
FIG. 12 illustrates a flowchart for describing an example of the flow of image processing.

Each type of processing of steps S204 to S207 is executed in a manner similar to that of each type of processing of steps S104 to S107 of FIG. 12.

The control unit 101 repeatedly executes the processing of steps S201 to S207 as needed. Then, at step S207, in a case where it is determined that distance measurement is to be terminated and the image processing is to be terminated, the image processing ends.

By performing the image processing as described above, more information can be obtained without the need for the frame memory. Moreover, exposure can be more efficiently performed as compared to the case of the first embodiment, and the present technology is applicable to higher-speed image projection as compared to the case of the first embodiment.

4. Third Embodiment

<Multiple Projections, Single Image Capturing, Multiple Line Readings>

Moreover, in the second embodiment, the control unit 101 may cause multiple projection units to project images on an object by raster scan. With this configuration, multiple distance measurements can be performed, for example. That is, similarly to the cases of the first embodiment and the second embodiment, more information can be obtained without the need for a frame memory.

<Image Processing Apparatus>

Figure 19:
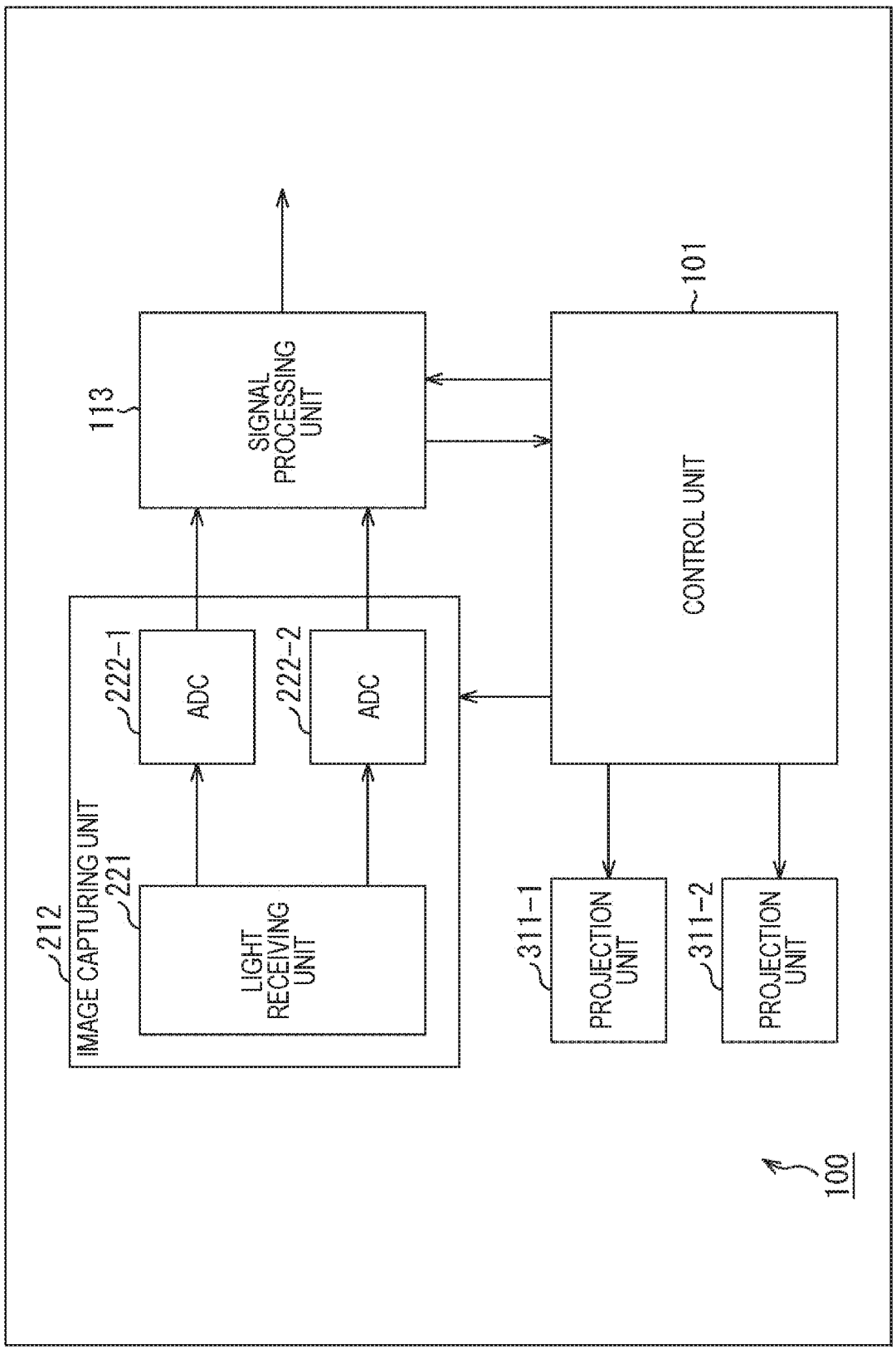
FIG. 19 illustrates a block diagram of a main configuration example of an image processing apparatus.

FIG. 19 is a block diagram of a main configuration example of an image processing apparatus 100 in this case. The image processing apparatus 100 in the case of the example illustrated in FIG. 13 basically has a configuration similar to that of the case of FIG. 13, but has a projection unit 311-1 and a projection unit 311-2 instead of the projection unit 111 of FIG. 13. Hereinafter, in a case where it is not necessary to distinctively describe the projection unit 311-1 and the projection unit 311-2, these units will be referred to as a "projection unit 311".

Each of the projection unit 311-1 and the projection unit 311-2 is a processing unit similar to the projection unit 111, and projects an image by, e.g., line scan or the raster scan on a line-by-line basis. That is, in this case, the image processing apparatus 100 can project images for two lines in parallel. Hereinafter, projection by the raster scan will be described by way of example, but as described above, a projection method of the present technology is not limited to the raster scan.

<Control of Projection and Image Capturing>

Figure 20:
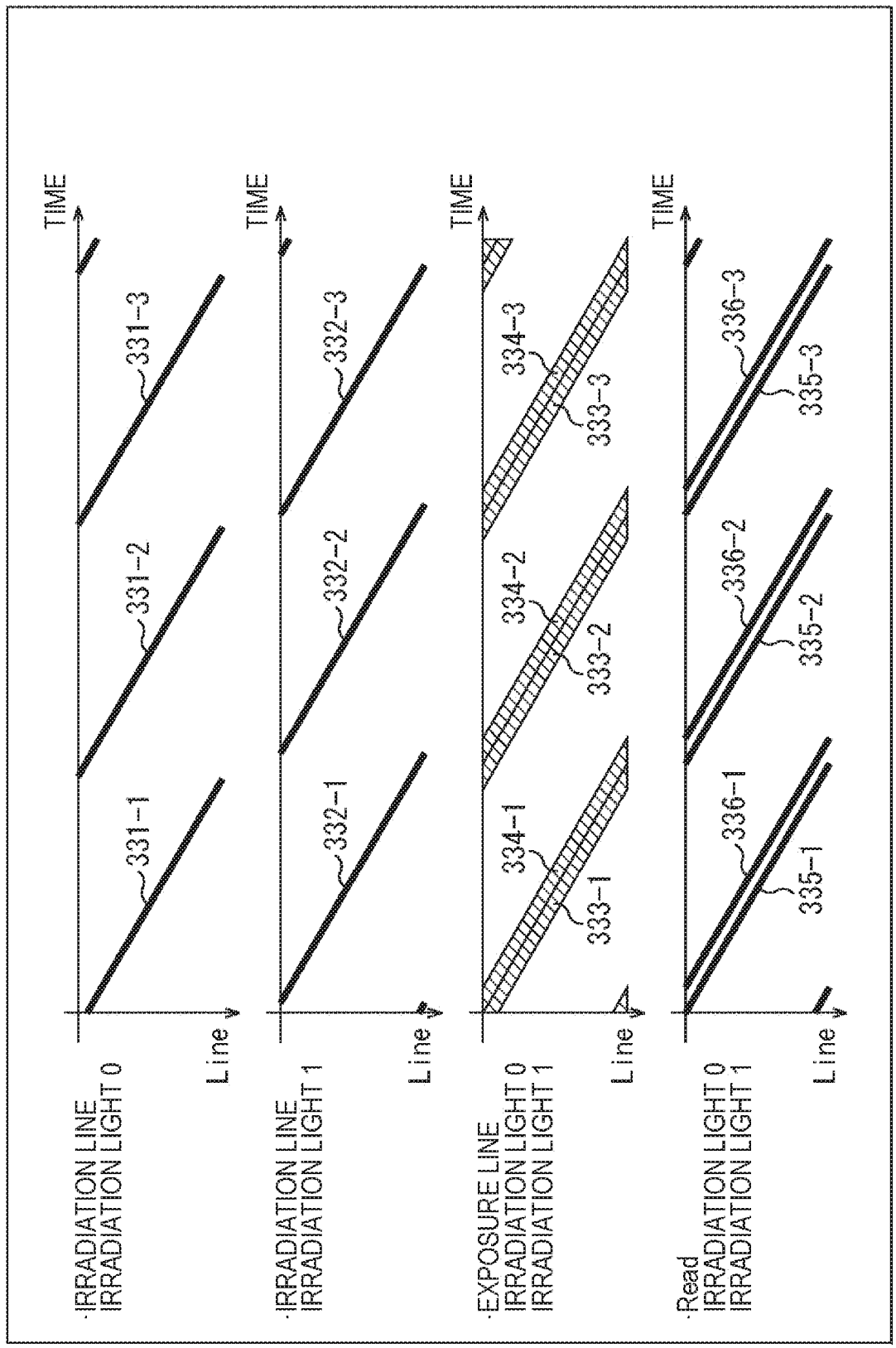
FIG. 20 illustrates a chart for describing an example of a state in projection and image capturing.

An example of a state in projection and image capturing in this case is illustrated in FIG. 20. The control unit 101 controls each processing unit such that projection and image capturing are performed as illustrated in FIG. 20. That is, as illustrated at the uppermost line and the second line from the top of FIG. 20, the control unit 101 causes each of two projection units 311 to project a pattern image with a predetermined picture on the object by the raster scan method as in raster scan 331-1 to raster scan 331-3 or raster scan 332-1 to raster scan 332-3.

That is, as described above, each of two projection units 311 in this case performs, according to the control of the control unit 101, the raster scan as projection of the pattern image at timing different from that of the other projection unit 311 in parallel with the raster scan by the other projection unit 311 (at timing overlapping with the raster scan by the other projection unit 311). Note that the contents (e.g., the picture) of the pattern image to be projected by each projection unit 311 may be different or the same among the projection units 311. For example, multiple types of pattern images as described in the first embodiment may be projected using these projection units 311.

Moreover, for pattern image projection by each projection unit 311, the control unit 101 causes an image capturing unit 212 to perform exposure and reading as image capturing for sensing at timing at which the pattern image is projected on the object within an exposure period.

That is, a light receiving unit 221 performs the line scan (e.g., line scan 335-1 to line scan 335-3) for reading a pixel value as the image capturing for the purpose of sensing at the end timing of the exposure period (e.g., an exposure period 333-1 to an exposure period 333-3) including the raster scan (e.g., the raster scan 331-1 to the raster scan 331-3) by the projection unit 311-1. Moreover, the light receiving unit 221 performs the line scan (line scan 336-1 to line scan 336-3) for reading the pixel value as the image capturing for the purpose of sensing at the end timing of the exposure period (an exposure period 334-1 to an exposure period 334-3) including the raster scan (the raster scan 332-1 to the raster scan 332-3) by the projection unit 311-2.

With this configuration, the image capturing for the purpose of sensing can be performed multiple times (e.g., twice) for single projection as described above. That is, similarly to the case of the first embodiment, more information can be obtained without the need for the frame memory.

<Projection for Multiple Lines>

Note that it has been described above that multiple raster scans are implemented at the overlapping timing by means of the multiple projection units 311, but such a raster scan implementation method is optional. For example, such raster scan may be implemented using a projection unit configured to simultaneously scan multiple lines.

For example, a micro electro mechanical systems (MEMS) may be irradiated with multiple lasers from different angles such that different positions are irradiated with multiple laser beams, and the raster scan may be implemented using a projection unit configured to simultaneously scan these laser beams. Alternatively, using, e.g., a phased array, the raster scan may be implemented using a projection unit configured to simultaneously scan multiple laser beams. Alternatively, e.g., pattern images showing pictures of multiple lines and not showing (e.g., blackening) pictures of other lines may be prepared, and the raster scan may be implemented using a projection unit configured to project, one by one, the group of these pattern images by a planar method in which an entire image (plane) is projected at once. Alternatively, such projection may be implemented using a vertical cavity surface emitting laser (VCSEL), for example.

<Pattern Image>

Note that the pattern image projected by the projection unit 111 for the image capturing for the purpose of sensing may be any image as described in the first embodiment (FIGS. 8A, 8B, 8C, 8D, 9A, 9B, 9C, and 9D). Note that in the case of the present embodiment, multiple pattern images can be projected within a single cycle of the single projection unit 311. Thus, distance measurement can be performed at higher speed as compared to the case of the first embodiment.

<Moving Body Determination>

Moreover, in the case of the present embodiment, moving body determination can be also performed similarly to the case of the first embodiment. Note that in the case of the present embodiment, the image capturing for the purpose of imaging is not performed, and therefore, moving body determination cannot be performed using a captured image of the object under environmental light (FIG. 10). Note that in the case of the present embodiment, moving body determination can be, similarly to the case of the first embodiment, also performed using a captured image of each of multiple sequentially-projected pattern images having partial regions with the same picture (FIG. 11). With this configuration, the multiple pattern images can be projected within the single cycle of the single projection unit 311. Thus, distance measurement can be performed at higher speed as compared to the case of the first embodiment.

Alternatively, synthetic images having a signal to noise ratio (SNR) improved by addition of the captured images of the multiple pattern images in each projection cycle may be compared to each other among cycles, and in this manner, moving body determination may be performed. With this configuration, moving body determination can be more accurately performed.

<Coverage Region Division>

Figure 21:
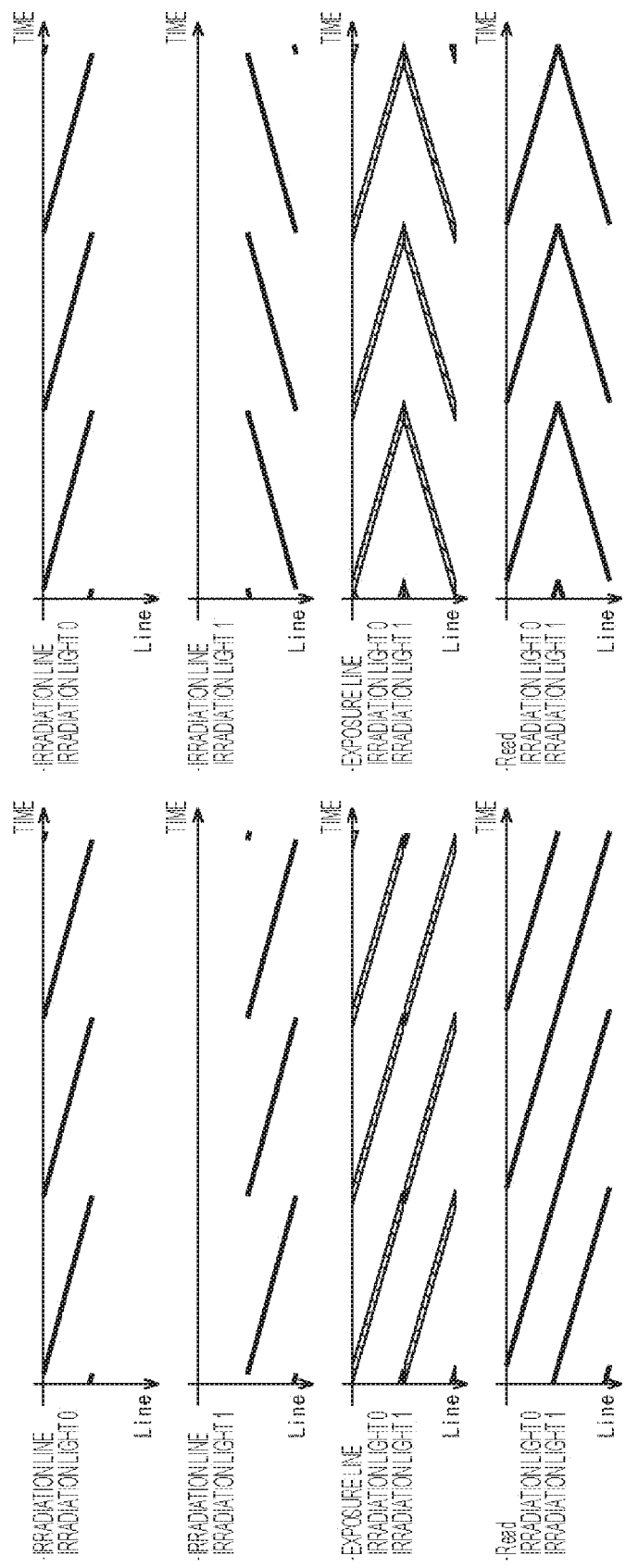
FIGS. 21A and 21B illustrate charts for describing examples of the state in projection and image capturing.

Note that a line projected by each projection unit 311 may be different among the projection units 311. For example, as illustrated in FIG. 21A, the projection unit 311-1 and the projection unit 311-2 may each project lines of different regions of the pattern images, and the light receiving unit 221 may capture the image of each region by the line scan method. With this configuration, exposure time for the entirety of a single screen can be shortened. Alternatively, upon region division, a scan direction may vary according to the region as illustrated in FIG. 21B. The scan direction for each region is changed so that projection timing can be aligned at a region boundary and temporal continuity of distance measurement information on the screen can be held.

<Flow of Image Processing>

Next, an example of the flow of image processing executed by the image processing apparatus 100 as described above will be described with reference to a flowchart of FIG. 22.

When the image processing begins, the control unit 101 controls, at step S301, the single projection unit 311 (e.g., the projection unit 311-1) to project the pattern image as a first sensing image by first raster scan. According to such control of the control unit 101, the projection unit 311-1 projects such a pattern image by the raster scan.

As step S302, the control unit 101 controls the image capturing unit 212 to capture the image of the object, on which the above-described pattern image (the first sensing image) has been projected, by the line scan for exposure and reading in the exposure period set in a line scan manner. According to such control of the control unit 101, the image capturing unit 212 captures the image of the object, on which the pattern image has been projected, by the line scan method as the image capturing for the purpose of sensing.

At step S303, the control unit 101 controls the single projection unit 311 (e.g., the projection unit 311-2) to project the pattern image as a second sensing image by second raster scan at timing overlapping with the first raster scan. According to such control of the control unit 101, the projection unit 311-2 projects such a pattern image by the raster scan.

At step S304, the control unit 101 controls the image capturing unit 212 to capture the image of the object, on which the above-described pattern image (the second sensing image) has been projected, by the line scan for exposure and reading in the exposure period set in a line scan manner. According to such control of the control unit 101, the image capturing unit 212 captures the image of the object, on which the pattern image has been projected, by the line scan method as the image capturing for the purpose of sensing.

At step S305, the control unit 101 controls a signal processing unit 113 to generate depth information from sensing RAW images (i.e., multiple RAW images) obtained by the image capturing for the purpose of sensing at each of steps S302 and S304. That is, according to such control of the control unit 101, the signal processing unit 113 generates the depth information from pixel values obtained by capturing of the image of the object on which the pattern image has been projected. For example, different pattern images are projected from each projection unit 311 so that the depth information can be obtained on the basis of the different pattern images. Alternatively, e.g., the same pattern image is projected from each projection unit 311 so that the multiple RAW images can be synthesized to improve the S/N ratio. That is, higher-accuracy depth information can be generated as compared to the case of generating the depth information from a single RAW image.

At step S306, the control unit 101 controls the signal processing unit 113 to output the depth information generated at step S305.

At step S307, the control unit 101 determines whether or not the image processing is to be terminated. In a case where it is determined that distance measurement is to be continued and the image processing is not to be terminated, the processing returns to step S301, and subsequent processing thereof is executed. That is, the control unit 101 repeats the above-described processing of steps S301 to S307, thereby projecting a new pattern image or the same pattern image again to control each processing unit to perform distance measurement by means of such a projection image.

As described above, the control unit 101 repeatedly executes the processing of steps S301 to S307 as needed. Then, at step S307, in a case where it is determined that distance measurement is to be terminated and the image processing is to be terminated, the image processing ends.

By performing the image processing as described above, the image capturing for the purpose of sensing can be performed multiple times (e.g., twice) during a single cycle of image projection by the single projection unit. That is, similarly to the case of the first embodiment, more information can be obtained without the need for a frame memory.

5. Fourth Embodiment

<Multiple Projections, Single Image Capturing, Multiple Line Readings>

In the second embodiment and the third embodiment, it has been described that the image capturing unit 212 can read the pixel values of two lines in parallel, but an image capturing unit may read pixel values of more lines in parallel (may perform multiple line scans in parallel). That is, the image capturing unit may perform more line scans in parallel as compared to the number of projection raster scans performed in parallel in a projection unit. For example, in the image processing apparatus 100 of the third embodiment, the image capturing unit may read pixel values of three lines in parallel.

With this configuration, the image capturing unit can perform not only the line scan, which corresponds to each of multiple pattern image projections performed in parallel by the raster scan method by the projection unit, for image capturing for the purpose of sensing, but also the line scan for image capturing for the purpose of imaging. That is, more information can be obtained without the need for a frame memory.

<Image Processing Apparatus>

Figure 23:
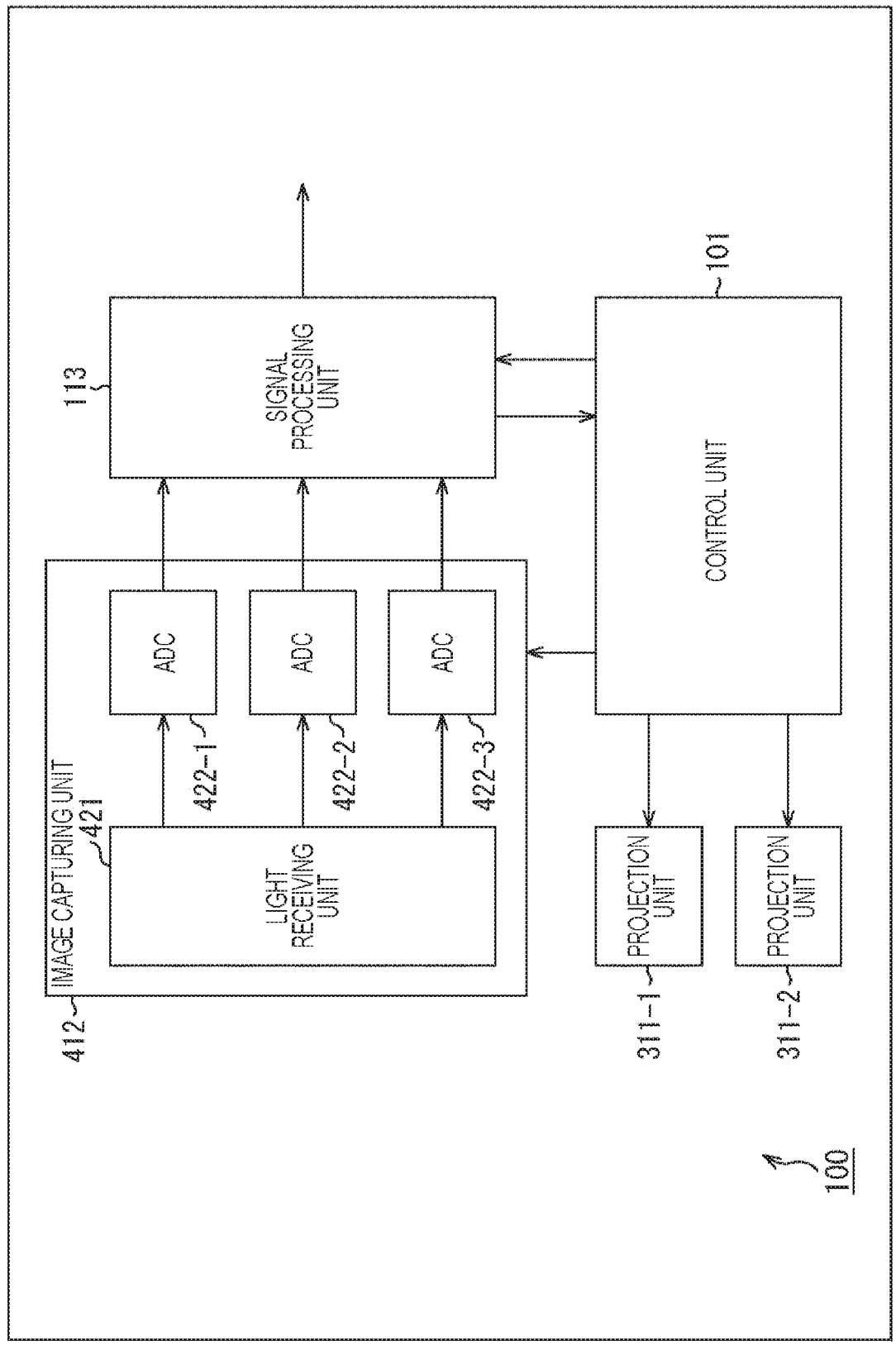
FIG. 23 illustrates a block diagram of a main configuration example of an image processing apparatus.

FIG. 23 illustrates a main configuration example of an image processing apparatus 100 in this case. As illustrated in FIG. 23, the image processing apparatus 100 in this case basically has a configuration similar to that of the case of FIG. 19, but has an image capturing unit 412 instead of the image capturing unit 212 of FIG. 19. The image capturing unit 412 is a processing unit basically similar to the image capturing unit 212 of FIG. 19, but has a light receiving unit 421, an AD converter (ADC) 422-1, an AD converter 422-2, and an AD converter 422-3. Hereinafter, in a case where it is not necessary to distinctively describe the AD converter 422-1 to the AD converter 422-3, these converters will be referred to as an "AD converter 422".

The light receiving unit 421 is a device basically similar to the light receiving unit 221, and has no frame memory. The light receiving unit 421 reads, as a pixel value, an electric signal corresponding to a charge accumulated at each pixel of a pixel array for every three lines (rows), and supplies such an electric signal to the AD converter 422-1 to the AD converter 422-3 on a line-by-line basis. The light receiving unit 421 is the device similar to the light receiving unit 221, except that the number of readable lines is increased to three lines.

Each of the AD converter 422-1 to the AD converter 422-3 is a processing unit similar to the AD converter 122. Each of the AD converter 422-1 to the AD converter 422-3 A/D-converts the pixel value (the electric signal) of each pixel supplied from the light receiving unit 421 on a line-by-line basis, and as digital data, supplies the resultant to a signal processing unit 113.

That is, the image capturing unit 412 can read, for every three lines, the pixel values obtained in such a manner that light is received by the light receiving unit 421 (can perform reading of the pixel values of three lines in parallel). That is, the image capturing unit 412 can read pixel values of a greater number of lines in parallel as compared to the number (two) of projection units 311.

<Control of Projection and Image Capturing>

Figure 24:
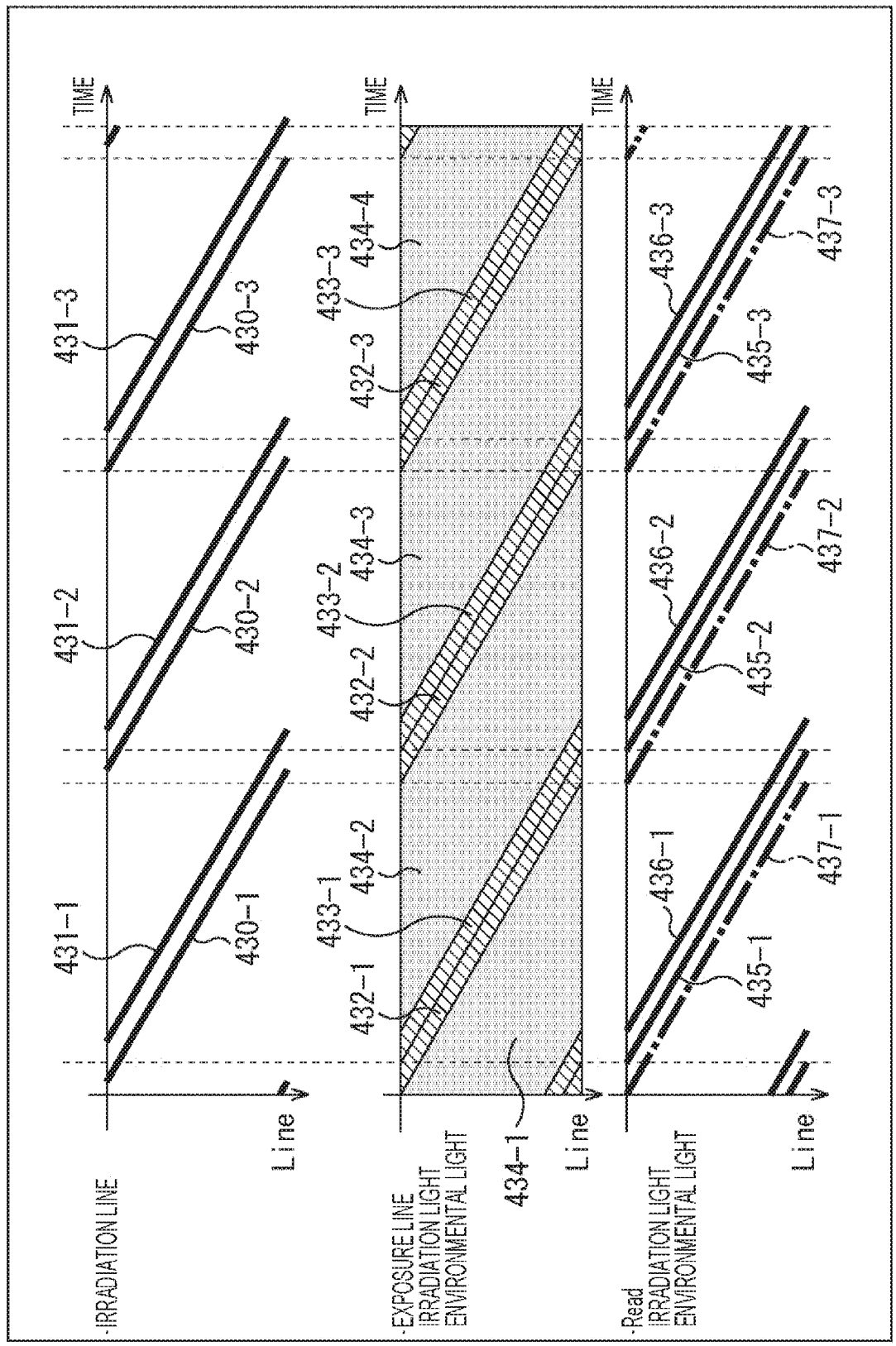
FIG. 24 illustrates a chart for describing an example of a state in projection and image capturing.

An example of a state in projection and image capturing in this case is illustrated in FIG. 24. A control unit 101 controls each processing unit such that projection and image capturing are performed as illustrated in FIG. 24. That is, as illustrated at the uppermost line in FIG. 24, the control unit 101 causes one (e.g., the projection unit 311-1) of the projection units 311 to project a pattern image with a predetermined picture on an object by the raster scan as in raster scan 430-1 to raster scan 430-3. At timing slightly delayed from such raster scan timing, the control unit 101 causes the other projection unit 311 (e.g., the projection unit 311-2) to project a pattern image with a predetermined picture on the object by the raster scan as in raster scan 431-1 to raster scan 431-3. Note that as illustrated at the uppermost line in FIG. 24, such raster scan by the projection unit 311-1 is performed at timing overlapping with the raster scan by the projection unit 311-2. That is, these raster scans can be executed in parallel.

Then, the control unit 101 causes the single image capturing unit 412 configured to read the pixel values of the multiple lines in parallel to perform the image capturing for the purpose of imaging and perform the image capturing for the purpose of sensing multiple times during a single cycle of projection by the single projection unit 311. In multiple courses of the image capturing for the purpose of sensing, the images of the object on which the pattern images have been projected by the difference projection units 311 are captured.

More specifically, during the above-described raster scan for projection, the control unit 101 causes, as illustrated at the second and third lines from the top of FIG. 24, the image capturing unit 412 to perform exposure (e.g., an exposure period 434-1 to an exposure period 434-4) and reading (e.g., line scan 437-1 to line scan 437-3) as the image capturing for the purpose of imaging, exposure (e.g., an exposure period 432-1 to an exposure period 432-3) and reading (e.g., line scan 435-1 to line scan 435-3) as first image capturing for the purpose of sensing, and exposure (e.g., an exposure period 433-1 to an exposure period 433-3) and reading (e.g., line scan 436-1 to line scan 436-3) as second image capturing for the purpose of sensing.

Such first image capturing for the purpose of sensing is performed at timing at which the image of the object subjected to first projection (e.g., the object on which the pattern image has been projected by the projection unit 311-1) is captured. Moreover, such second image capturing for the purpose of sensing is performed at timing at which the image of the object subjected to second projection (e.g., the object on which the pattern image has been projected by the projection unit 311-2) is captured. Further, the image capturing for the purpose of imaging is performed utilizing a spare period (a period for which no image capturing for the purpose of sensing is performed).

As described above, in the case of the present embodiment, more information can be obtained as compared to the case of the third embodiment without the need for the frame memory.

<First Moving Body Determination>

In this case, moving body determination can be also performed by the signal processing unit 113. In this case, moving body determination may be, similarly to the case of the first embodiment, performed using a captured image of the object obtained under environmental light by the image capturing for the purpose of imaging, or may be performing using each of captured images of multiple sequentially-projected pattern images having partial regions having the same picture (FIG. 11).

Alternatively, moving body determination may be performed in such a manner that synthetic images earning a signal to noise ratio (SNR) by addition of every two or more of captured images of multiple (e.g., "three") pattern images are compared to each other. With this configuration, moving body determination can be more accurately performed.

<Second Moving Body Determination>

Alternatively, moving body determination may be performed in such a manner that the following arithmetic processing is performed using pattern images subjected to negative-positive reversal and the captured image of the object under the environmental light.

For example, a positive image as one of the pattern images to be projected is $E_{pos}[x]$, a negative image as one of the pattern images to be projected is $E_{neg}[x]$, the image of the object under the environmental light is $E_{ambient}[x]$, a captured image including the projected positive image is $I_{pos}[x]$, a captured image including the projected negative image is $I_{neg}[x]$, the captured image of the object under the environmental light is $I_{off}[x]$, and a spectral reflectivity is $R[x]$.

In this case, Expression (1) below is satisfied.

$$I_{pos}[x]=(E_{pos}[x]+E_{ambient}[x]) \cdot R[x]$$

$$I_{neg}[x]=(E_{neg}[x]+E_{ambient}[x]) \cdot R[x]$$

$$I_{off}[x]=(E_{ambient}[x]+E_{ambient}[x]) \cdot R[x] \quad (1)$$

When an environmental light component is removed from Expression (1), Expression (2) below is satisfied.

$$I_{pos}[x]-I_{off}[x]=E_{pos}[x] \cdot R[x]$$

$$I_{neg}[x]-I_{off}[x]=E_{neg}[x] \cdot R[x] \quad (2)$$

When the spectral reflectivity is removed from Expression (2), Expression (3) below is satisfied.

$$E_{pos}[x]/E_{neg}[x]=(I_{pos}[x]-I_{off}[x])/(I_{neg}[x]-I_{off}[x]) \quad (3)$$

It can be determined as white in Pos when the value of Expression (3) is greater than one, and it can be determined as black when the value is smaller than one. With this configuration, a binary projection image can be obtained regardless of the texture (the spectral reflectivity) of the object.

Alternatively, Expression (2) may be changed to satisfy Expression (4) below.

$$I_{pos}[x]-I_{neg}[x]=(E_{pos}[x]-E_{neg}[x])R[x] \quad (4)$$

In Expression (4), the spectral reflectivity is positive, and therefore, white-black determination (pattern determination) can be more accurately performed on the basis of the sign of $E_{pos}[x]-E_{neg}[x]$. As described above, pattern determination is performed on the basis of the arithmetic processing above, and moving body determination is performed on the basis of such a determination result. Thus, moving body determination can be more accurately performed.

<Flow of Image Processing>

Figure 25:
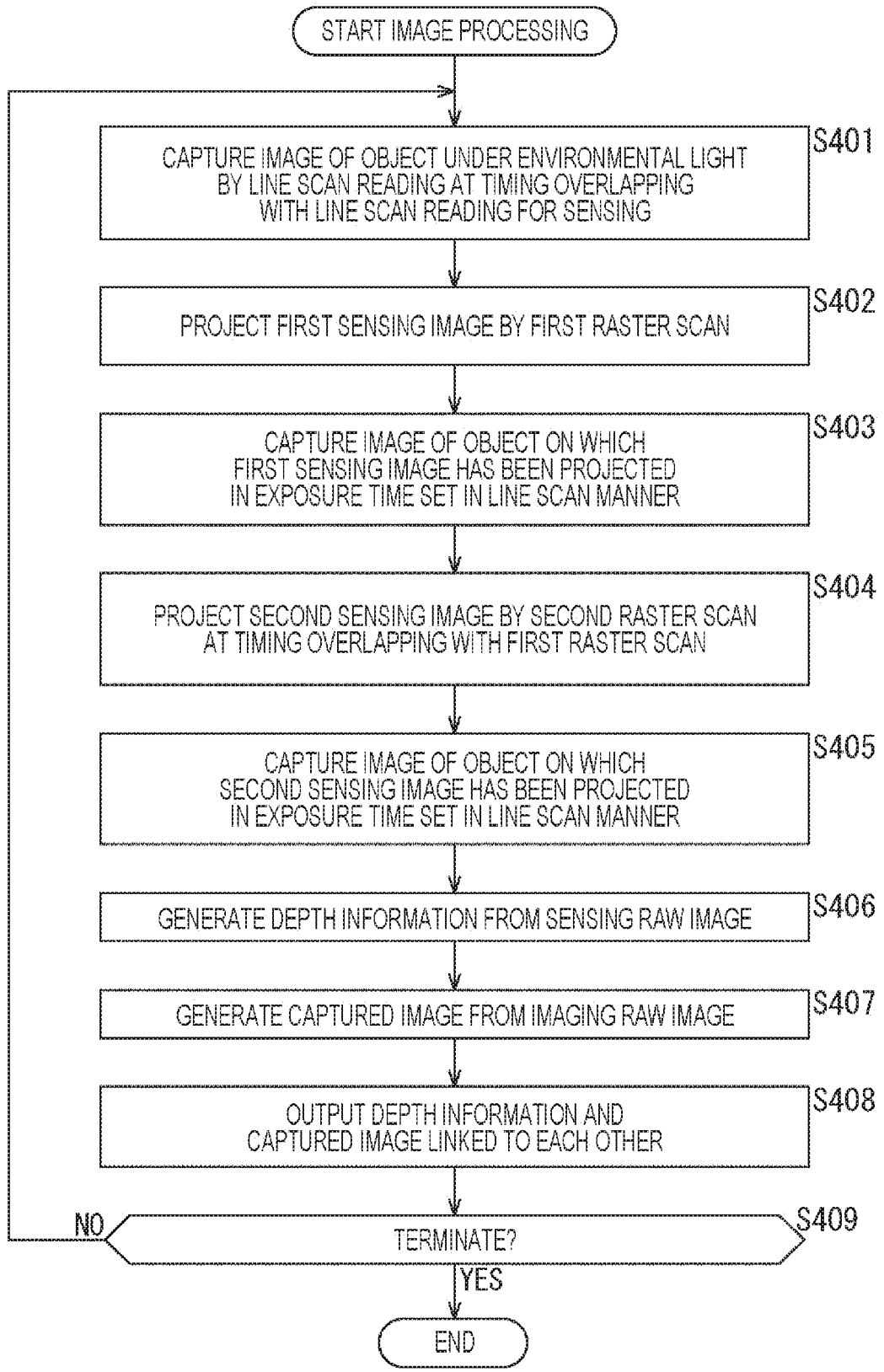
FIG. 25 illustrates a flowchart for describing an example of the flow of image processing.

Next, an example of the flow of image processing executed by the image processing apparatus 100 as described above will be described with reference to a flowchart of FIG. 25.

When the image processing begins, the control unit 101 controls, at step S401, the image capturing unit 412 to capture the image of the object under the environmental light by line scan reading at timing overlapping with line scan reading for sensing. According to such control of the control unit 101, the image capturing unit 412 performs line scan-like exposure and line scan reading as the image capturing for the purpose of imaging.

Figure 22:
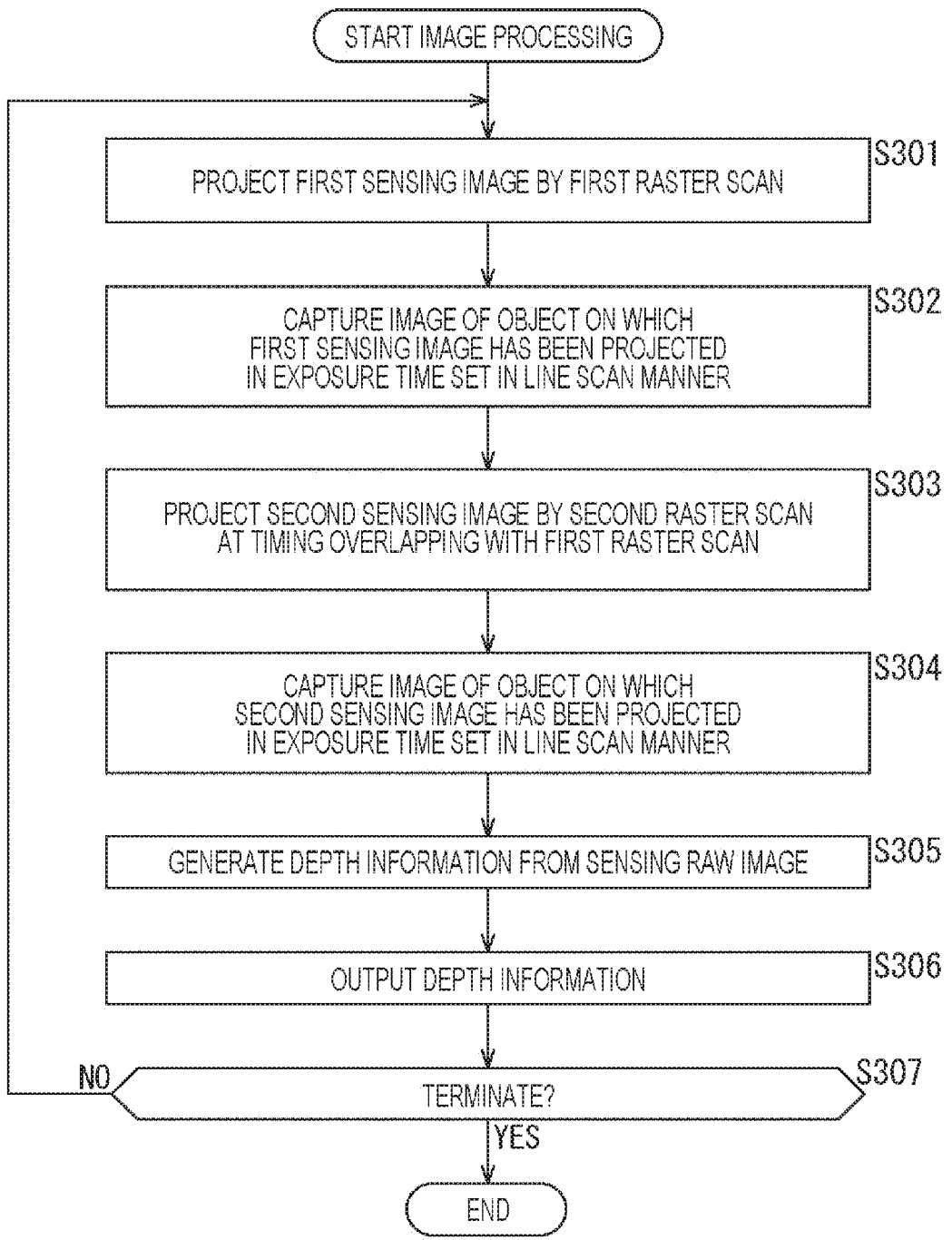
FIG. 22 illustrates a flowchart for describing an example of the flow of image processing.

Each type of processing of steps S402 to S406 is executed in a manner similar to each type of processing of steps S301 to S305 of FIG. 22. That is, the image capturing for the purpose of sensing is performed multiple times, and depth information is generated using multiple obtained sensing RAW images.

Each type of processing of steps S407 to S409 is executed in a manner similar to each type of processing of steps S105 to S107 of FIG. 12. The control unit 101 repeatedly executes the processing of steps S401 to S409 as needed. Then, at step S409, in a case where it is determined that distance measurement is to be terminated and the image processing is to be terminated, the image processing ends.

By performing the image processing as described above, the image capturing for the purpose of sensing is performed multiple times (e.g., twice) during a single cycle of image projection by the single projection unit, and the image capturing for the purpose of imaging can be further performed. That is, similarly to the case of the first embodiment, more information can be obtained without the need for the frame memory.

6. Fifth Embodiment

<Single Projection, Multiple Image Capturings>

Alternatively, an image processing apparatus 100 may include multiple image capturing units. Moreover, in this case, a configuration of each image capturing unit may be different among the image capturing units. For example, a control unit 101 may cause other image capturing units different from an image capturing unit configured to perform image capturing for the purpose of sensing and image capturing for the purpose of imaging to perform exposure and reading as the image capturing for the purpose of imaging in synchronization with the image capturing for the purpose of imaging by such an image capturing unit. With this configuration, more information can be obtained without the need for a frame memory.

<Image Processing Apparatus>

Figure 26:
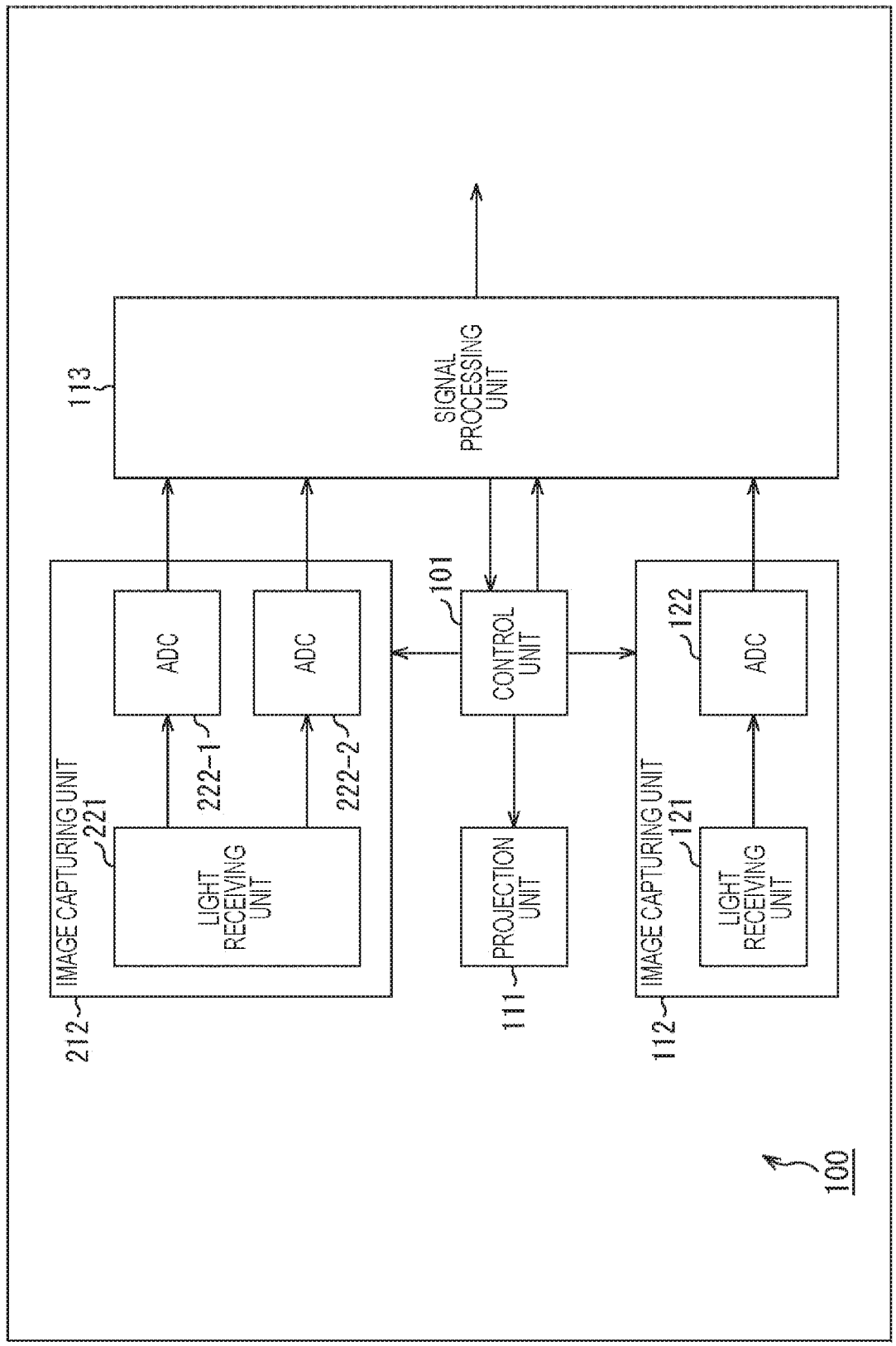
FIG. 26 illustrates a block diagram of a main configuration example of an image processing apparatus.

FIG. 26 illustrates a main configuration example of the image processing apparatus 100 in this case. As illustrated in FIG. 26, the image processing apparatus 100 in this case further has an image capturing unit 112 in addition to the configuration in the case of FIG. 13. The image capturing unit 112 is controlled by the control unit 101, and performs processing regarding image capturing.

<Control of Projection and Image Capturing>

Figure 27:
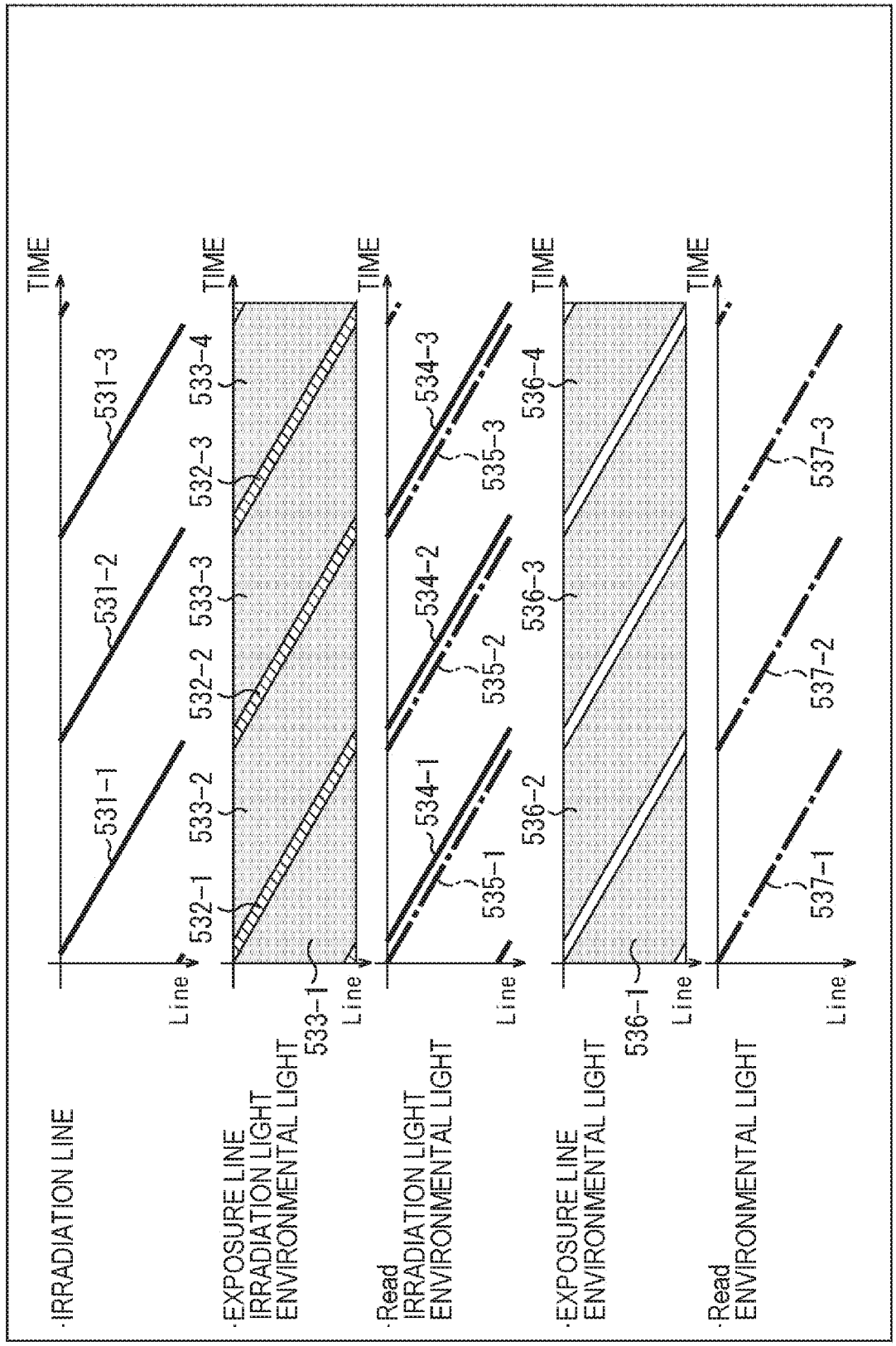
FIG. 27 illustrates a chart for describing an example of a state in projection and image capturing.

An example of a state in projection and image capturing in this case is illustrated in FIG. 27. The control unit 101 controls each processing unit such that projection and image capturing are performed as illustrated in FIG. 27. That is, as illustrated at the uppermost line in FIG. 27, the control unit 101 causes a projection unit 111 to project a pattern image with a predetermined picture on an object by a raster scan method as in raster scan 531-1 to raster scan 531-3.

Then, the control unit 101 controls a single image capturing unit 212 configured to read pixel values of multiple lines in parallel to perform the image capturing for the purpose of imaging and the image capturing for the purpose of sensing during a single cycle of projection by the projection unit 111 as illustrated at the second and third lines from the top of FIG. 27. The processing so far is similar to that in the case (FIG. 14) described in the second embodiment.

In the case of the present embodiment, the control unit 101 further controls the single image capturing unit 112 configured to read the pixel value on a line-by-line basis to perform the image capturing for the purpose of imaging in synchronization with the image capturing for the purpose of imaging by the image capturing unit 212 (at the same timing) as illustrated at the fourth and fifth lines from the top of FIG. 27. The image capturing unit 112 can read the pixel value only on a line-by-line basis, but no image capturing for the purpose of sensing is performed. Thus, the image capturing for the purpose of imaging can be performed in synchronization with the image capturing unit 212.

That is, the image capturing unit 212 is controlled by the control unit 101 to perform exposure in an exposure period 533-1 to an exposure period 533-3 and read the pixel value as in line scan 535-1 to line scan 535-3 as the image capturing for the purpose of imaging.

In synchronization with such processing, the image capturing unit 112 is controlled by the control unit 101 to perform exposure in an exposure period 536-1 to an exposure period 536-3 and read the pixel value as in line scan 537-1 to line scan 537-3 as the image capturing for the purpose of imaging.

Further, the image capturing unit 212 is controlled by the control unit 101 to perform exposure in an exposure period 532-1 to an exposure period 532-3 and read the pixel value as in line scan 534-1 to line scan 534-3 as the image capturing for the purpose of sensing.

With this configuration, more information can be obtained without the need for the frame memory.

Note that in this case, captured images of the object are obtained by the multiple image capturing units, and therefore, distance measurement can be also performed using a disparity between the image capturing units. For example, distance measurement may be performed utilizing a disparity between the captured images for a far object, and may be performed using the pattern image for a close object.

Note that it has been described above that the image capturing unit 112 performs the image capturing for the purpose of imaging, but the present technology is not limited to above. Any image capturing may be performed.

For example, the image capturing unit 112 may capture not only visible light (RGB), but also infrared light (IR). Alternatively, the image capturing unit 112 may capture only the infrared light (IR)

<Flow of Image Processing>

Figure 28:
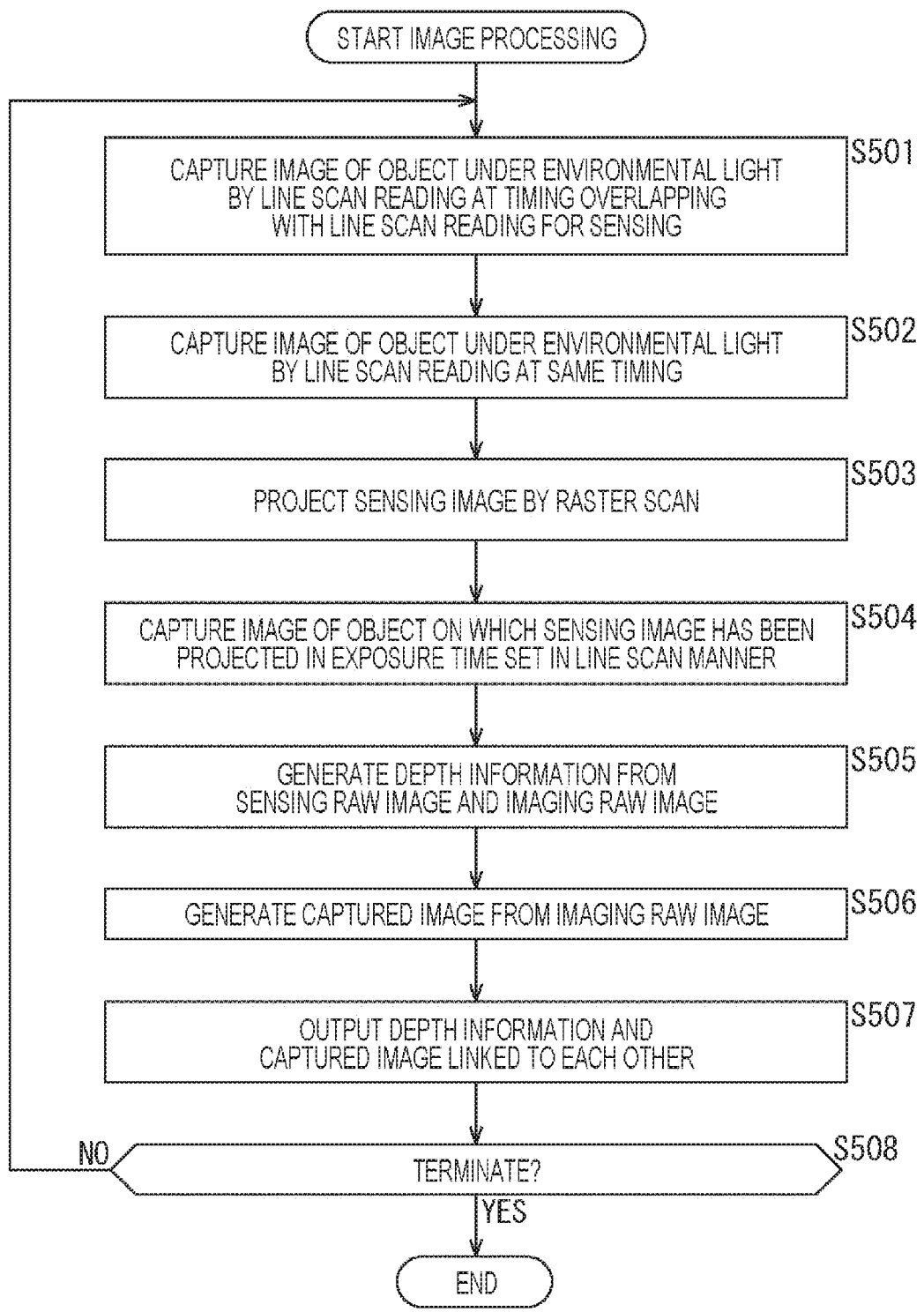
FIG. 28 illustrates a flowchart for describing an example of the flow of image processing.

Next, an example of the flow of image processing executed by the image processing apparatus 100 as described above will be described with reference to a flowchart of FIG. 28.

When the image processing begins, the control unit 101 controls, at step S501, the image capturing unit 212 to capture an image of the object under environmental light by line scan reading at timing overlapping with line scan reading for sensing. According to such control of the control unit 101, the image capturing unit 212 performs line scan-like exposure and line scan reading as the image capturing for the purpose of imaging.

At step S502, the control unit 101 controls the image capturing unit 112 to capture the image of the object under the environmental light at the same timing as the line scan for the image capturing for the purpose of imaging at step S501. According to such control of the control unit 101, the image capturing unit 112 performs line scan-like exposure and line scan reading as the image capturing for the purpose of imaging.

At step S503, the control unit 101 controls the projection unit 111 to project the pattern image as a sensing image by the raster scan. According to such control of the control unit 101, the projection unit 111 projects the predetermined pattern image on the object by the raster scan.

At step S504, the control unit 101 controls the image capturing unit 212 to capture the image of the object, on which the above-described pattern image has been projected, by exposure and reading in the exposure period set in a line scan manner, the exposure period including (the raster scan of) projection of step S503. According to such control of the control unit 101, the image capturing unit 212 performs line scan-like exposure and line scan reading as the image capturing for the purpose of sensing. Note that such exposure is performed at timing at which the pattern image is projected on the object within the exposure period. Moreover, the line scan for reading is performed at timing overlapping with the line scan for reading as the image capturing for the purpose of imaging.

At step S505, the control unit 101 controls a signal processing unit 113 to generate depth information from a sensing RAW image obtained by the image capturing for the purpose of sensing at step S504 and multiple imaging RAW images obtained by the image capturing for the purpose of imaging at steps S501 and S502. For example, triangulation using stereo matching may be used as a depth information generation method. Eventually at S505, a depth image obtained by integration of depth images obtained by combination of the images for sensing and imaging is generated.

At step S506, the control unit 101 controls the signal processing unit 113 to generate the captured image from the imaging RAW image obtained at step S501 or S502. For example, according to such control of the control unit 101, the signal processing unit 113 performs, e.g., demosaic processing to generate the captured image from a pixel value obtained by capturing of the image of the object under the environmental light. Alternatively, the signal processing unit 113 may generate the captured image by means of the depth information of step S505, for example. With this configuration, a correspondence at each point of the imaging RAW images obtained from the image capturing unit 212 and the image capturing unit 112 can be obtained. Moreover, pixel values of these corresponding two points may be utilized to perform processing such as SNR improvement, high dynamic range (HDR) synthesis, and super-resolution processing, for example.

At step S507, the control unit 101 controls the signal processing unit 113 to output the depth information generated at step S505 and the captured image generated at step S506, the depth information and the captured image being linked to each other.

At step S508, the control unit 101 determined whether or not the image processing is to be terminated. In a case where it is determined that distance measurement is to be continued and the image processing is not to be terminated, the processing returns to step S501, and subsequent processing thereof is executed. That is, the control unit 101 repeats the above-described processing of steps S501 to S508 to project a new pattern image or the same pattern image again. Using such a projection image, each processing unit is controlled to perform distance measurement.

As described above, the control unit 101 repeatedly executes the processing of steps S501 to S508 as needed. Then, at step S508, in a case where it is determined that the image processing is to be terminated, the image processing ends.

By performing the image processing as described above, the image capturing unit 212 performs the image capturing for the purpose of sensing and the image capturing for the purpose of imaging once during a single cycle of image projection by the single projection unit 111, and the image capturing unit 112 can further perform the image capturing for the purpose of imaging. That is, more information can be obtained without the need for the frame memory.

7. Sixth Embodiment

<Image Processing System>

Multiple image processing apparatuses 100 described above may be used in combination. For example, the multiple image processing apparatuses 100 may be controlled to perform distance measurement and image capturing across a broader area.

Figure 29:
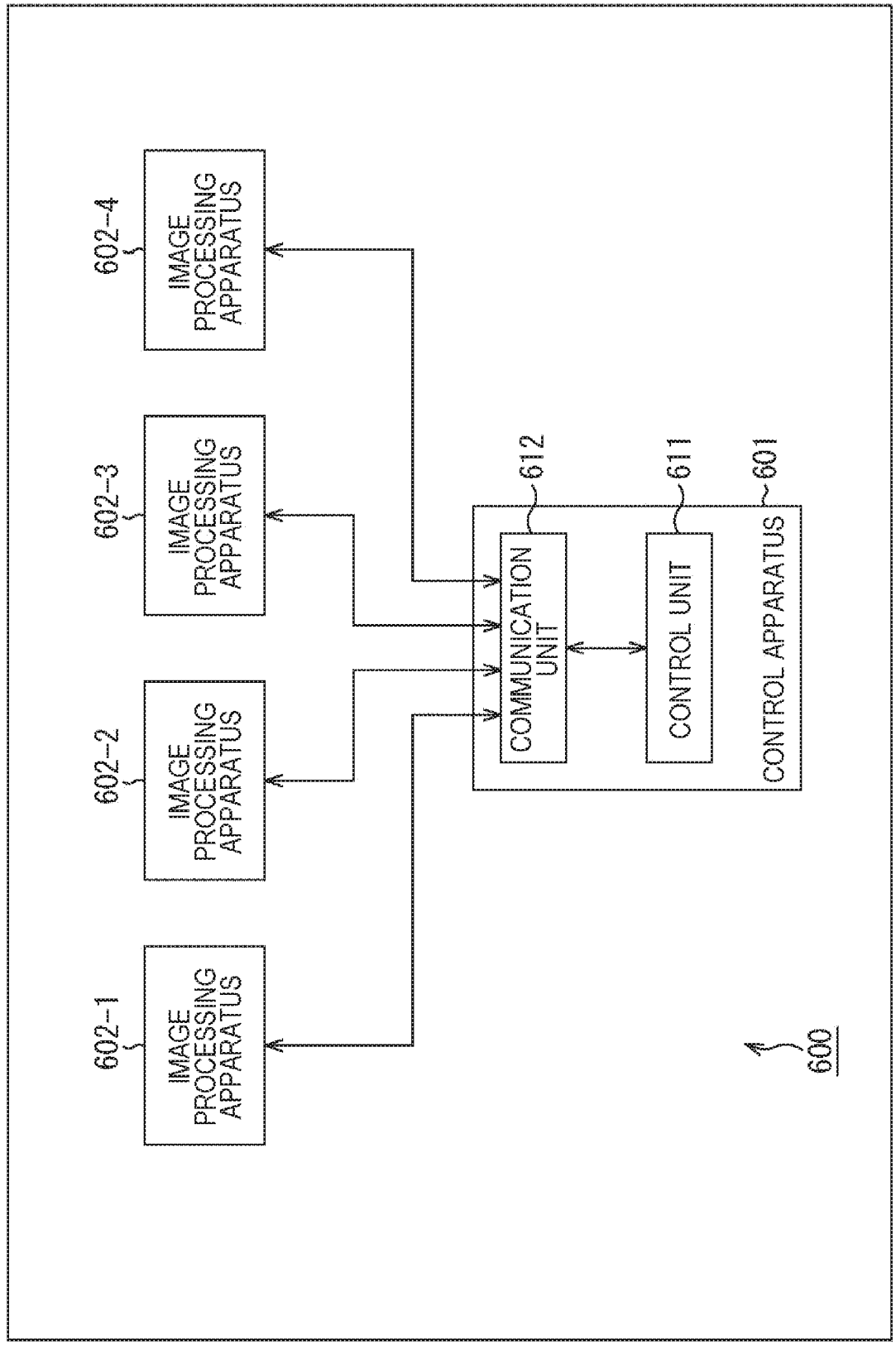
FIG. 29 illustrates a block diagram of a main configuration example of an image processing system.

FIG. 29 is a block diagram of a main configuration example of an image processing system as one embodiment of an information processing system to which the present technology is applied. The image processing system 600 illustrated in FIG. 29 is a system configured to perform distance measurement across a broader area by means of the multiple image processing apparatuses. As illustrated in FIG. 29, the image processing system 600 has a control apparatus 601 and an image processing apparatus 602-1 to an image processing apparatus 602-4. In a case where it is not necessary to distinctively describe the image processing apparatus 602-1 to the image processing apparatus 602-4, these apparatuses will be referred to as an "image processing apparatus 602".

The control apparatus 601 controls operation of each image processing apparatus 602. The image processing apparatus 602 is a device similar to the above-described image processing apparatus 100, has a similar configuration, and performs similar processing. That is, the image processing apparatus 602 performs image capturing for the purpose of imaging and image capturing for the purpose of sensing, generates a captured image of an object and depth information on the object, and outputs the captured image and the depth information linked to each other.

As illustrated in FIG. 29, the control apparatus 601 has a control unit 611 and a communication unit 612. The control unit 611 includes, for example, a CPU, a ROM, a RAM, and the like, and executes, e.g., a program to perform processing regarding the control of the image processing apparatus 602. The control unit 611 performs communication with the image processing apparatus 602 via the communication unit 612, thereby performing such control. The communication unit 612 performs wired or wireless communication with each image processing apparatus 602.

The image processing apparatus 602 performs the processing in a manner similar to that of the image processing apparatus 100. That is, the image processing apparatus 602 projects a pattern image by a raster scan method, and captures an image of an object by a line scan method. The control apparatus 601 controls a scan direction (the direction of the raster scan as projection or the line scan as reading for image capturing) of each image processing apparatus 602. That is, as illustrated in FIG. 30, the control apparatus 601 causes each image processing apparatus 602 to perform the scan as projection and image capturing in a direction different from those of other adjacent image processing apparatuses 602.

Figure 30:
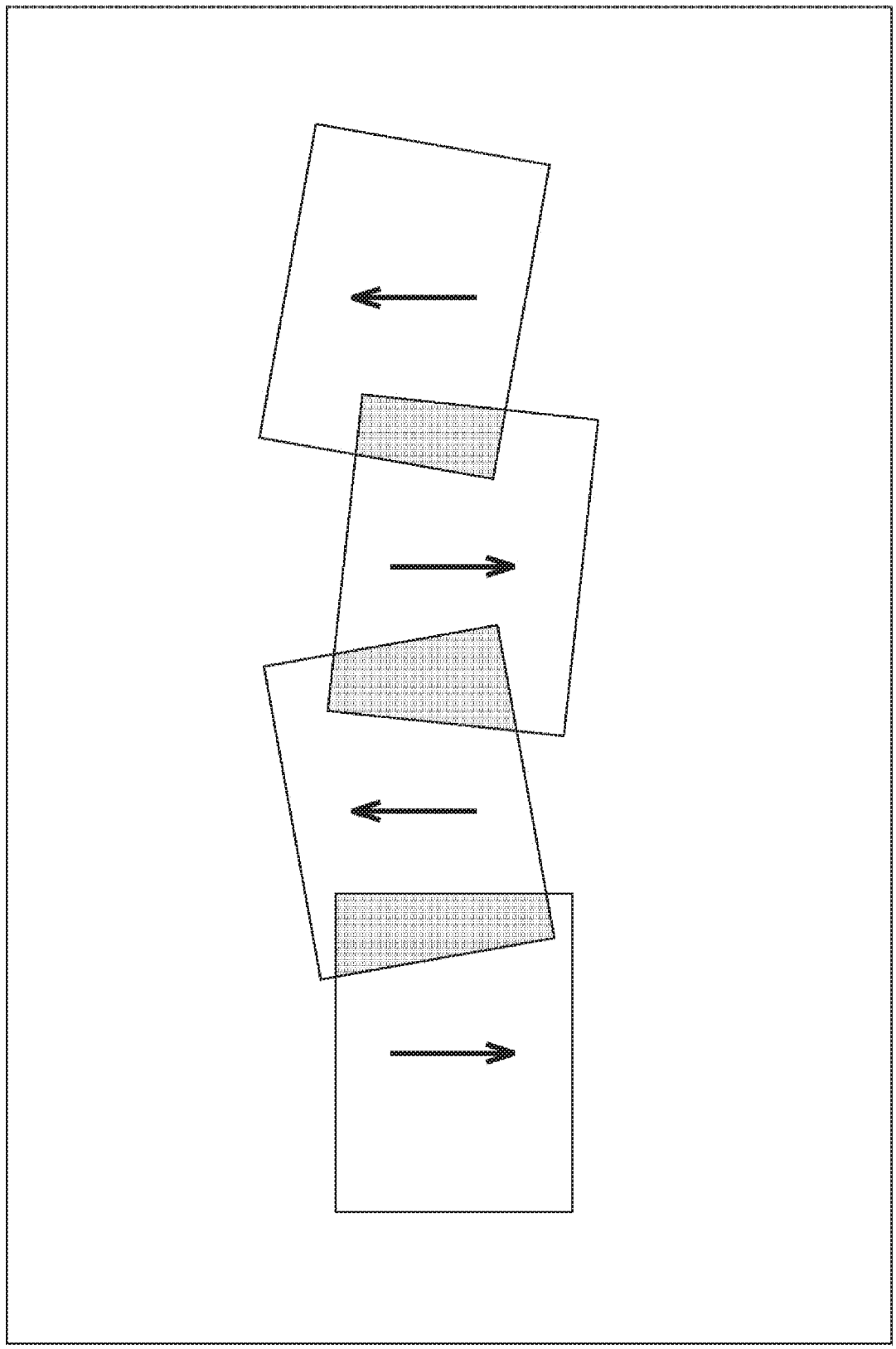
FIG. 30 illustrates a chart for describing an example of a state in projection and image capturing.

In FIG. 30, each rectangle indicates an example of a state in pattern image projection by the image processing apparatus 602, and an arrow in each rectangle indicates the direction of projection and image capturing. That is, the image processing apparatus 602-1 to the image processing apparatus 602-4 are configured such that the scan direction is alternately reversed.

Figure 31:
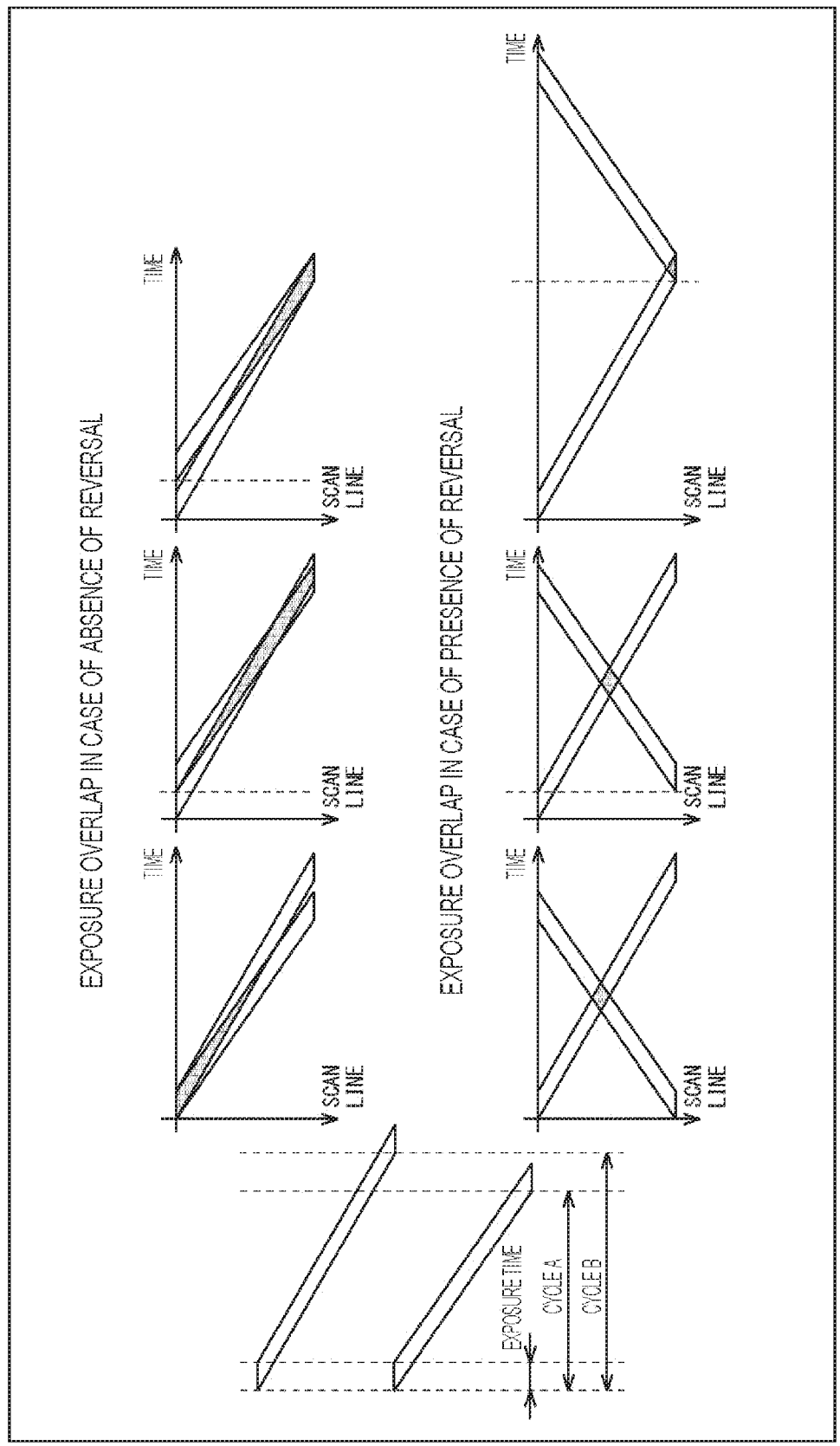
FIG. 31 illustrates a chart for describing an example of the state in projection and image capturing.

When adjacent ones of the image processing apparatuses 602 have the same direction of the raster scan for projection or the line scan for image capturing, there is a probability that a long exposure time overlap is caused as illustrated as illustrated at an upper line in FIG. 31. That is, there is a probability that pattern images projected from other (adjacent) image processing apparatuses 602 are captured by more lines. That is, there is a probability that stronger influence of other pattern images is received.

For this reason, as described above, the scan direction is reversed among adjacent image processing apparatuses 602 so that an overlapping exposure period can be shortened as illustrated at a lower line in FIG. 31. That is, the influence of the pattern images projected from other image processing apparatuses 602 can be reduced, and distance measurement can be more accurately performed.

<Flow of Control Processing>

Figure 32:
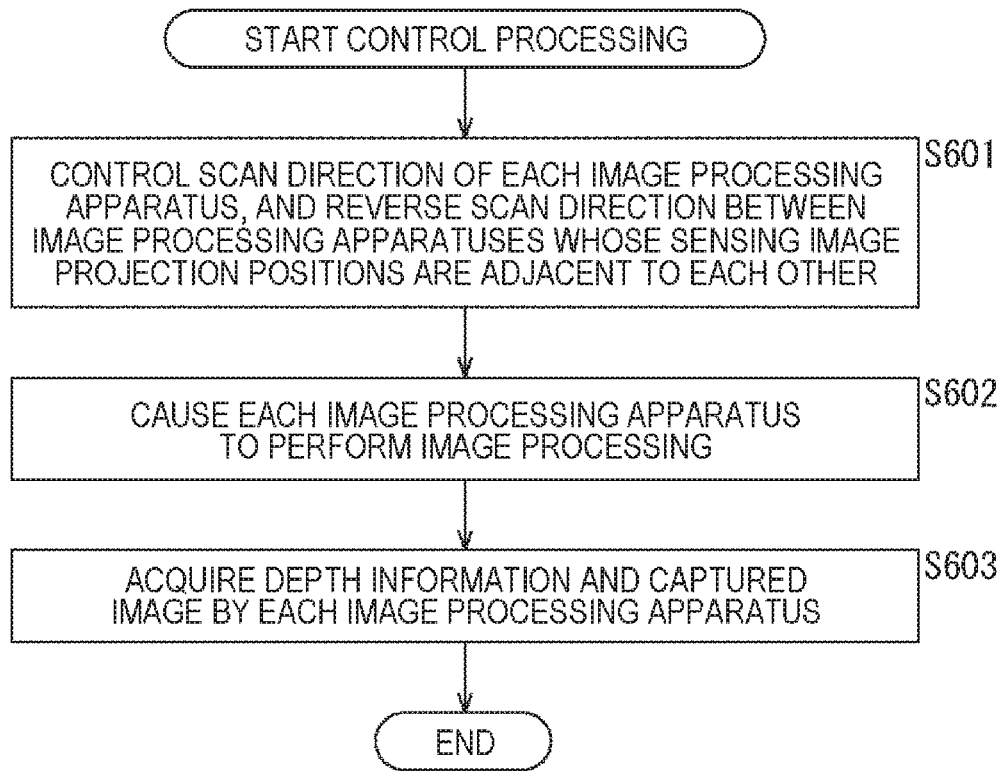
FIG. 32 illustrates a flowchart for describing an example of the flow of image processing.

An example of the flow of control processing executed by the control apparatus 601 in such an image processing system will be described with reference to a flowchart of FIG. 32.

When the control processing begins, the control unit 611 of the control apparatus 601 controls, at step S601, the scan direction of each image processing apparatus 602 to reverse the scan direction among the image processing apparatuses whose projection positions of the pattern images as sensing images are adjacent to each other.

At step S602, the control unit 611 causes each image processing apparatus 602 to perform the image processing to generate the depth information and the captured image.

At step S603, the control unit 611 acquires the depth information and the captured image from each image processing apparatus 602 via the communication unit 612.

When the processing of step S603 ends, the control processing ends.

By executing the control processing as described above, the control apparatus 601 can cause each image processing apparatus 602 to perform more accurate distance measurement. That is, the control apparatus 601 can acquire more accurate depth information.

Note that the number of apparatuses (the control apparatus 601 and the image processing apparatus 602) forming the image processing system 600 is optional, and is not limited to that in the example of FIG. 29.

Needless to say, each apparatus of the image processing system 600 is not limited to that of the above-described example, and in an optional combination, may be integrated as a single apparatus.

8. Other

<Application Fields of Present Technology>

As long as distance measurement is performed, the present technology can be applied to, e.g., systems, apparatuses, and processing units used for optional fields, e.g., traffic, healthcare, crime prevention, agriculture, farming, mining, beauty care, factories, home electronics, weather, nature monitoring, and the like.

For example, the present technology can be also applied to systems and devices provided for image viewing and entertainment such as a game. Moreover, the present technology can be, for example, also applied to systems and devices for traffic management. Further, the present technology can be, for example, also applied to systems and devices for security. In addition, the present technology can be, for example, also applied to systems and devices for sports. Moreover, the present technology can be, for example, also applied to systems and devices for agriculture. Further, the present technology can be, for example, also applied to systems and devices for farming. In addition, the present technology can be, for example, also applied to systems and devices for monitoring the state of nature such as volcanos, forests, and oceans. Moreover, the present technology can be, for example, also applied to a weather observation system and a weather observation apparatus configured to observe, e.g., weather, an air temperature, a humidity, a wind velocity, and hours of daylight. Further, the present technology can be, for example, also applied to systems and devices configured to observe the biology of wildlife, e.g., birds, fish, reptiles, amphibia, mammals, insects, plants, and the like.

<Software>

A series of processing described above can be executed by hardware, or can be executed by software. Alternatively, part of the processing can be executed by hardware, and other part of the processing can be executed by software. In the case of executing a series of processing by the software, a program forming the software is installed in a computer. The computer described herein includes, for example, a computer incorporated into dedicated hardware, a versatile personal computer configured so that various functions can be implemented by various installed programs, and the like.

FIG. 33 is a block diagram of a hardware configuration example of a computer configured to execute a series of processing described above by a program.

In the computer 900 illustrated in FIG. 33, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard drive, a RAM disk, a non-volatile memory, and the like. The communication unit 914 includes, for example, a network interface. The drive 915 drives a removable medium 921 such as a magnetic disk, an optical disk, a magnetic optical disk, or a semiconductor memory.

In the computer configured as described above, the CPU 901 loads and executes the program, which is stored in the storage unit 913, in the RAM 903 via the input/output interface 910 and the bus 904 to perform a series of processing described above, for example. Moreover, e.g., data necessary for executing various types of processing by the CPU 901 is stored as necessary in the RAM 903.

The program executed by the computer (the CPU 901) can be, for example, applied with the program being stored in the removable medium 921 as a package medium or the like. In this case, the program can be installed in the storage unit 913 via the input/output interface 910 in such a manner that the removable medium 921 is attached to the drive 915. Alternatively, this program can be also provided via a wired or wireless transfer medium such as a local area network, the Internet, or digital satellite broadcasting. In this case, the program can be received by the communication unit 914, and can be installed in the storage unit 913. As another alternative, this program can be installed in advance in the ROM 902 or the storage unit 913.

<Remarks>

The embodiments of the present technology are not limited to those described above, and various changes can be made without departing from the gist of the present technology.

For example, the present technology can be implemented as any configuration forming the apparatus or the system, such as a processor as a system large scale integration (LSI) or the like, a module using multiple processors etc., a unit using multiple modules etc., or a set formed by further addition of other functions to the unit (i.e., a partial configuration of the apparatus).

Note that in the present specification, the system means the group of multiple components (e.g., apparatuses or modules (parts)) regardless of whether or not all components are in the same housing. Thus, any of multiple apparatuses housed in separate housings and connected through a network and a single apparatus housing multiple modules in a single housing is the system.

Moreover, as long as the above-described processing unit has the functions described above, the processing unit may be implemented by any configuration. For example, the processing unit may include an optional circuit, LSI, system LSI, processor, module, unit, set, device, apparatus, system, or the like. Alternatively, multiple ones of these components may be combined. For example, multiple configurations of the same type such as multiple circuits or multiple processors may be combined, or configurations of different types such as a circuit and a LSI may be combined.

Further, the configuration described as a single apparatus (or a single processing unit) may be, for example, divided into multiple apparatuses (or multiple processing units). Conversely, the configurations described above as multiple apparatuses (or multiple processing units) may be collectively configured as a single apparatus (or a single processing unit). In addition, other configurations than those described above may be added to the configuration of each apparatus (or each processing unit). Moreover, as long as the substantially same configuration or operation of the entirety of the system is provided, part of a configuration of a certain apparatus (or a certain processing unit) may be included in configurations of other apparatuses (or other processing units).

Further, the present technology may have, for example, a cloud computing configuration for processing a single function by multiple apparatuses via a network in cooperation.

In addition, e.g., the above-described program can be executed in an optional apparatus. In this case, such an apparatus may have a necessary function (e.g., a functional block) to obtain necessary information.

Moreover, e.g., each step described in the above-described flowcharts can be executed by a single apparatus, and can be also executed by multiple apparatuses in cooperation. Further, in a case where a single step includes multiple types of processing, these multiple types of processing included in the single step can be executed by a single apparatus, and can be also executed by multiple apparatuses in cooperation. In other words, multiple types of processing included in a single step can be executed as multiple types of step processing. Conversely, the processing described as multiple steps can be collectively executed as a single step.

A program executed by a computer may be executed such that the processing of steps describing the program is executed in chronological order in the order described in the present specification, or may be separately executed in parallel or at necessary timing such as invocation timing. That is, as long as there are no inconsistencies, the processing of each step may be executed in an order different from that described above. Further, the processing of the steps describing the program may be executed in parallel with other types of program processing, or may be executed in combination with other types of program processing.

The multiple present technologies described in the present specification can be independently implemented alone as long as there are no inconsistencies. Needless to say, optional ones of the multiple present technologies can be implemented in combination. For example, part or the entirety of the present technology described in any of the embodiments can be implemented in combination with part or the entirety of the present technology described in other embodiments. Alternatively, some or all of optional ones of the present technologies described above can be implemented in combination with other technologies not described above.

Note that the present technology can have the following configurations.

(1) An information processing apparatus including
a control unit configured to control a projection unit to perform scan of a point light source or a line light source configured to project a pattern image on an object and control an image capturing unit to perform, multiple times, exposure and reading by line scan for capturing an image of the object during a single cycle of the scan as projection of the pattern image.

(2) The information processing apparatus according to (1), in which
the control unit causes a single image capturing unit configured to read a pixel value on a line-by-line basis to capture the image of the object.

(3) The information processing apparatus according to (2), in which
the control unit causes the image capturing unit to perform exposure and reading as image capturing for imaging and exposure and reading as image capturing for sensing during the single cycle of the scan as projection of the pattern image.

(4) The information processing apparatus according to (3), in which
the control unit causes the image capturing unit to perform exposure and reading as the image capturing for sensing at timing at which the pattern image is projected on the object within an exposure period and line scan for reading does not overlap with line scan for reading as the image capturing for imaging.

(5) The information processing apparatus according to (4), further including
an image processing unit configured to generate image information on the object on the basis of information obtained by the image capturing for imaging and generate depth information on the object on the basis of information obtained by the image capturing for sensing.

(6) The information processing apparatus according to (5), in which
the image processing unit performs moving body determination on the basis of the image of the object, and generates the depth information on the object on the basis of a moving body determination result.

(7) The information processing apparatus according to (5), in which
the control unit causes the projection unit to sequentially project multiple predetermined pattern images having partial regions with an identical picture, and
the image processing unit performs moving body determination on the basis of the regions with the identical picture, and generates the depth information on the object on the basis of a moving body determination result.

(8) The information processing apparatus according to any one of (1) to (7), in which
the control unit causes a single image capturing unit configured to read pixel values of multiple lines in parallel to capture the image of the object.

(9) The information processing apparatus according to (8), in which
the control unit causes a single projection unit to project the pattern image.

(10) The information processing apparatus according to (9), in which
the control unit causes the image capturing unit to perform exposure and reading as the image capturing for imaging and exposure and reading as the image capturing for sensing during the single cycle of the scan as projection of the pattern image.

(11) The information processing apparatus according to (10), in which
the control unit causes the image capturing unit to perform exposure and reading as the image capturing for sensing at timing at which the pattern image is projected on the object within the exposure period and the line scan for reading overlaps with the line scan for reading as the image capturing for imaging.

(12) The information processing apparatus according to (11), in which
the control unit further causes other image capturing units different from the image capturing unit to perform exposure and reading as the image capturing for imaging in synchronization with the image capturing for imaging by the image capturing unit.

(13) The information processing apparatus according to any one of (10) to (12), in which the control unit causes the image capturing unit to
perform exposure and reading as the image capturing for imaging multiple times, and
perform exposure and reading as the image capturing for sensing at timing at which the pattern image is projected on the object within the exposure period and the line scan for reading overlaps with line scan for at least last reading of multiple readings as the image capturing for imaging.

(14) The information processing apparatus according to any one of (8) to (13), in which
the control unit causes multiple projection units to perform the scan of the point light source or the line light source as projection of the pattern image at timing overlapping with the scan as projection of the pattern image by other projection units.

(15) The information processing apparatus according to (14), in which
the control unit causes the image capturing unit to perform, for projection of the pattern image by each projection unit, exposure and reading as the image capturing for sensing at timing at which the pattern image is projected on the object in the exposure period.

(16) The information processing apparatus according to (15), in which
the control unit further causes the image capturing unit to perform exposure and reading as the image capturing for imaging.

(17) The information processing apparatus according to any one of (1) to (16), further including
the projection unit and the image capturing unit.

(18) An information processing method including
performing scan of a point light source or a line light source configured to project a pattern image on an object, and performing, multiple times, exposure and reading by line scan for capturing an image of the object during a single cycle of the scan as projection of the pattern image.

(19) An information processing apparatus including
a control unit configured to cause each of multiple image processing apparatuses configured to perform scan of a point light source or a line light source configured to project a pattern image on an object and perform, multiple times, exposure and reading by line scan for capturing an image of the object during a single cycle of the scan as projection of the pattern image to perform the scan as projection of the pattern image and the line scan as image capturing for the object in a direction different from those of other adjacent image processing apparatuses.

(20) An information processing method including
causing each of multiple image processing apparatuses configured to perform scan of a point light source or a line light source configured to project a pattern image on an object and perform, multiple times, exposure and reading by line scan for capturing an image of the object during a single cycle of the scan as projection of the pattern image to perform the scan as projection of the pattern image and the line scan as image capturing for the object in a direction different from those of other adjacent image processing apparatuses.

REFERENCE SIGNS LIST

100 Image processing apparatus
101 Control unit
111 Projection unit
112 Image capturing unit
113 Signal processing unit
121 Light receiving unit
122 AD converter
212 Image capturing unit
222 AD converter
311 Projection unit
412 Image capturing unit
422 AD converter
600 Image processing system
601 Control apparatus
602 Image processing apparatus
611 Control unit
612 Communication unit
900 Computer

The invention claimed is:

1. An information processing apparatus, comprising:
a control unit configured to control a projection unit to perform scan of a point light source or a line light source configured to project a pattern image on an object and control an image capturing unit to perform, multiple times, exposure and reading by line scan for capturing an image of the object during a single cycle of the scan as projection of the pattern image.

2. The information processing apparatus according to claim 1, wherein
the control unit causes a single image capturing unit configured to read a pixel value on a line-by-line basis to capture the image of the object.

3. The information processing apparatus according to claim 2, wherein
the control unit causes the image capturing unit to perform exposure and reading as image capturing for imaging and exposure and reading as image capturing for sensing during the single cycle of the scan as projection of the pattern image.

4. The information processing apparatus according to claim 3, wherein
the control unit causes the image capturing unit to perform exposure and reading as the image capturing for sensing at timing at which the pattern image is projected on the object within an exposure period and line scan for reading does not overlap with line scan for reading as the image capturing for imaging.

5. The information processing apparatus according to claim 4, further comprising:
an image processing unit configured to generate image information on the object on a basis of information obtained by the image capturing for imaging and generate depth information on the object on a basis of information obtained by the image capturing for sensing.

6. The information processing apparatus according to claim 5, wherein
the image processing unit performs moving body determination on a basis of the image of the object, and generates the depth information on the object on a basis of a moving body determination result.

7. The information processing apparatus according to claim 5, wherein
the control unit causes the projection unit to sequentially project multiple predetermined pattern images having partial regions with an identical picture, and
the image processing unit performs moving body determination on a basis of the partial regions with the identical picture, and generates the depth information on the object on a basis of a moving body determination result.

8. The information processing apparatus according to claim 1, wherein
the control unit causes a single image capturing unit configured to read pixel values of multiple lines in parallel to capture the image of the object.

9. The information processing apparatus according to claim 8, wherein
the control unit causes a single projection unit to project the pattern image.

10. The information processing apparatus according to claim 9, wherein
the control unit causes the image capturing unit to perform exposure and reading as image capturing for imaging and exposure and reading as image capturing for sensing during a single cycle of the scan as projection of the pattern image.

11. The information processing apparatus according to claim 10, wherein
the control unit causes the image capturing unit to perform exposure and reading as the image capturing for sensing at timing at which the pattern image is projected on the object within an exposure period and line scan for reading overlaps with line scan for reading as the image capturing for imaging.

12. The information processing apparatus according to claim 11, wherein
the control unit further causes other image capturing units different from the image capturing unit to perform exposure and reading as the image capturing for imaging in synchronization with the image capturing for imaging by the image capturing unit.

13. The information processing apparatus according to claim 10, wherein
the control unit causes the image capturing unit to:
perform exposure and reading as the image capturing for imaging multiple times; and
perform exposure and reading as the image capturing for sensing at timing at which the pattern image is projected on the object within an exposure period and line scan for reading overlaps with line scan for at least last reading of multiple readings as the image capturing for imaging.

14. The information processing apparatus according to claim 8, wherein
the control unit causes multiple projection units to perform the scan of the point light source or the line light source as projection of the pattern image at timing overlapping with the scan as projection of the pattern image by other projection units.

15. The information processing apparatus according to claim 14, wherein
the control unit causes the image capturing unit to perform, for projection of the pattern image by each projection unit, exposure and reading as image capturing for sensing at timing at which the pattern image is projected on the object in an exposure period.

16. The information processing apparatus according to claim 15, wherein
the control unit further causes the image capturing unit to perform exposure and reading as image capturing for imaging.

17. The information processing apparatus according to claim 1, further comprising:
the projection unit and the image capturing unit.

18. An information processing method, performed by a Central Processing Unit (CPU), comprising:
performing scan of a point light source or a line light source configured to project a pattern image on an object, and performing, multiple times, exposure and reading by line scan for capturing an image of the object during a single cycle of the scan as projection of the pattern image.

19. An information processing apparatus, comprising:
a control unit configured to cause each of multiple image processing apparatuses configured to perform scan of a point light source or a line light source configured to project a pattern image on an object and perform, multiple times, exposure and reading by line scan for capturing an image of the object during a single cycle of the scan as projection of the pattern image to perform the scan as projection of the pattern image and the line scan as image capturing for the object in a direction different from those of other adjacent image processing apparatuses.

20. An information processing method, comprising:
causing each of multiple image processing apparatuses configured to perform scan of a point light source or a line light source configured to project a pattern image on an object and perform, multiple times, exposure and reading by line scan for capturing an image of the object during a single cycle of the scan as projection of the pattern image to perform the scan as projection of the pattern image and the line scan as image capturing for the object in a direction different from those of other adjacent image processing apparatuses.

* * * * *